United States Patent
Matsuura et al.

(10) Patent No.: US 7,574,661 B2
(45) Date of Patent: Aug. 11, 2009

(54) APPLICATION PROGRAM PREDICTION METHOD AND MOBILE TERMINAL

(75) Inventors: Satoshi Matsuura, Kyotanabe (JP); Takahiro Kudo, Katano (JP); Eiichi Naito, Yawata (JP); Hideyuki Yoshida, Kyotanabe (JP); Jun Ozawa, Nara (JP); Mototaka Yoshioka, Moriguchi (JP)

(73) Assignee: Panasonic Corporation, Osaka (JP)

( * ) Notice: Subject to any disclaimer, the term of this patent is extended or adjusted under 35 U.S.C. 154(b) by 255 days.

(21) Appl. No.: 10/541,218

(22) PCT Filed: Feb. 18, 2004

(86) PCT No.: PCT/JP2004/001777

§ 371 (c)(1),
(2), (4) Date: Jun. 30, 2005

(87) PCT Pub. No.: WO2004/077291

PCT Pub. Date: Sep. 10, 2004

(65) Prior Publication Data

US 2006/0156209 A1    Jul. 13, 2006

(30) Foreign Application Priority Data

Feb. 25, 2003    (JP) .............................. 2003-047024

(51) Int. Cl.
*G06F 3/00*    (2006.01)
(52) U.S. Cl. ...................... 715/745; 715/747; 715/741; 715/742; 455/414.1; 455/414.2; 455/414.3; 701/207
(58) Field of Classification Search ................. 715/745, 715/749; 455/68, 566, 414.2; 704/250; 719/318; 714/798; 701/207
See application file for complete search history.

(56) References Cited

U.S. PATENT DOCUMENTS

| | | | | |
|---|---|---|---|---|
| 5,459,671 | A | * 10/1995 | Duley | ........................... 702/63 |
| 5,754,125 | A | * 5/1998 | Pearce | ........................ 340/989 |
| 5,910,799 | A | 6/1999 | Carpenter et al. | |
| 6,529,784 | B1 * | 3/2003 | Cantos et al. | ................. 700/79 |
| 6,721,542 | B1 * | 4/2004 | Anttila et al. | ................. 455/68 |
| 6,879,838 | B2 * | 4/2005 | Rankin et al. | ............ 455/456.6 |
| 2002/0160817 | A1 * | 10/2002 | Salmimaa et al. | ........... 455/566 |
| 2003/0014491 | A1 * | 1/2003 | Horvitz et al. | .............. 709/206 |
| 2003/0163311 | A1 * | 8/2003 | Gong | ........................ 704/250 |
| 2004/0043758 | A1 * | 3/2004 | Sorvari et al. | ............ 455/414.1 |

FOREIGN PATENT DOCUMENTS

| | | |
|---|---|---|
| JP | 5-119949 | 5/1993 |
| JP | 6-119265 | 4/1994 |
| JP | 6-187163 | 7/1994 |
| JP | 10-27089 | 1/1998 |
| JP | 10-55259 | 2/1998 |
| JP | 2001-84269 | 3/2001 |

(Continued)

*Primary Examiner*—William L Bashore
*Assistant Examiner*—Sherrod Keaton
(74) *Attorney, Agent, or Firm*—Wenderoth, Lind & Ponack, L.L.P.

(57) ABSTRACT

A mobile terminal that appropriately predicts an application that a user is likely to use that includes: an input device that selects and executes any of two or more applications; a GPS reception unit; a behavior pattern extraction unit that creates a usage prediction rule of the application executed on the input device, in association with a usage location detected by the GPS reception unit; and an information display control unit that specifies, based on the usage prediction rule, an application corresponding to the current location detected by the GPS reception unit, and causes a display to display the specified application as a prediction result.

23 Claims, 70 Drawing Sheets

FOREIGN PATENT DOCUMENTS

| | | |
|---|---|---|
| JP | 2002-132622 | 5/2002 |
| JP | 2002-215278 | 7/2002 |
| JP | 2002-267463 | 9/2002 |
| JP | 2002-297502 | 10/2002 |
| JP | 2002-298169 | 10/2002 |
| JP | 2003-8738 | 1/2003 |
| JP | 2003-296770 | 10/2003 |
| WO | 02/41180 | 5/2002 |

\* cited by examiner

| Date and Time | Location Coodinate |
|---|---|
| ⋮ | ⋮ |
| (Tue) Feb. 4, 2003, 10:23:34 | E1 east longitude, N1 north latitude |
| (Tue) Feb. 4, 2003, 10:23:35 | E1 east longitude, N1 north latitude |
| (Tue) Feb. 4, 2003, 10:23:36 | E1 east longitude, N2 north latitude |
| ⋮ | ⋮ |

FIG. 8

| Facility Identifier | Site Area (Upper-left Coordinate of Rectangle, Length and Width) |
|---|---|
| Facility 1 | e1 east longitude, n1 north latitude, 10m, 10m |
| Facility 2 | e2 east longitude, n2 north latitude, 20m, 10m |
| Facility 3 | e3 east longitude, n3 north latitude, 15m, 10m |
| Facility 4 | e4 east longitude, n4 north latitude, 20m, 20m |
| ⋮ | ⋮ |

FIG. 9

| Date and time | Place |
|---|---|
| ⋮ | ⋮ |
| (Sat) Feb. 1, 2003 18:00~18:20 | Facility 2 (Regal Host Keihanna) |
| (Sat) Feb. 1, 2003 18:50~19:20 | Facility 4 (Book Born) |
| ⋮ | ⋮ |
| (Sat) Feb. 8, 2003 18:15~19:00 | Facility 2 (Regal Host Keihanna) |
| ⋮ | ⋮ |

130

| Date and Time | Location of Stay | Number of Stays | Probability of Stay |
|---|---|---|---|
| Holiday night | Facility 1 (Boss Burger Keihanna) | 78 | 52% |
| | Facility 2 (Regal Host Keihanna) | 45 | 30% |
| | Facility 3 (Mary's Coffee) | 13 | 8% |
| | ⋮ | ⋮ | ⋮ |
| Weekday daytime | Facility 1 (Boss Burger Keihanna) | 2 | 1% |
| ⋮ | ⋮ | ⋮ | ⋮ |

Facility Information Data 303a

| Facility Identifier | Facility Name | Latest Information |
|---|---|---|
| Facility 1 | Boss Burger Keihanna | Croquette Burger ￥190 Now on Sale ⋯ |
| Facility 2 | Regal Host Keihanna | Nostalgic Western Food Festival ⋯ |
| Facility 3 | Mary's Coffee | Fresh Pot of Espresso⋯ |
| Facility 4 | Book Born | Hot Latest Novel Arrived ⋯ |
| ⋯ | ⋯ | ⋯ |
| Facility A1 | Ghyuutami | Beer ￥100 until 19:00 ⋯ |
| Facility A2 | Kurokiya | Half-price for Drinks ⋯ |
| ⋯ | ⋯ | ⋯ |

FIG. 13

Category Data 302a

| Facility Identifier | Category |
|---|---|
| Facility 1 | Restaurant |
| Facility 2 | Restaurant |
| Facility 3 | Cafe |
| Facility 4 | Book store |
| ⋮ | ⋮ |
| Facility A1 | Pub |
| Facility A2 | Pub |
| ⋮ | ⋮ |

| Facility Identifier | Category | Facility Name | Location Coordinate | Latest Information |
|---|---|---|---|---|
| Facility 1 | Restaurant | Boss Burger Keihanna | East longitude E1, North latitude N1 | Croquette Burger ¥190 Now on Sale ... |
| Facility 2 | Restaurant | Regal Host Keihanna | East longitude E2, North latitude N2 | Nostalgic Western Food Festival ... |
| ---- | ---- | ---- | ---- | ---- |
| Facility A1 | Pub | Gyuutami | East longitude E11, North latitude N11 | Beer ¥100 until 19:00... |
| Facility A2 | Pub | Kurokiya | East longitude E12, North latitude N12 | Half-price for Drinks ... |
| ---- | ---- | ---- | ---- | ---- |

FIG. 18

| Date and Time | Place or Path |
|---|---|
| ⋮ | ⋮ |
| (Fri) Feb. 7, 2003<br>9:00~18:00 | Facility A0 (Office) |
| (Fri) Feb. 7, 2003<br>18:10~18:30 | Facility 4 (Book Born) |
| (Fri) Feb. 7, 2003<br>18:00~18:10 | Facility A0 → Facility 4 |
| (Fri) Feb. 7, 2003<br>18:45~21:00 | Facility A1 (Gyuutami) |
| ⋮ | ⋮ |
| (Fri) Feb. 14, 2003<br>18:20~18:30 | Facility A0 → Facility 4 |
| (Fri) Feb. 14, 2003<br>19:10~21:30 | Facility A2 (Kurokiya) |
| ⋮ | ⋮ |

| Date and Time / Location | Next location | Number of movements | Probability of movement |
|---|---|---|---|
| ---- | ---- | ---- | ---- |
| Date and Time: Friday night Location: Facility A0 (Office) → Facility 4 (Book Born) | Facility A1 (Ghuutami) | 45 | 60% |
| | Facility A2 (Kurokiya) | 15 | 20% |
| | Facility A3 (Pachinko King) | 3 | 4% |
| ---- | ---- | ---- | ---- |
| Date and Time: holiday daytime Location: Facility 20 (Home) | Facility 21 (Department store A) | 50 | 60% |
| | Facility 22 (Department store B) | 10 | 12% |
| ---- | ---- | ---- | ---- |

Route Search Service

Departure station
Gakuenmae

Arrival station
Tsuruhashi

Departure date
Month 12 ▷   Day 8 ▷

Departure time
10 ▷ : 00 ▷

(Route search)

(B)

Route Search Service

Route 1
Gakuenmae —K Railway— Tsuruhashi
        Express
10:15            11:00

Route 2
Gakuenmae —K Railway— Tsuruhashi
      Special express
10:20            10:50

FIG. 26

| Search date & time | Specified date & time (Departure time) | Departure station | Arrival station | Route (Railway) | Time required |
|---|---|---|---|---|---|
| 2003/12/01/ 22:10 | 2003/12/08/ 10:00 | Gakuenmae | Tsuruhashi | K Railway | 45 |
| 2003/12/04/ 21:15 | 2003/12/10/ 9:00 | Kyoto | Shin-Osaka | J Railway, Nishi line | 64 |
| 2003/12/05/ 22:10 | 2003/12/15/ 10:00 | Tokyo | Shinagawa | J Railway, Yama line | 15 |
| 2003/12/05/ 22:15 | 2003/12/15/ 19:00 | Shinagawa | Tokyo | J Railway, Yama line | 15 |
| 2003/12/06/ 10:10 | 2003/12/10/ 11:00 | Gakuenmae | Saidaiji | K Railway | 10 |
| ... | | | | ... | |
| | | | | | |
| | | | | | |

| Route | Station name |
|---|---|
| K Railway | Tsuruhashi, Higashi-Osaka, Gakuenmae, Namba, ··· |
| J Railway | Osaka, Tsuruhashi, Tennoji, ··· |
| H Railway | Umeda, Toyonaka, Ikeda, Juso, ··· |
| N Railway | Namba, Sakai, Shin-Imamiya, ··· |
| ··· | ··· |

FIG. 33

| Station name | Route | Registration time | Reception time | Address of receiver |
|---|---|---|---|---|
| Namba | K Railway N Railway | 2003/10/01/ 8:23 | 2003/10/01/ 8:12 | yosh @kkk.ne.jp |
| Higashi-Osaka | K Railway | 2003/10/01/ 22:23 | 2003/10/01/ 22:05 | yashik @ddd.ne.jp |
| Gakuenmae | K Railway | 2003/10/02/ 18:12 | 2003/10/02/ 16:32 | hito @ppp.ne.jp |
| Umeda | H Railway | 2003/10/05/ 11:21 | 2003/10/05/ 10:52 | ka @ppp.ne.jp |
| ... | ... | ... | ... | ... |

FIG. 36

| Usage date & time | Usage location | Usage history |
|---|---|---|
| (Fri) Feb. 7, 2003 20:00 | Office → Station | Application: E-mail<br>Address : Kazoku@xyz.ne.jp  (to Wife)<br>Title:  Coming home soon<br>Message:  I've just left the office. Please prepare meal for me. |
| (Fri) Feb. 7, 2003 21:45 | Home | Application: E-mail<br>Address:  ABC・・・ (Mr. Yamada, friend)<br>Title:  XYZ・・・<br>Message: XYZ・・・ |
| (Sat) Feb. 8, 2003 9:15 | Home | Application: Game<br>Game software: Game software A<br>Information so far:  EFG |
| ---- | ---- | ---- |

FIG. 38

| Usage date & time Usage location | Application | Items | Number of uses | Details of usage |
|---|---|---|---|---|
| Date & time Weekday night Location Office → Station | E-mail | To Wife Address: kazoku... | 75 | Title: Coming home soon Message: I've just left the office ... |
| | | To Friend (Mr. Yamada) Address: yamada... | 15 | Title: How are you? Message: Hello ... |
| | | --- | --- | --- |
| | Game | Game software A | 12 | Information so far: EFG |
| | | Game software B | 3 | Information so far: HJK |
| | --- | | ------ | ------ |
| Date & time Weekday night Location Home | E-mail to Friend (Mr. Kimura) | | --- | --- |
| Date & time Holiday morning Location Home | | | 24 | Title: Good morning Message: Good morning. ... |
| | | | ---- | ---- |
| ---- | | | | |

320

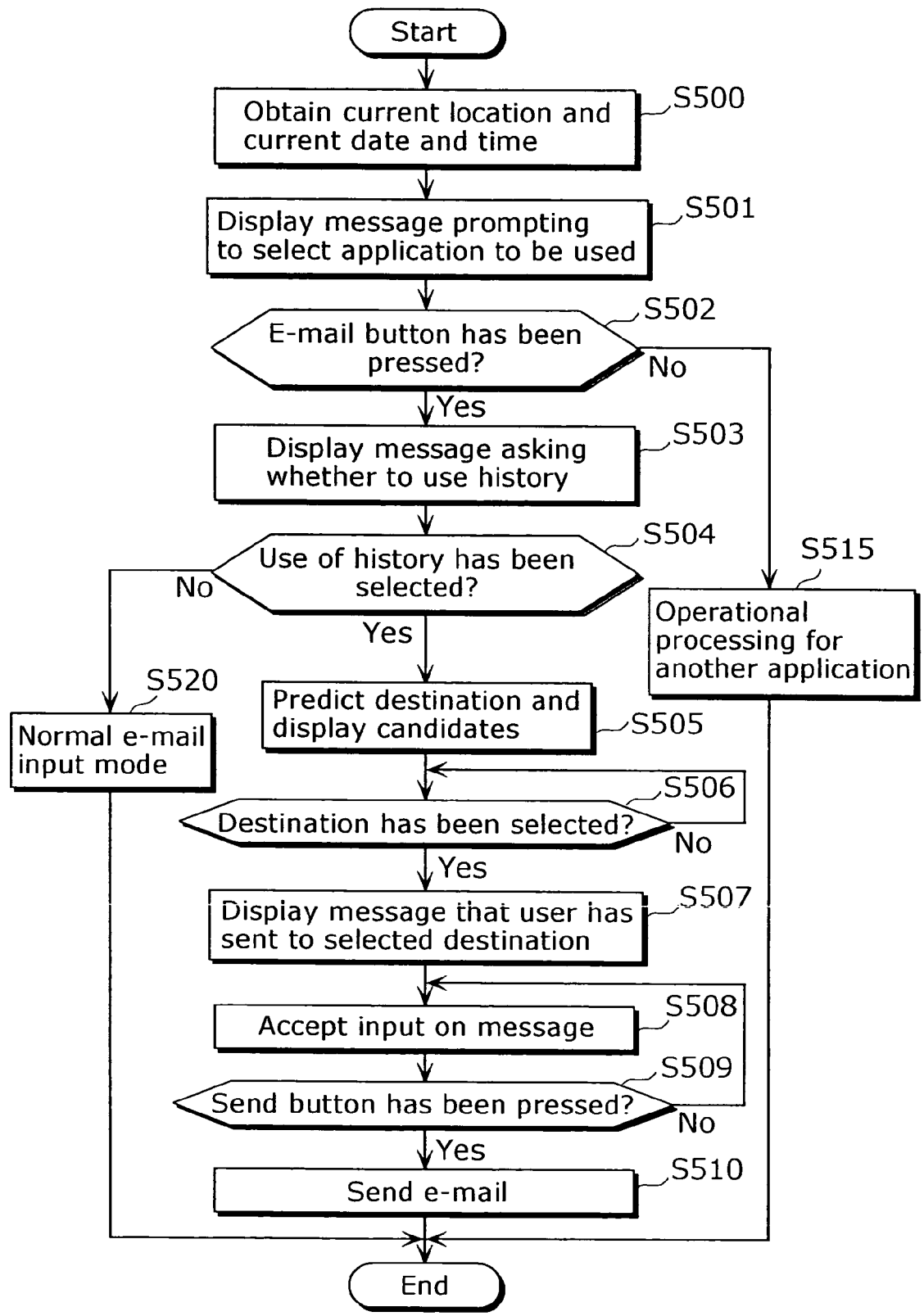

FIG. 44

| Usage date & time | Usage route | Weather condition | Usage history |
|---|---|---|---|
| 501 (Fri) Feb. 7, 2003 20:00 | Office → Station | Weather: Fair <...> ... | Used application: e-mail |
| | | | Destination address: kazoku@xyz.ne.jp (to Wife) |
| | | | Template 1 (Coming home 1) |
| | | | Title: Coming home soon |
| | | | Outgoing message: I've just left the office. Arrival time will be around 21:00. |
| 502 (Mon) Feb. 10 2003 20:00 | Office → Station | Weather: Rainy <...> ... | Used application: e-mail |
| | | | Destination address: kazoku@xyz.ne.jp (to Wife) |
| | | | Template 2 (Coming home 2) |
| | | | Title: Coming home soon |
| | | | Outgoing message: I've just left the office. Please come and pick me up at the station around 20:40. |

FIG. 45

| Usage situation | Application | Contents | Number of uses |
|---|---|---|---|
| Time: Weekday night<br>Location: Office → Station<br>Weather: Fair | E-mail | Destination address: Wife<br>Template 1: (Coming home 1)<br>Title: Coming home soon<br>Outgoing message: I've just left ... | 50 |
| Time: Weekday night<br>Location: Office → Station<br>Weather: Rainy | E-mail | Destination address: Wife<br>Template 2: (Coming home 2)<br>Title: Coming home soon<br>Outgoing message: I've just left ... pick me up at the station ... | 25 |
| ... | TV | ... | 30 |
| Weather: Rainy | E-mail | Destination address: Son<br>Template 3 (Pickup)<br>Title: Shall I pick you up?<br>Outgoing message: ... pick you up at AA station at 20:00 ... | 15 |
| Location: Station → Supermarket | E-mail | Destination address: Wife<br>Template 5 (Shopping)<br>Title: Shopping<br>Outgoing message: ... make a stop at Supermarket AA ... | 15 |
| ... | | ... | |

FIG. 55

| Usage situation | Application | Content | Number of uses |
|---|---|---|---|
| Time: Weekday daytime<br>Location:<br>AA station<br>→BB station<br><...> | TV | Ch8: AB news<br>Volume: 75<br>Mode:480×320 | 50 |
| Time: Weekday night<br>Location:<br>AA station<br>→BB station<br><...> | General | Manner mode<br>Reception-permitted party:C Company<br>Reception-rejected party: None<br>... | 25 |
| Time: Weekday<br>Location: Office<br><...> | General | Manner mode<br>Reception-permitted party:Family member<br>Reception-rejected party: Others<br>... | 25 |
| Location: Movie theater | | Manner mode | |
| ... | ... | ... | |

FIG. 57

| Usage situation | Application | Content parameter | Number of uses |
|---|---|---|---|
| Time: Weekday night<br>Location: Office → Station<br><...> | Music player | Album to be played back: CD1<br>Music to be played back: track 5<br>Volume:75<br>Usage duration: 20 minute | 50 |
| Time: Weekday night<br>Location: Office → Station<br><...> | TV | Program to be reproduced: AB news<br>Reproduction mode:...480×320<br>Volume : 50<br>Usage duration: 60 minutes | 25 |
| Time: Weekday night<br>Location:AA station →BB station<br><...> | Music player | ... <br>Usage duration: 20 minutes | 15 |
| Time: Weekday night<br>Location:BB station →Home<br><...> | E-mail | Destination address: Wife<br>Template 5 (Shopping)<br>Title: Shopping<br>Outgoing message: I will go to supermarket ... | 15 |
| Time: Holiday daytime<br>Location: Home | Game | Content: CD race<br>Data:...<br>Usage duration: 40 minutes | 15 |
| ... | | | |

FIG. 58

| Date & Time Location | Destination | Number of movements | Movement probability |
|---|---|---|---|
| Date & time: Weekday night Location: Office→AA station | AA station→BB station | 190 | 95% |
| | ... | ... | ... |
| Date & time: Holiday daytime Location: Home | G station | 101 | 92% |
| | ... | ... | ... |
| Date & time: Weekday morning Location: Home | BB station→AA station | 190 | 95% |
| | ... | ... | ... |

FIG. 59

Power consumption table 853

| Application | Content parameter | Power coefficient |
|---|---|---|
| Music player | Volume 75 | 3 |
| TV | FineMode, Volume 50 | 5 |
| Movie player | | 4 |
| Game | AA racing | 3 |
| Picture display | 1 frame | 0.1 |
| | | |
| | | |
| | | |
| | | |

FIG. 62

(a) There could be a power shortage. Charging is needed.

OK (b) There could be a power shortage. Display of charging station is necessary?

Yes | No

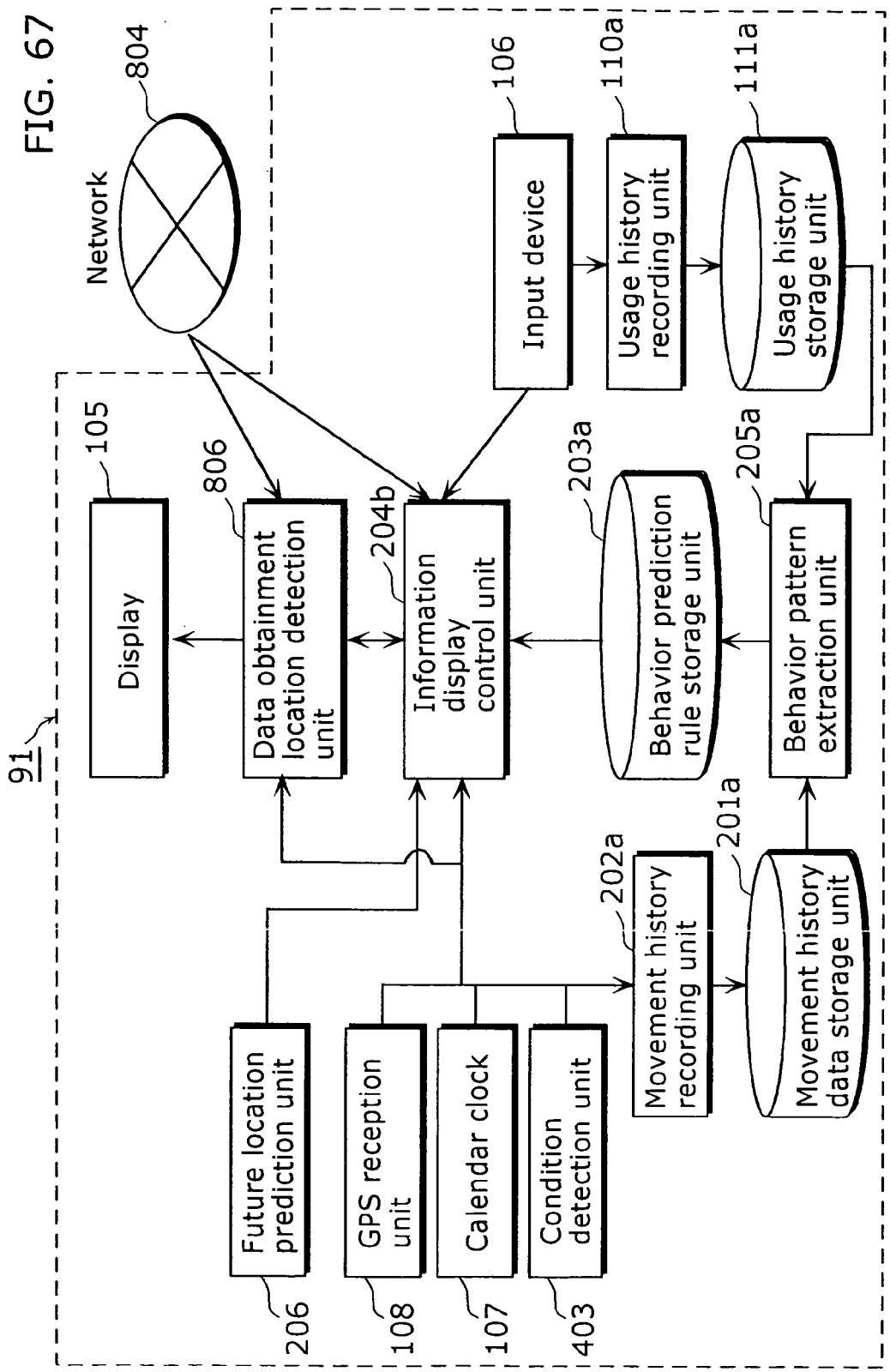

FIG. 68

| Usage situation | Application | Content parameter | Number of uses |
|---|---|---|---|
| Time: Weekday night<br>Location: Office → Station<br><...> | Music player | Album to be played back: CountDown100 (to be obtained)<br>Number to be played back: track5<br>Volume : 75<br>Usage duration: 20 minutes | 50 |
| Time: Weekday night<br>Location: AA station → BB station<br><...> | Movie player | Program to be reproduced: AB stock news (to be obtained)<br>Reproduction mode:...480×320<br>Volume : 50<br>Usage duration: 60 minutes | 25 |
| Time: Weekday night<br>Location: AA station → BB station<br><...> | Game | Content: CD match race<br>Character data (to be obtained)<br>...<br>Usage duration: 20 minutes | 15 |
| Time: Weekday night<br>Location: BB station → Home<br><...> | Game | Content: EF match race<br>Data | 15 |
| ... | | | |

No music to be played back is held.
Is display of download place needed?

→ Yes / No

Music to be played back has been updated.
Is display of download place needed?

→ Yes / No

FIG. 71

Download place list data

| Data name | Place | Fee to be billed | Coupon |
|---|---|---|---|
| Program to be reproduced: AB stock news | Latitude N1, Longitude E1 1 km in radius | ¥10/kbyte | 1 point |
| | Latitude N2, Longitude E2 0.5 km in radius | | |
| Album to be played back: Count Down100 | Latitude N3, Longitude E2 Download machine | ¥20/kbyte | 2 points |
| | Latitude N4, Longitude E4 0.3 km in radius | | |
| Town information | Latitude N5, Longitude E5 Download machine | ¥100/kbyte | 3 points |

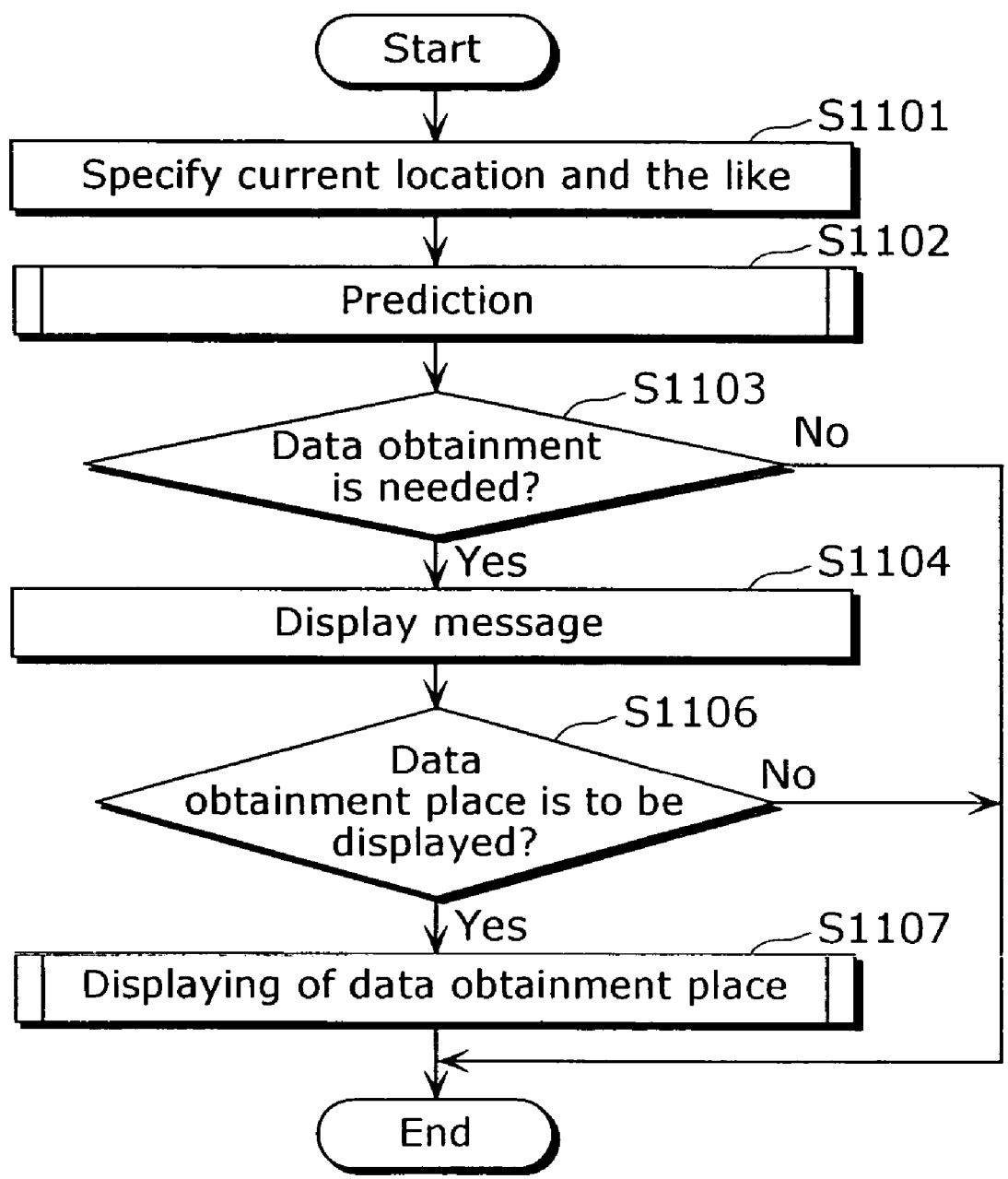

APPLICATION PROGRAM PREDICTION METHOD AND MOBILE TERMINAL

TECHNICAL FIELD

The present invention relates to a method of predicting an application program that a user is likely to use from among application programs previously installed onto a mobile terminal such as a mobile phone.

BACKGROUND ART

Support apparatuses that support user's input operations by predicting the user's operation or command to be inputted next have conventionally been suggested (for example, see Japanese Laid-Open Patent Application No. 10-27089 Publication and Japanese Laid-Open Patent Application No. 2002-215278 Publication).

Such a support apparatus predicts, based on a user's operation history, an application program that is likely to be executed next, from among a plurality of previously installed application programs, and presents an operation and a command for executing the application program. Therefore, the user is able to easily execute the application program to be used next.

On the other hand, in-car apparatuses for car navigation systems that predict a destination where a user is likely to go and destination information to be presented have been suggested.

Such an in-car apparatus predicts the destination based on the user's car behavior history. The in-car apparatus further predicts an application program that provides the destination information from among a plurality of previously installed application programs, and executes the predicted application program. Therefore, the user is able to not only save time and trouble for setting the destination, but also easily know the destination information.

However, the prediction method used in the above conventional support apparatus or in-car apparatus has a problem that it is impossible to appropriately predict an application program to be used on a mobile terminal.

In more detail, although application programs to be used by a user on a mobile terminal tend to vary depending on the location where the mobile terminal exists, the above conventional support apparatus does not take such tendency into consideration as its prediction method. Thus, the conventional support apparatus is unable to predict an appropriate application program depending on the location. Furthermore, the above conventional in-car apparatus does not consider, as its prediction method, application programs which have been used by a user with his own intention, and thus is unable to appropriately predict an application program that the user would like to use.

The present invention has been conceived in view of the above problems, and an object of the present invention is to provide a method of appropriately predicting application programs for a mobile terminal that a user is likely to use, depending on the location where the mobile terminal exists.

SUMMARY OF INVENTION

In order to achieve the above object, the application program prediction method according to the present invention is an application program prediction method by which a mobile terminal installed with two or more application programs predicts an application program that a user is likely to use. The method of the present includes the following: an application executing step of selecting and executing one of the application programs; a location detecting step of detecting a location where the mobile terminal exists when the application program is executed in the application executing step; a usage history creating step of creating a usage history of the application program executed in the application executing step, in association with the location detected in the location detecting step; and a predicting step of specifying, based on the usage history, an application program corresponding to a predetermined location and presenting the specified application program as a prediction result.

According to this method, the application program corresponding to the predetermined location is specified based on the usage history including the past usage locations, wherein the application program is regarded as a prediction result. Therefore, it becomes possible to appropriately predict the application program that the user is likely to use at that location.

For example, the predicting step includes: a current location detecting step of detecting a current location of the mobile terminal; a specifying step of specifying, based on the usage history, an application program corresponding to the current location detected in the current location detecting step; and a presenting step of presenting the application program specified in the specifying step, as a prediction result of an application program that the user is likely to use currently.

Accordingly, the application program corresponding to the current location of the mobile terminal is specified based on the usage history, and that application program is presented as a prediction result. Therefore, it becomes possible to appropriately predict the application program that the user is likely to use currently.

It is also possible that, in the usage history creating step, the usage history is created, the usage history including a name of the application program executed in the application executing step and a content for the application program inputted by a user's operation, in the specifying step, a content corresponding to the current location detected in the current location detecting step is further specified based on the usage history, and in the presenting step, the content specified in the specifying step is further presented as a content of the application program that the user is likely to use currently. For example, in the specifying step, an e-mail is specified as an application program corresponding to the current location detected in the current location detecting step, and in the presenting step, a prediction result, indicating that the e-mail is specified as the application program that the user is likely to use currently, is presented.

Accordingly, the content corresponding to the current location of the mobile terminal is specified based on the usage history and presented as a prediction result. Therefore, it becomes possible to appropriately predict the application program that the user is likely to use currently and the corresponding content.

The predicting step may include: a future location predicting step of predicting a future location of the mobile terminal; a specifying step of specifying, based on the usage history, an application program corresponding to the future location predicted in the future location predicting step; and a presenting step of presenting the application program specified in the specifying step, as a prediction result of an application program that the user is likely to use in the future. For example, the above-mentioned application program prediction method further includes a movement history creating step of creating a movement history of the mobile terminal in association with a calendar attribute, wherein in the future location predicting step, a location corresponding to a calendar attribute indicating a time later than a current time is specified based on the movement history, and the specified location is regarded as a future location of the mobile terminal.

Accordingly, the application program corresponding to the future location of the mobile terminal is specified based on the usage history and presented as a prediction result. Therefore, it becomes possible to appropriately predict the application program that the user is likely to use in the future.

Here, the above-mentioned application program prediction method may further include: a power detecting step of detecting a remaining amount of power of the mobile terminal; a calculating step of calculating an amount of power which is to be consumed when the application program and the content specified in the specifying step are used; and a message presenting step of presenting a message prompting to charge when the remaining amount of power detected in the power detecting step is smaller than the amount of power consumption calculated in the calculating step.

Accordingly, the amount of power which is to be consumed by the use of the predicted application program and content is calculated before the execution of them, and a message prompting to charge the mobile terminal is presented if the amount of power consumption is smaller than the remaining amount of power thereof. Therefore, it becomes possible to charge the mobile terminal before the start of using the application program and the content and thus prevent the use of them from being interrupted due to shortage of power.

In the case where the above-mentioned content is distribution data to be distributed via a communication network, the above-mentioned application program prediction method may further include: a judging step of judging whether or not the mobile terminal holds a latest version of the distribution data specified in the specifying step; and a presenting step of presenting a message for notifying that the mobile terminal does not hold the latest version of the distribution data, when it is judged in the judging step that the mobile terminal does not hold the latest version.

Accordingly, if the mobile terminal does not hold the latest version of the distribution data to be processed by the application program, a message indicating as such is presented before the start of using that application program. Therefore, it becomes possible to download the latest version of the distribution data onto the mobile terminal beforehand.

Here, it is also possible that the future location predicting step includes: a station specifying step of specifying a station where the mobile terminal currently exists, through communication carried out between the mobile terminal and a device placed in the station; and a retrieving step of retrieving, from a past route search result, an arrival station corresponding to a departure station that is the station specified in the station specifying step, and the arrival station retrieved in the retrieving step is regarded as the future location of the mobile terminal. Or, the above-mentioned future location predicting step includes: a route specifying step of specifying a route on which the station where the mobile terminal currently exists is located, through communication carried out between the mobile terminal and a device placed in the station; and a retrieving step of retrieving, from a past e-mail history, a station which is located on the route specified in the station specifying step, and the station retrieved in the retrieving step is regarded as the future location of the mobile terminal.

Accordingly, the future location of the mobile terminal is predicted using the route search result or the e-mail history. Therefore, there is no need to take the trouble to determine the location of the mobile terminal using Global Positioning System (GPS) or the like so as to create the movement history, and further it becomes possible to predict even the location where the mobile terminal has never existed before.

Furthermore, the above-mentioned application program prediction method may further include: a mode setting step of setting an operation mode of the mobile terminal; a setting location detecting step of detecting a location of the mobile terminal where the operation mode is set in the mode setting step; a setting history creating step of creating a setting history of the operation mode set in the mode setting step, in association with the location detected in the setting location detecting step; and a mode predicting step of specifying an operation mode corresponding to a current location of the mobile terminal based on the setting history, and presenting the set operation mode as a prediction result.

Accordingly, the operation mode corresponding to the predetermined location is specified based on the setting history and regarded as a prediction result. Therefore, it becomes possible to appropriately predict the operation mode that the user is likely to set at that location.

Note that it is also possible to embody the present invention as a mobile terminal that uses the above application program prediction method and a program used for the mobile terminal.

BRIEF DESCRIPTION OF DRAWINGS

FIG. 8 is a diagram showing a map database.

FIG. 9 is a diagram showing one example of a place list.

FIG. 12 is a diagram showing facility information data.

FIG. 13 is a diagram showing category data.

FIG. 14 is a diagram showing category-by-category facility information data.

FIG. 18 is a diagram showing a list of places and paths.

FIG. 20 is a diagram showing one example of behavior prediction rules.

FIG. 25 is a diagram of a screen display showing one example of a screen displayed when a traffic search unit performs a route search.

FIG. 26 is a diagram showing contents of a route search history stored in a destination candidate storage unit.

FIG. 31 is a diagram showing contents of a station name list stored in a station name storage unit.

FIG. 33 is a diagram showing contents (of an e-mail communication history) stored in the destination candidate storage unit.

FIG. 36 is a diagram showing contents of an application usage history in the first embodiment.

FIG. 38 is a diagram showing usage prediction rules of applications in the first embodiment.

FIG. 39 is a flowchart showing operation processes for an application performed by an information display control unit in the first embodiment.

FIG. 44 is a diagram showing contents of an application usage history in the second embodiment.

FIG. 45 is a diagram showing contents of usage prediction rules stored in a behavior prediction rule storage unit in the second embodiment.

FIG. 55 is a diagram showing contents of usage prediction rules stored in a behavior prediction rule storage unit of a mobile terminal in a modification of the second embodiment.

FIG. 57 is a diagram showing contents of usage prediction rules created by a behavior pattern extraction unit in the third embodiment.

FIG. 58 is a diagram showing contents of usage prediction rules held by a future location prediction unit in the third embodiment.

FIG. 59 is a diagram showing contents of a power consumption table in the third embodiment.

FIG. 62 is a diagram showing one example of a screen displayed on a display by the power control unit in the third embodiment.

FIG. 67 is a functional block diagram showing a functional structure of a mobile terminal in a fourth embodiment.

FIG. 68 is a diagram showing contents of usage prediction rules created by a behavior pattern extraction unit in the fourth embodiment.

FIG. 71 is a diagram showing contents of download place list data held by a server in the fourth embodiment.

FIG. 73 is a flowchart showing operations of the mobile terminal in the fourth embodiment.

DETAILED DESCRIPTION OF THE INVENTION

The mobile terminal according to the present invention predicts an application program appropriate for a current or future location of its own.

In other words, the mobile terminal according to the present invention not only predicts an application program appropriate for the current location of the mobile terminal detected by GPS (Global Positioning System), but also predicts the future location first by the following method and then predicts an application program appropriate for the predicted future location.

There are the following methods of predicting a future location of a mobile terminal:

(A) Location prediction method A of predicting a location of a mobile terminal that corresponds to a calendar attribute later than a current one, based on the movement history of the mobile terminal;

(B) Location prediction method B of predicting a location of a mobile terminal to which it is likely to move in the future from a current calendar attribute and a current location, based on the movement history of the mobile terminal; and (C) Location prediction method C of predicting a location of a mobile terminal to which it is likely to move in the future from a station or the like at which a user who brings the mobile terminal with him got on a train, based on the route search history and the e-mail history.

Here, the examples of mobile terminals that predict a future location by the above-mentioned location prediction methods A to C are first explained in sequence, and then the embodiments of the mobile terminal according to the present invention using these methods are explained.

(1. Mobile Terminal using Location Prediction Method A)

A mobile terminal that uses the location prediction method A predicts the future location of the mobile terminal based on its movement history as mentioned above, and further it receives service of information relating to that location by communicating with a server apparatus.

Figure 1:
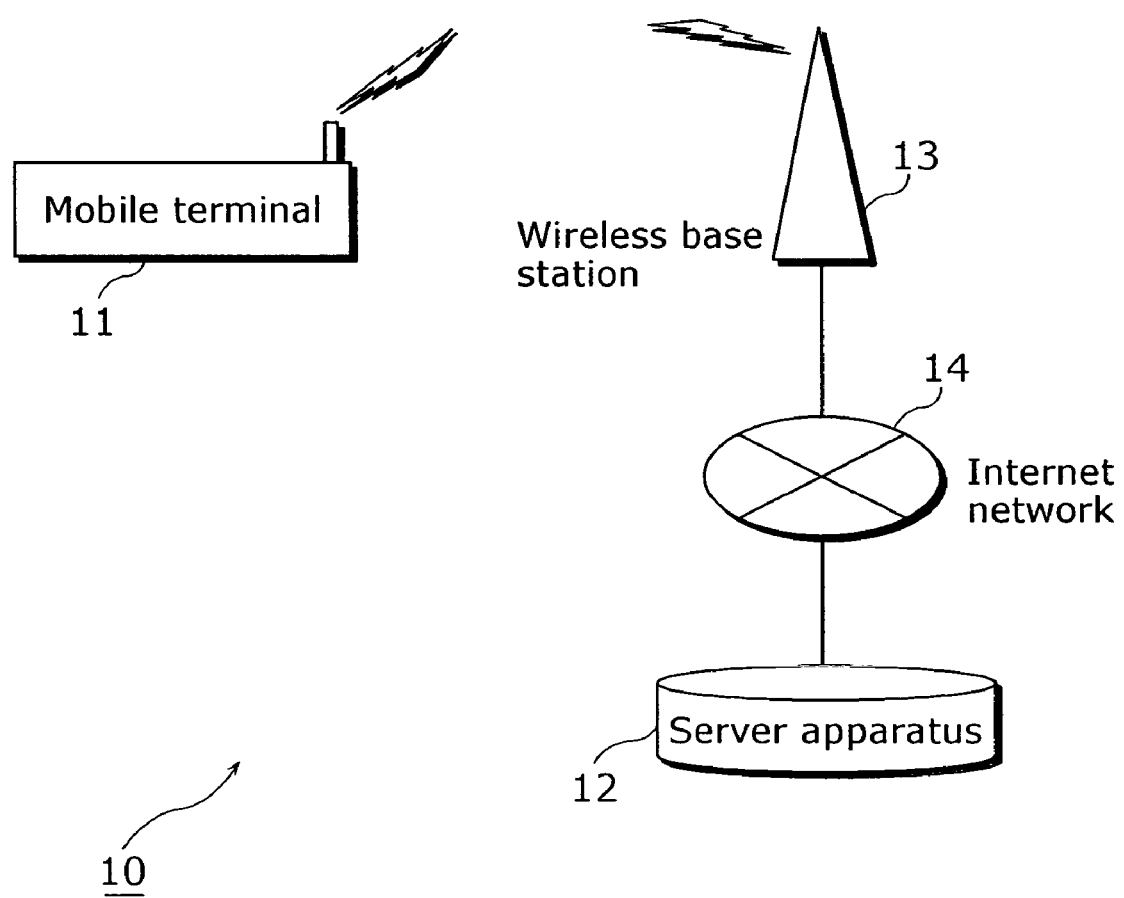
FIG. 1 is a configuration diagram showing an overall configuration of an information providing system including a mobile terminal that uses a location prediction method A and a server apparatus.

FIG. 1 is a configuration diagram showing an overall configuration of an information providing system including the above-mentioned mobile terminal and server apparatus.

This information providing system 10 includes the above-mentioned mobile terminal 11 that is an in-car apparatus of a car navigation system, the server apparatus 12 that stores information to be provided to the mobile terminal 11 and the like.

The information is provided from the server 12 to the mobile terminal 11 via an Internet network 14 and a wireless base station 13.

Figure 2:
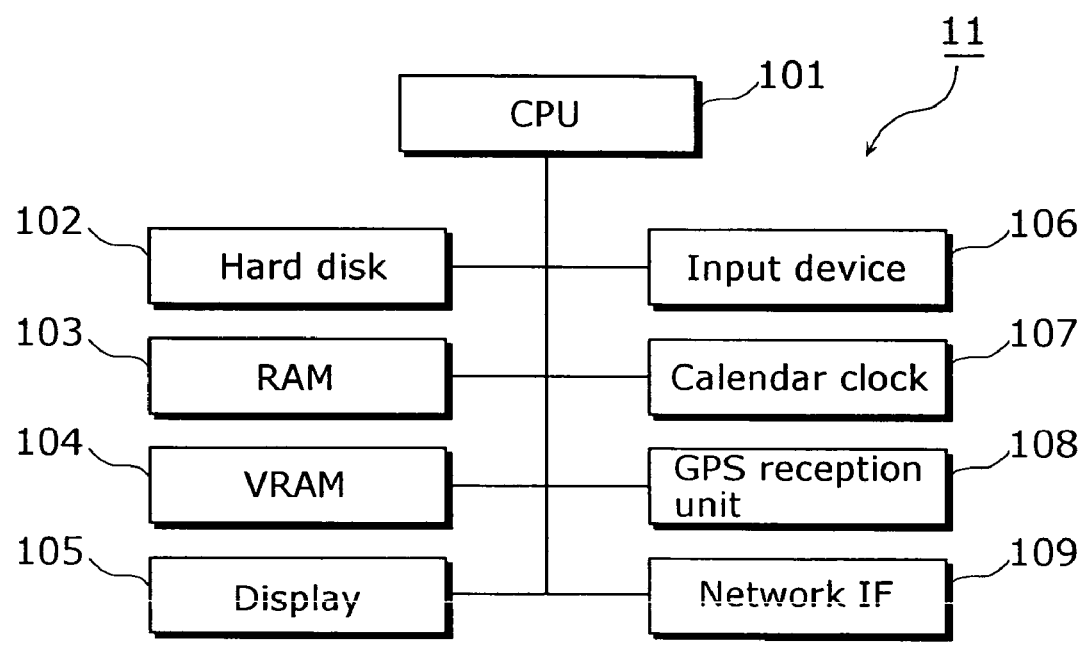
FIG. 2 is a block diagram showing a hardware structure of the mobile terminal that uses the location prediction method A.
Figure 3:
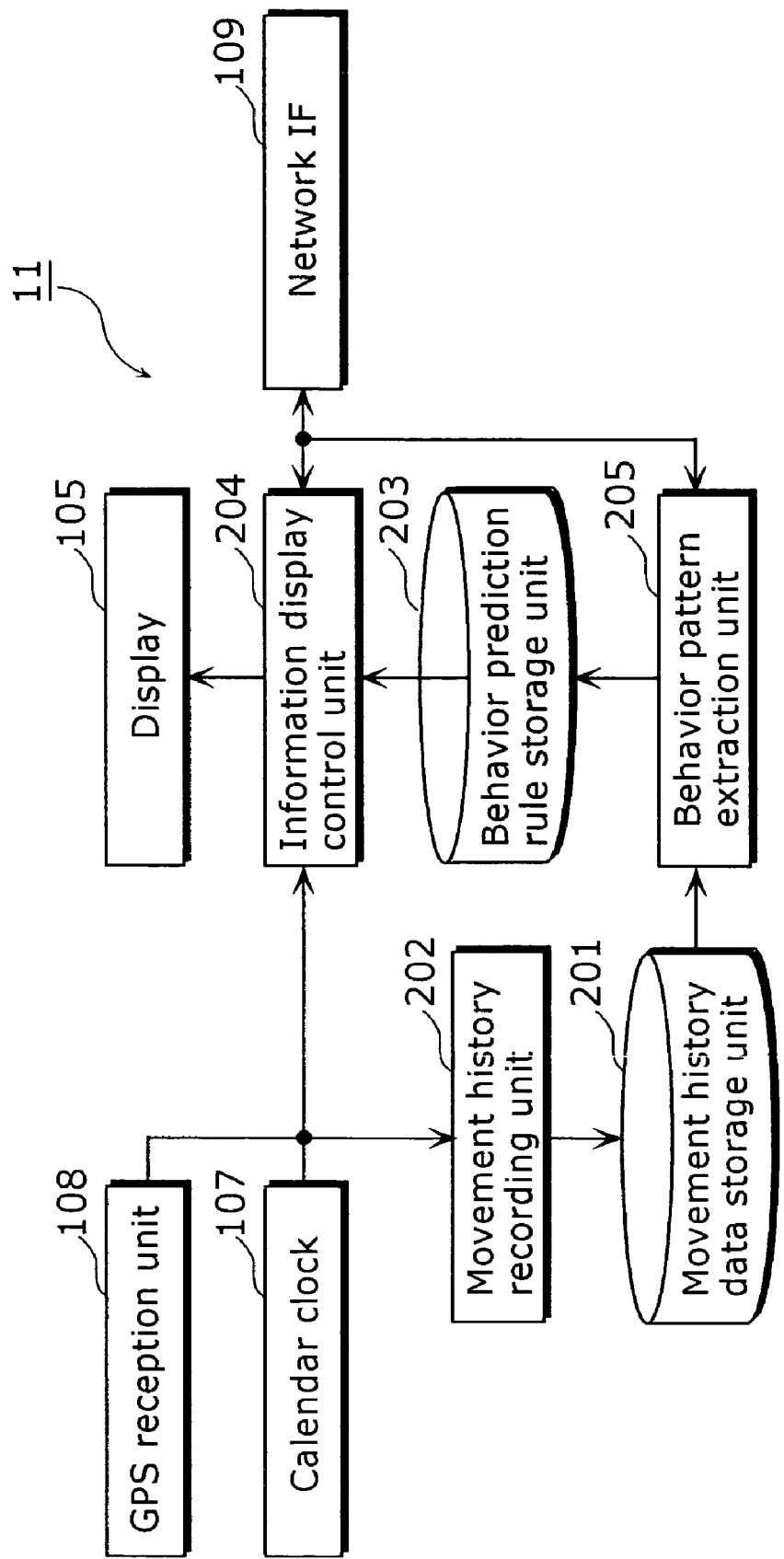
FIG. 3 is a functional block diagram showing a functional structure of the mobile terminal that uses the location prediction method A.

FIG. 2 is a block diagram showing a hardware structure of the mobile terminal 11, and FIG. 3 is a functional block diagram showing a functional structure of the mobile terminal 11.

As shown in FIG. 2, the mobile terminal 11 has a hardware structure including a CPU 101, a hard disk 102, a RAM 103, a VRAM 104, a display 105, an input device 106, a calendar clock 107, a GPS reception unit 108 and a network IF 109.

As shown in FIG. 3, the mobile terminal 11 has a functional structure including the display 105, the GPS reception unit 108, the calendar clock 107, the network IF 109, a movement history data storage unit 201, a movement history recording unit 202, a behavior prediction rule storage unit 203, an information display control unit 204 and a behavior pattern extraction unit 205. In FIG. 2 and FIG. 3, the same reference numbers are assigned to the same components.

In FIG. 2, the CPU 101 is connected to each of the components of the mobile terminal 11, and controls the overall operations of the mobile terminal 11. The hard disk 102, the RAM 103 and the VRAM 104 hold data. The input device 106 is a button or a key for executing various operations of the mobile terminal 11. The display 105, the calendar clock 107, the GPS reception unit 108 and the network IF 109 are described later.

In FIG. 3, the GPS reception unit 108 is a GPS receiver or the like, and detects the location of the mobile terminal 11.

The calendar clock 107 measures the current calendar attributes (year, month, day, day of the week, and time), and outputs them.

The movement history recording unit 202 records the movement history of the mobile terminal 11 into the movement history data storage unit 201 based on the current location of the mobile terminal 11 outputted from the GPS reception unit 108 and the current calendar attributes outputted from the calendar clock 107.

The behavior pattern extraction unit 205 extracts a behavior pattern of the user of the mobile terminal 11 based on the movement history recorded in the movement history data storage unit 201 and the information obtained from the server apparatus 12 via the network IF 109, creates a user's behavior prediction rule (a movement history organized in a predetermined format), and records it in the behavior prediction rule storage unit 203.

The information display control unit 204 displays, on the display 105, the information obtained from the server 12 via the network IF 109, with appropriate timing, based on the current location or the current calendar attribute outputted from the GPS reception unit 108 or the calendar clock 107 as well as the behavior prediction rule held in the behavior prediction rule storage unit 203.

Figure 4:
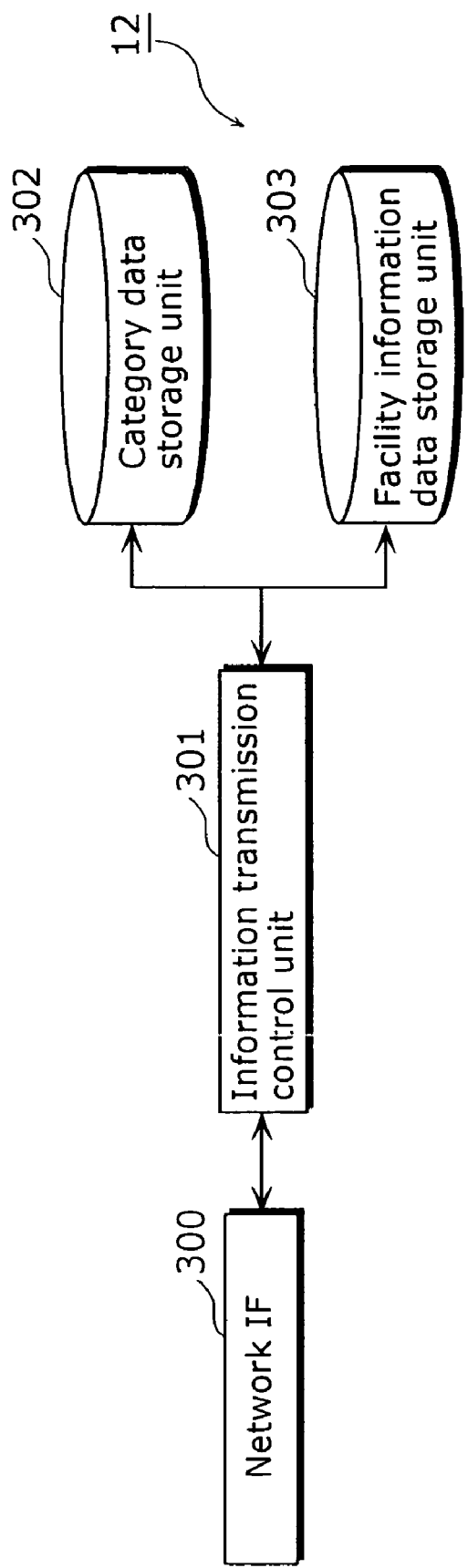
FIG. 4 is a functional block diagram showing a functional structure of the server apparatus.

FIG. 4 is a functional block diagram showing a functional structure of the server apparatus 12.

As shown in FIG. 4, the server apparatus 12 includes a network IF 300, an information transmission control unit 301, a category data storage unit 302 and a facility information data storage unit 303.

The information transmission control unit 301, in response to a request from the mobile terminal 11, transmits the data stored in the category data storage unit 302 and the facility information data storage unit 303 via the network IF 300.

In the category data storage unit 302, category data indicating correspondence between respective facilities and categories to which the facilities belong is stored.

FIG. 13 is a diagram showing category data. This category data 302a is the data indicating correspondence between respective facilities identified by facility identifiers and categories to which the facilities belong. For example, the data indicates that a facility 1 belongs to a category of restaurants, while a facility 4 belongs to a category of book stores.

In the facility information data storage unit 303, facility information data and category-by-category facility information data that indicate correspondence between respective facilities and information relating to the facilities are stored.

FIG. 12 is a diagram showing facility information data. In this facility information data 303a, the names of respective facilities 1, 2 . . . identified by the facility identifiers and the latest information thereof are recorded. For example, the facility 1 is "Boss Burger Keihanna", and "Croquette Burger ¥190 Now on Sale . . . " is recorded as the latest information.

FIG. 14 is a diagram showing category-by-category facility information data. As shown in FIG. 14, in this category-by-category facility information data 303b, the facility names, location information and latest information are recorded by category such as a restaurant and a pub.

The operations of the information providing system 10 configured as such are explained below.

Figure 5:
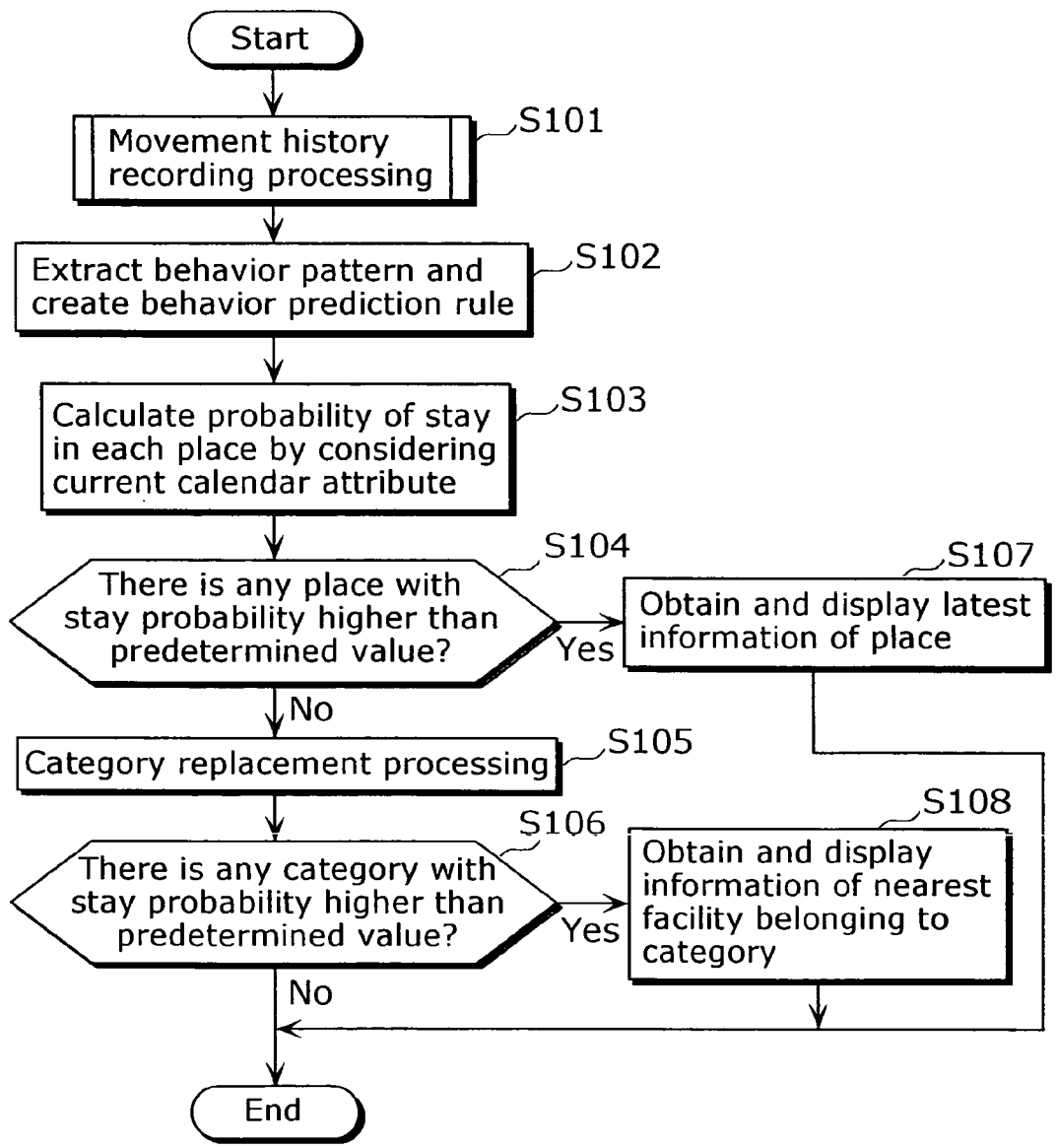
FIG. 5 is a flowchart showing operations of the information providing system.

FIG. 5 is a flowchart showing the operations of the information providing system.

First, the movement history recording unit 202 records the movement history of the mobile terminal 11 (Step S101). The details of this recording processing of the movement history are explained using FIG. 6 to FIG. 9.

Figures 6, 7:
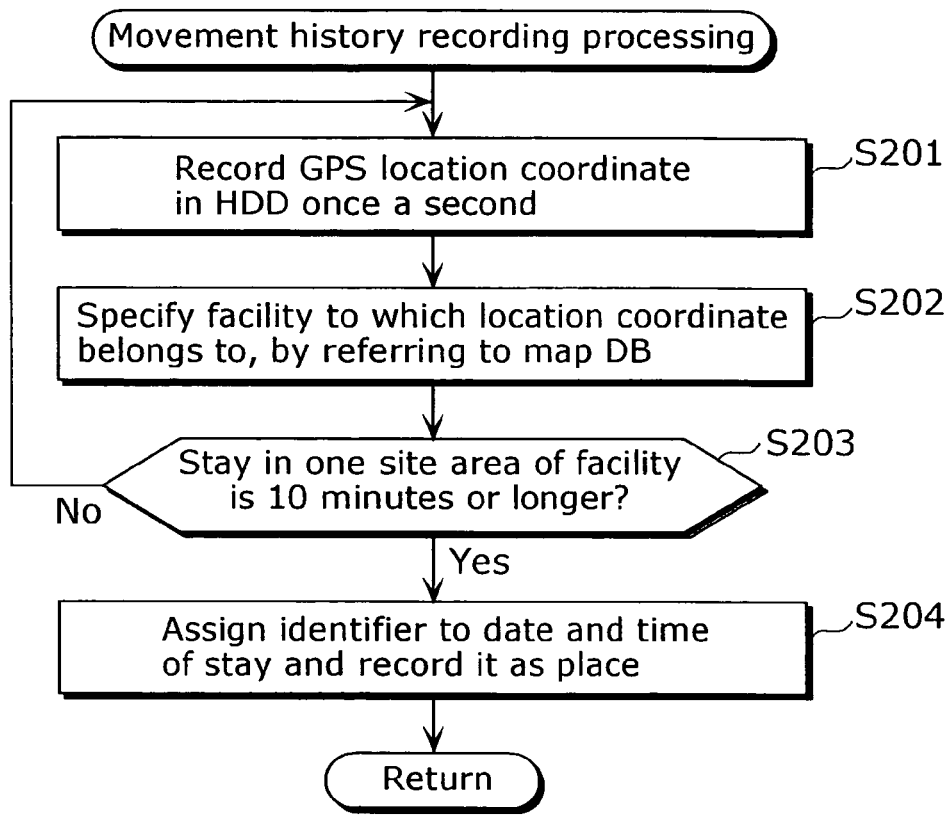
FIG. 6 is a flowchart showing detailed operations for recording processing of a movement history of the mobile terminal.
FIG. 7 is a diagram showing the movement history of the mobile terminal.

FIG. 6 is a flowchart showing the detailed operations for the recording processing of the movement history of the mobile terminal 11.

First, the movement history recording unit 202 records the location of the mobile terminal 11 and the date and time onto the hard disk HDD of the movement history data storage unit 201 once a second, based on the outputs from the GPS reception unit 108 and the calendar clock 107 (Step S201).

FIG. 7 is a diagram showing the movement history of the mobile terminal 11. As shown in FIG. 7, the location coordinate of the mobile terminal 11 corresponding to the date and time is recorded per second. For example, it shows that the mobile terminal 11 is located at E1 east longitude and N1 north latitude at 10:23:34 a.m. on Tuesday, Feb. 4, 2003.

Next, the movement history recording unit 202 specifies to which facility site area the recorded location coordinate of the mobile terminal 11 belongs, by referring to the map database (map DB) (Step S202).

FIG. 8 is a diagram showing a map database.

The map database of FIG. 8 shows the correspondence between facility identifiers for identifying facilities such as Facility 1 and Facility 2 and site areas corresponding to the respective facilities.

The facility identifiers such as Facility 1 and Facility 2 indicate the facilities such as AC School and CD Shop. The site area indicates, in the case of the facility 1, a rectangular area of 10 m wide by 10 m long with its upper-left coordinate of e1 east longitude and n1 north latitude.

For example, if a location coordinate (E1 east longitude and N1 north latitude) shown in FIG. 7 is in the rectangular area of 10 m wide by 15 m long with its upper-left coordinate of e3 east longitude and n3 north latitude, the location coordinate corresponds to the facility 3.

Since a site area is indicated in order to specify a partition, it may be indicated by the reference coordinate (at A north latitude and B east longitude) as shown in FIG. 8, or a representative coordinate (at C north latitude and D east longitude) and the shape of the partitioned area including that coordinate (a rectangle of X km wide by Y km long, or a triangle). Or, it may be indicated by a range of each partition (E to F north latitude and G to H east longitude), a reference coordinate (A north latitude and B east longitude) and a distance from the reference coordinate (Y km vertically and X km horizontally, or Rkm in radius), or an area enclosed by straight lines drawn by connecting a plurality of designated representative coordinates (A north latitude and B east longitude and others).

Additionally, location coordinates may be previously set based on regional information such as prefectures, municipalities, addresses and zip codes. Furthermore, it is also possible to make rough division based on the above regional information and then make above-mentioned detailed partition.

This map database may be stored in the movement history recording unit 202, or stored in the server 12.

Next, the movement history recording unit 202 judges, based on the movement history recorded in the movement history data storage unit 201, whether or not there is a stay in one site area (facility identified in Step S202) of 10 minutes or longer (Step S203). If there is no stay of 10 minutes or longer (No in Step S203), it goes back to the process of recording the location coordinate (Step S201), and if there is a stay of 10 minutes or longer (Yes in Step S203), it assigns a facility identifier to the date and time of the stay and records them as a "place" (place of stay) (Step S204).

FIG. 9 is a diagram showing one example of a list indicating the recorded locations.

As shown in FIG. 9, in a location list 130, locations of stays of 10 minutes or longer are recorded as "places", in association with dates and times. For example, it shows that there was a stay in a facility 2 during a time period from 18:00 to 18:20 on Saturday, Feb. 1, 2003.

After the above-mentioned processing of recording the movement history (Step S101 in FIG. 5), the behavior pattern extraction unit 205 extracts the behavior patterns of the user of the mobile terminal 11 based on the location list 130 stored in the movement history data storage unit 201, and creates behavior prediction rules (Step S102).

The extraction of behavior patterns is explained.

The behavior pattern extraction unit 205 categorizes the dates and times of stays in newly recorded locations into six, namely, morning, daytime and night on weekdays, and morning, daytime and night on holidays, and calculates the number of stays in each location on each category of dates and times. Here, weekdays shall be Monday through Friday, and holidays shall be Saturday and Sunday, and morning, daytime and night shall be, for example, from 6:00 a.m. through noon, from noon through 6:00 p.m., and from 6:00 p.m. through 6:00 a.m. next morning.

Figures 10, 11:
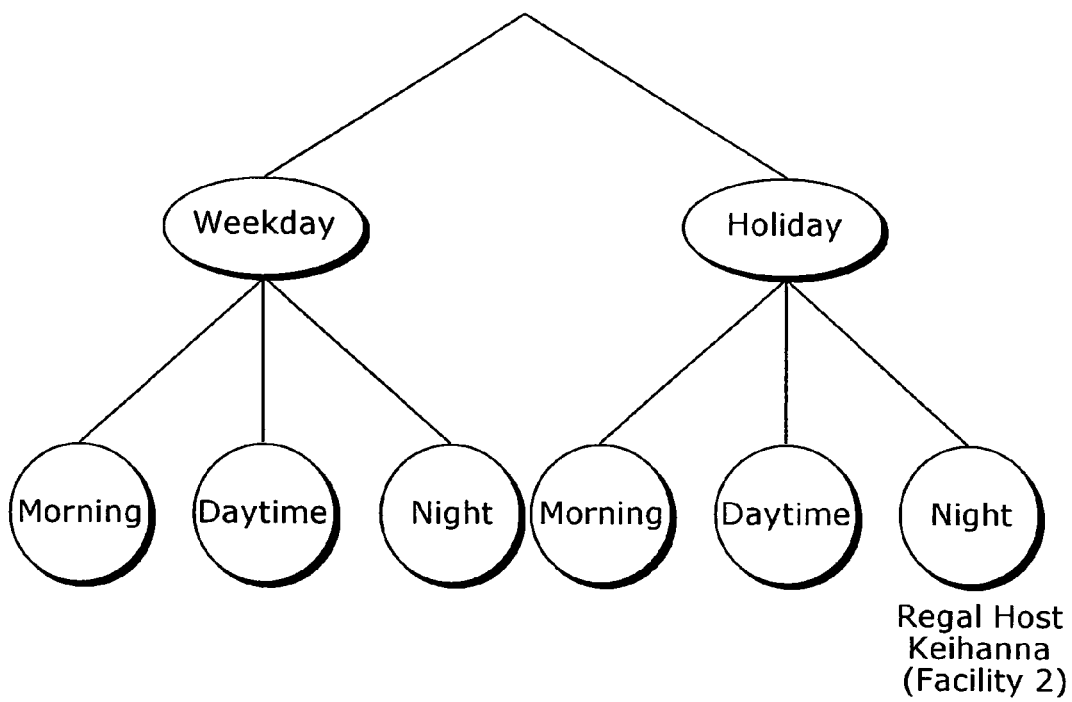
FIG. 10 is a diagram for explaining a method of extracting a behavior pattern.
FIG. 11 is a diagram showing one example of behavior prediction rules.

FIG. 10 is a diagram for explaining a method of extracting a behavior pattern.

The behavior pattern extraction unit 205 categorizes the date and time of a stay in a facility 2 recorded in the location list 130 (the date and time of the stay (from 18:00 to 18:20 on Saturday, Feb. 1, 2003) as either a weekday or a holiday. Since the date of stay is Saturday, it is categorized as a holiday. Next, the behavior pattern extraction unit 205 categorizes the date and time of the stay as any one of morning, daytime and night. Since the time period is from 18:00 to 18:20, it is categorized as night. As a result, a behavior pattern in which the user of the mobile terminal 11 stayed in the facility 2 on a holiday night is extracted.

As described above, the behavior pattern extraction unit 205 extracts a user's behavior pattern from a newly recorded place so as to create a behavior prediction rule, and records it in the behavior prediction rule storage unit 203.

FIG. 11 is a diagram showing one example of behavior prediction rules. In FIG. 11, the dates and times indicate the dates and times categorized as mentioned above (holiday night, weekday daytime and the like), and the locations of stays indicate "places". And the number of stays (frequency of stays) and probability of stay in each place on each categorized date and time are recorded.

For example, in a category of holiday nights, it is obtained from the past movement history that the number of stays in the facility 1 is 78, the number of stays in the facility 2 is 45, and the number of stays in the facility 3 is 13. Those in other facilities are not mentioned here. And in the category of holiday nights, the probability of stay in the facility 1 is 52%, the probability of stay in the facility 2 is 30%, and the probability of stay in the facility 3 is 8%.

The behavior pattern extraction unit 205 extracts a behavior pattern and creates a behavior prediction rule as mentioned above every time a new place is recorded.

Next, the information display control unit 204 obtains the current year, month and day, day of the week, time (calendar attributes) from the calendar clock 107, and calculates, based on the behavior prediction rule 140 stored in the behavior prediction rule storage unit 203, the probability that the user of the mobile terminal 11 stays in each place when a predetermined time period has elapsed from the current time (for example, 30 minutes later) (Step S103). In more detail, it checks to which category, such as holiday night and weekday daytime, the 30 minutes later the current time belongs, calculates the probability of stay in each place at that time of day, and as a result, predicts the user's behavior.

For example, it is assumed that the current date and time is 17:45 on Saturday, Feb. 15, 2003. Since the date and time of 30 minutes later (18:15 on Saturday, Feb. 15, 2003) belongs to a holiday night, the information display control unit 204 calculates, based on the behavior prediction rule 140 stored in the behavior prediction rule storage unit 203, the probabilities of stays in respective places on holiday night, such as the probabilities of stays in the facilities 1, 2 and 3 being 52%, 30% and 8% respectively.

Next, the information display control unit 204 judges whether or not there is any place with the probability higher than a predetermined value (for example, 70%) among the obtained probabilities of stays in respective places (Step S104). If there is such a place with the probability higher than the predetermined value (Yes in Step S104), it obtains the latest information of that place from the facility information data storage unit 303 of the server apparatus 12, displays it on the display 105 (Step S107), and terminates the processing.

On the other hand, if there is no such place with the probability higher than the predetermined value (No in Step S104), the information display control unit 204 replaces respective places with the obtained probabilities with categories based on the category data 302a stored in the category data storage unit 302 of the server apparatus 12 (Step S105).

As a result of this replacement into categories, the probabilities of stays are, in the above-mentioned example, 52% for a restaurant as the facility 1, 30% for another restaurant as the facility 2 and 8% for a cafe as the facility 3, and thus the probabilities of stays are 82% for a place belonging to a category of restaurants and 8% for a category of cafes.

Then, the information display control unit 204 judges whether or not there is any category with the probability higher than a predetermined value (for example, 70%) among the probabilities of stays in respective categories (in Step S106), and if there is no such category (No in Step S106), it terminates the processing.

On the other hand, if there is a category with the probability higher than the predetermined value (Yes in Step S106), the information display control unit 204 obtains the current location of the mobile terminal 11 from the GPS reception unit 108, obtains the information of the nearest facility belonging to the category from the facility information data storage unit 303, displays them on the display 105, and terminates the processing.

In the above-mentioned example, the probability of stay in a category of restaurants is 82%, which exceeds the predetermined value of 70%. Therefore, the information display control unit 204 extracts facilities at which a user will be able to arrive 30 minutes later (19:15) (for example, restaurants where the user has stayed at 18:00 or later), from among the facilities belonging to the category of restaurants based on the user's movement history (See FIG. 9), and displays a plurality of candidates on the display 105. It further selects a facility where the user has often stayed recently, and displays it as a recommended facility.

Figure 15A:
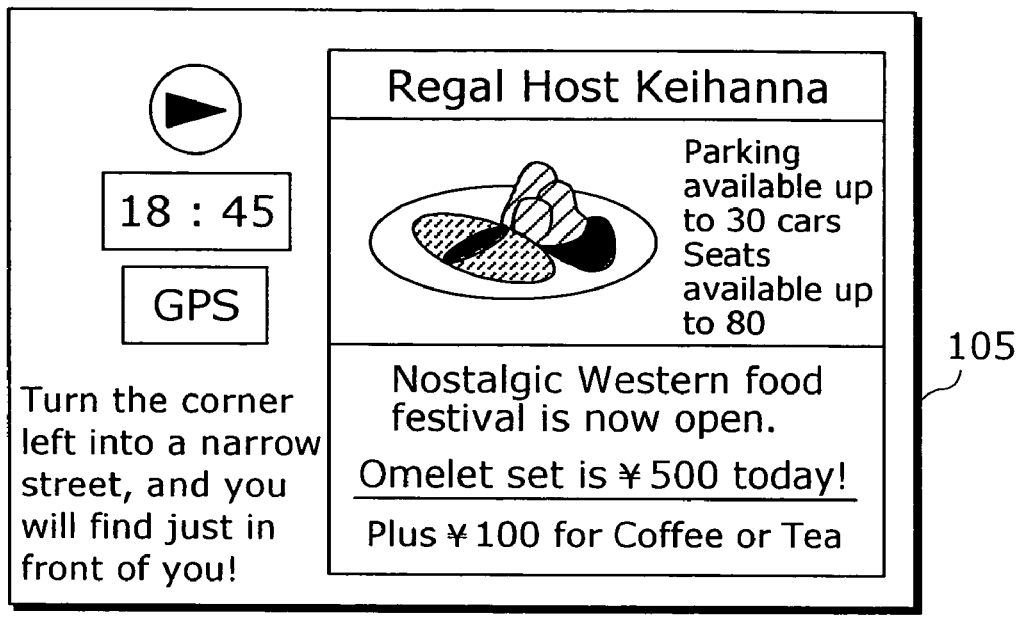
FIG. 15A is a diagram showing an example of detailed information shown on a display.
Figure 15B:
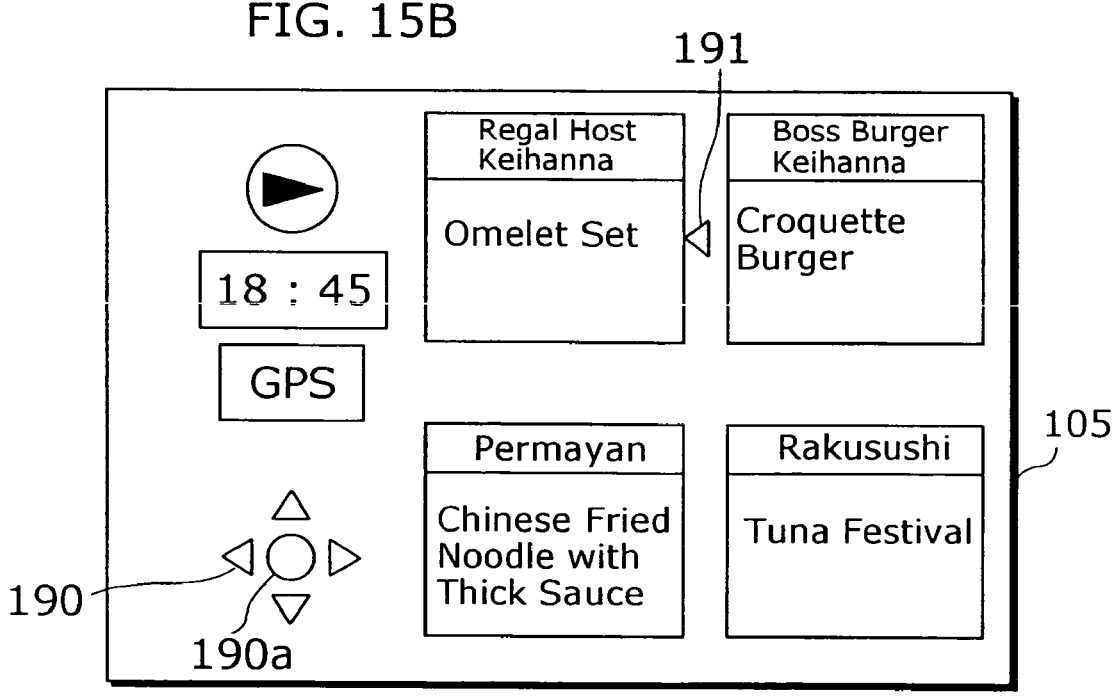
FIG. 15B is a diagram showing another display example.

FIG. 15B is a diagram showing an example of a screen displayed on the display 105. On the display 105, a plurality of facilities belonging to a category of restaurants (Regal Host Keihanna, Boss Burger Keihanna, Permayan and Rakusushi) are displayed as candidates. Furthermore, as a recommended facility, "Regal Host Keihanna" where the user has often stayed recently is indicated by a cursor 191. It may be indicated by inverting the display of "Regal Host Keihanna", instead of being indicated by the cursor 191. Information of each candidate (such as an omelet set and a Chinese fried noodle with thick sauce) indicates the summary of the detailed information of each candidate which is to be displayed when selecting it.

The user selects a candidate from among the facility candidates displayed on the display 105 by operating an operation unit 190 that is a touch panel, sets the cursor 190 at the desired facility, and determines the selected candidate by operating a determination operation unit 190a at the center thereof. For example, when the user selects "Regal Host Keihanna", the detailed information such as the latest information thereof is displayed on the display 105.

FIG. 15A shows an example of detailed information displayed on the display. As shown in FIG. 15A, the detailed information "Nostalgic Western food festival . . . " of "Regal Host Keihanna" is displayed on the display 105. Here, congestion information or the like of the road leading to "Regal Host Keihanna" may be displayed.

In addition, it is also possible to extract, based on the past movement history (See FIG. 9), facilities where a user will be able to arrive within 30 minutes, from among the facilities belonging to the category of restaurants, and further extract facilities (belonging to the category of restaurants) in the vicinity of the extracted facilities, from the category-by-category facility information data 303b (See FIG. 14) stored in the server apparatus 12.

As described above, the mobile terminal 11 that uses the location prediction method A predicts, based on the past movement history, the location where the user of the mobile terminal 11 is likely to stay after a lapse of a predetermined time period, using the current calendar attribute (year, month and day, day of the week and time). Furthermore, the mobile terminal 11 is able to obtain in good timing the information that the user is likely to need, using the prediction result.

Furthermore, this mobile terminal 11 provides not only the information concerning the location where the user is likely to stay with high probability based on the user's past movement history, but also the information concerning the locations belonging to the same category as that of the location where he is likely to stay with high probability, so the user can obtain a lot of information that he is likely to need.

Note that the mobile terminal 11 uses fixed time categories, such as weekdays and holidays, morning, daytime and night, for extracting a behavior pattern, but a behavior pattern may be extracted using a method of changing the time categories dynamically (clustering method) based on the user's behavior patterns. For example, in the case where there are two user's behavior patterns for Sundays through Wednesdays and Thursdays through Saturdays, the behavior patterns from Sundays through Wednesdays and from Thursdays through Saturdays may be used.

Or, it is also possible not to determine a facility but to predict locations to stay at a time later than the current time from the calendar attribute and a location movement history.

Additionally, in this method, the behavior of the user of the mobile terminal 11 at a time 30 minutes later than the current time is predicted, but the present invention is not limited to the time period of 30 minutes, and it may be 10 minutes or 1 hour.

Furthermore, categories may further be subdivided for fitting a user's taste. For example, a category of restaurants may be subdivided into Japanese food, Western food and Chinese food.

Or, the condition for determining a place is a stay in the same site area for a predetermined time period or more (10 minutes or more in the above explanation), but a place may be determined when the time period of the stay is the predetermined time or more and the number of stays is a predetermined number or more.

In addition, in the case where the mobile terminal 11 is mounted in a car, a location where the car is parked (a location where the engine is stopped) may be recorded as a place, or a location where the car is stopped by pulling the parking brake for a predetermined time period may be included.

Furthermore, this mobile terminal 11 previously calculates, as a user's behavior prediction rule, the probability of the user's stay in each place in each time category, but in general, it may accumulate history records of user's stays in each place in each time category, calculate the probability of stay in each place at the point of time when it obtains the current time, and then display the information based on that probability.

In addition, as for the location coordinate data obtained from the above-mentioned GPS reception unit 108, it is possible to improve the accuracy thereof by using it after modifying the error using an acceleration sensor or map matching.

Furthermore, this mobile terminal 11 performs, in parallel, recording of a movement history, creation of a behavior prediction rule and prediction of a location where the mobile terminal (user) is likely to stay. However, if the movement history records and the behavior prediction rules are previously accumulated, it may perform only the prediction of the location to stay based on those movement history records and the behavior prediction rules.

(2. Mobile Terminal Using Location Prediction Method B)

Next, a mobile terminal that uses the location prediction method B is explained.

The mobile terminal 11 that uses the location prediction method A predicts, based on the current time, a place where a user is likely to stay in the future from the previously recorded movement history of the mobile terminal 11, and further displays the information concerning the location to stay. On the other hand, the mobile terminal that uses the location prediction method B predicts, based on the current time and location, a place where a user is likely to move in the future from the previously recorded movement history of the mobile terminal 11, and further displays the information concerning the location to move to.

The overall configuration of an information providing system including a mobile terminal that uses this location prediction method B is same as that in FIG. 1, and the hardware structure and the functional structure of the mobile terminal are same as those in FIG. 2 and FIG. 3, so the explanation thereof is not repeated here. Also, since the server apparatus is same as that in FIG. 4, the explanation thereof is not repeated here.

Furthermore, the mobile terminal 11 that uses the location prediction method A is an in-car apparatus mounted in a car navigation system, while the mobile terminal that uses the location prediction method B is a mobile phone equipped with GPS.

Here, the operations of the information providing system including the mobile terminal that uses the place prediction method B are explained.

Figure 16:
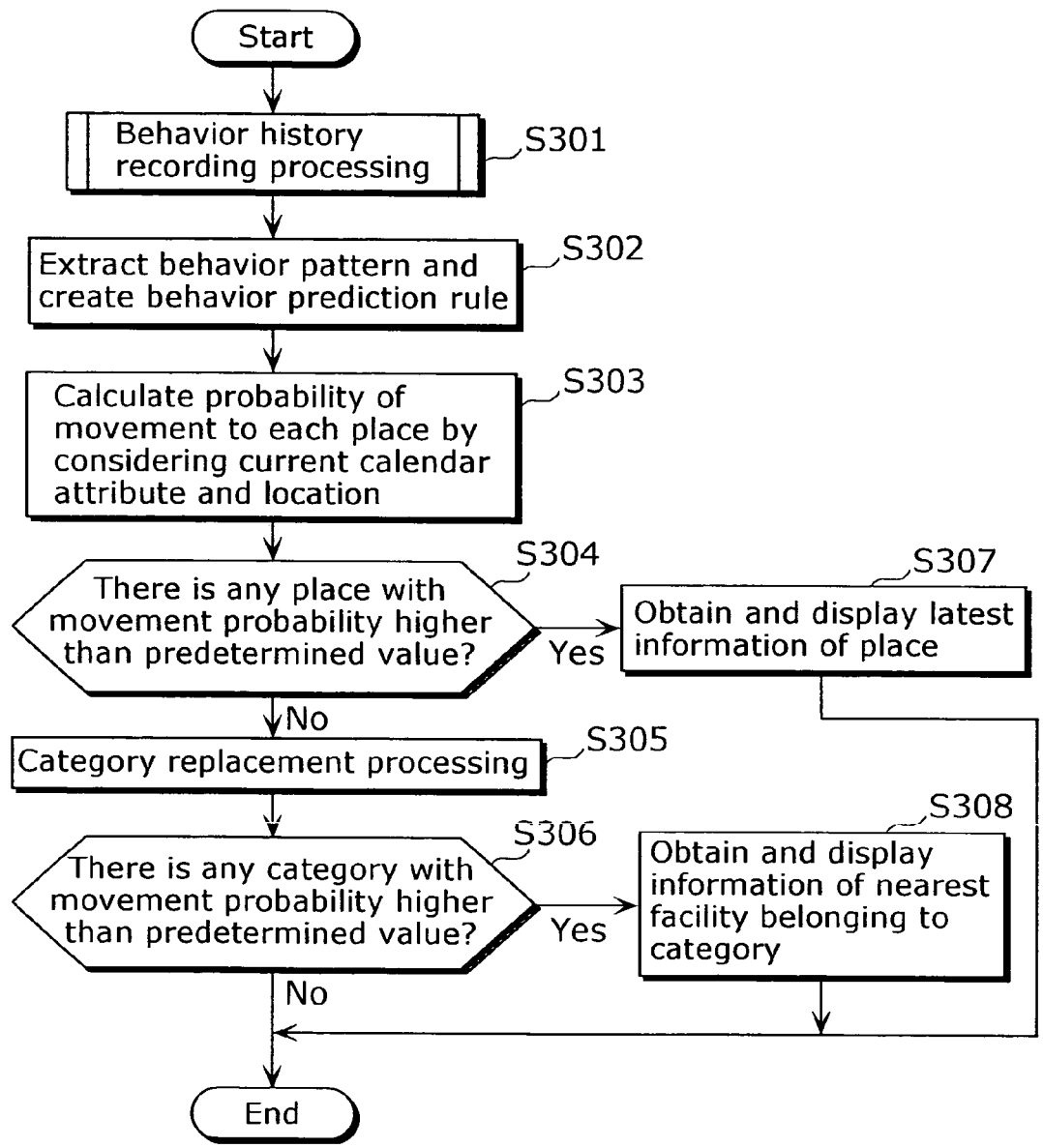
FIG. 16 is a flowchart showing operations of the information providing system including a mobile terminal that uses a location prediction method B.

FIG. 16 is a flowchart showing the operations of the above-mentioned information providing system.

Firstly, the movement history recording unit 202 records the movement history of the mobile terminal 11 (Step S301). This processing of recording the movement history is almost same as the above-mentioned processing of the mobile terminal that uses the location prediction method A (See FIG. 6). They are different in that in the case where a time period of a stay within one site area is 10 minutes or more, the mobile terminal that uses the location prediction method A assigns an identifier to the date and time of the stay and records it as a place (Step S204 in FIG. 6), while the mobile terminal of the location prediction method B further records a route from one place to another place as a path (an interval between places to stay).

Figure 17:
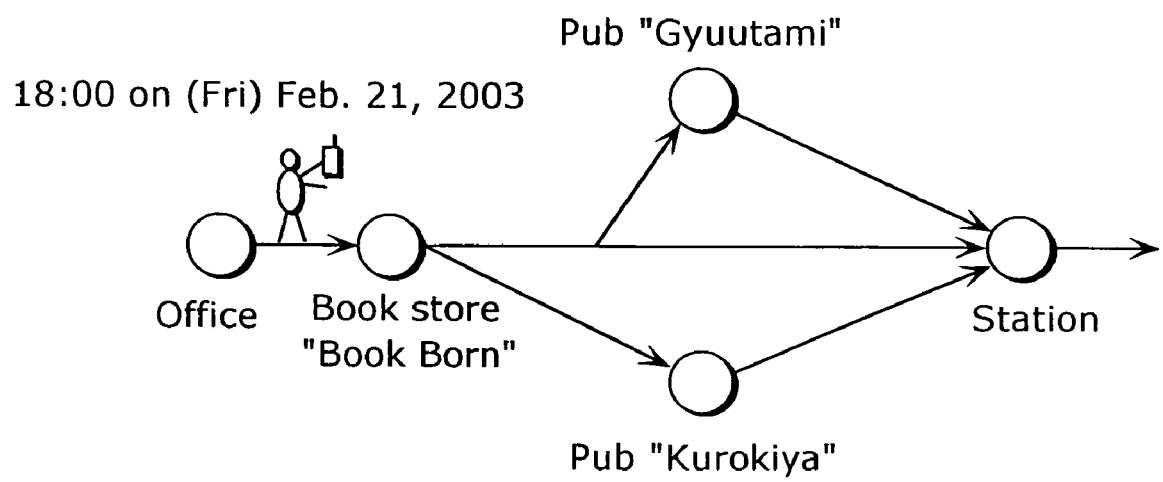
FIG. 17 is a schematic diagram showing an example of a movement history of the user of the mobile terminal.

FIG. 17 is a schematic diagram showing one example of the movement history of the user of the mobile terminal.

FIG. 17 shows three patterns of a user's past movement history records: a pattern in which the user left the office, stays at a bookstore "Book Born" and left for the station; a pattern in which the user left the office, stays at the bookstore "Book Born", further stays at a pub "Gyuutami" and left for the station; and a pattern in which the user left the office, stays at the bookstore "Book Born", further stays at a pub "Kurokiya". Here, it is assumed that the bookstore "Book Born" is located near the office, and the user always makes a stop at the bookstore on his way home from work.

FIG. 18 shows an example of a list indicating recorded places and paths.

As shown in FIG. 18, in a place/path list 230, the locations where a user stays for 10 minutes or more are recorded as "places" and further the route between such places are recorded as "paths", which are associated with the dates and times.

For example, a facility A0 (office) that is the location where the user stayed during a time period from 9:00 to 18:00 on Friday, Feb. 7, 2003 is recorded as a place, and a facility 4 (Book Born) that is the location where the user stayed during a time period from 18:10 to 18:30 on Friday, Feb. 7, 2003 is recorded as another place. Furthermore, a route between the facility A0 and the facility 4 which are recorded as places (Facility A0→Facility 4) is recorded as a path.

After the processing for recording a movement history (Step S301) is performed as mentioned above, the behavior pattern extraction unit 205 extracts a behavior pattern of the user of the mobile terminal 11 based on the place/path list 230 stored in the movement history data storage unit 201 so as to create a behavior prediction rule (Step S302).

A method of extracting a behavior pattern is explained.

Figure 19:
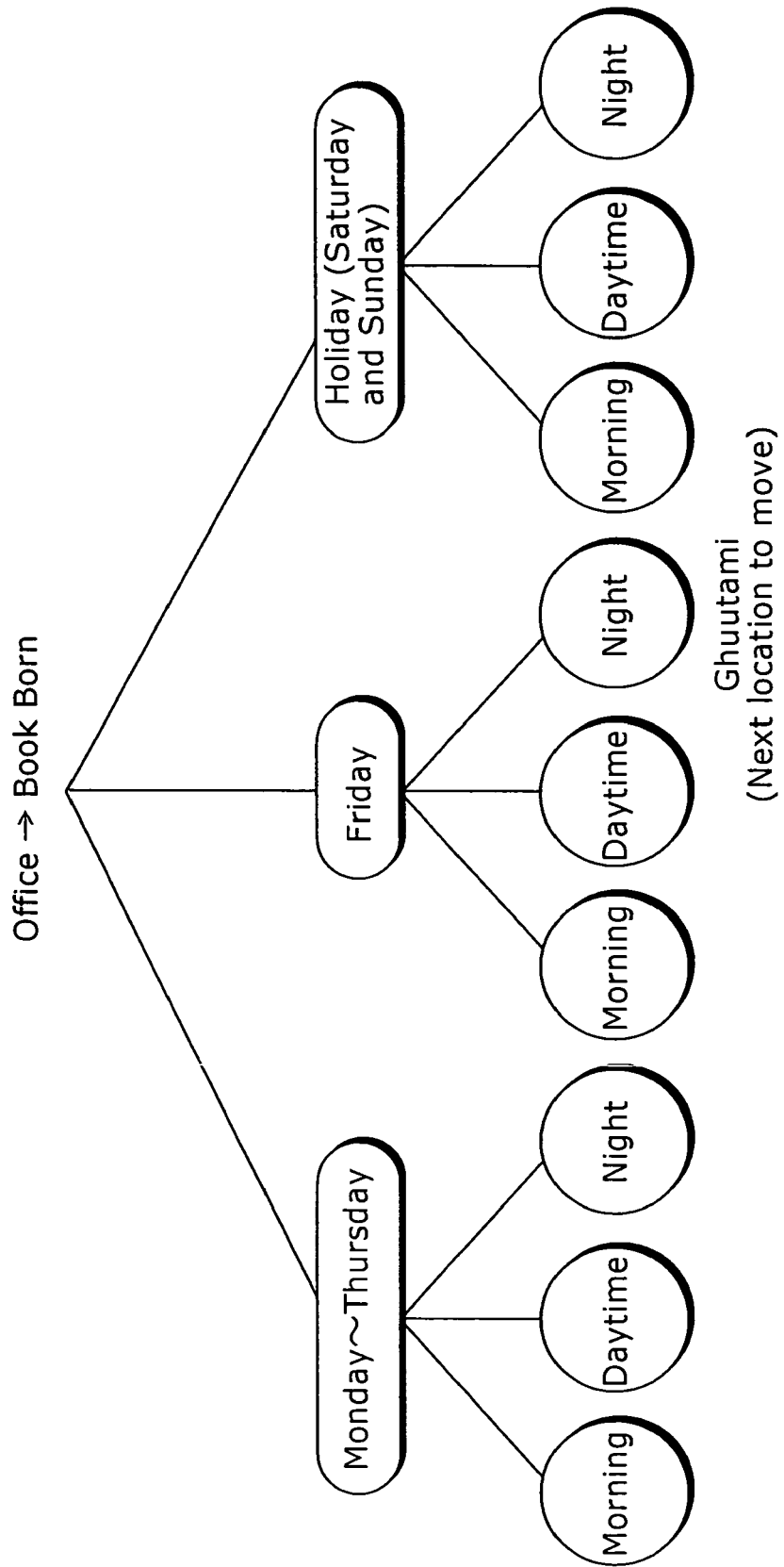
FIG. 19 is a diagram showing a method of extracting behavior patterns.

FIG. 19 is a diagram showing a method of extracting a behavior pattern.

The following is an explanation of a case, for example, where after a user passed the path from the facility A0 (office) to the facility 4 (Book Born) (namely, from 18:00 to 18:10 on Friday, Feb. 7, 2003), he stayed at the facility A1 (Gyuutami) (from 18:45 to 21:00 on Friday, Feb. 7, 2003).

As shown in FIG. 19, the behavior pattern extraction unit 205 specifies the time category to which the date and time in which the user passed the path from his office to Book Born belong, from among the following nine time categories (calendar attributes): morning, daytime and night of Mondays through Thursdays, Fridays and holidays (Saturdays and Sundays) respectively.

Since the time category in which the user passed the path from his office to Book Born is from 18:00 to 18:10 on Friday, Feb. 7, 2003, it is determined to be Friday night.

In the case where the user passed the path from his office to Book Born in the time category of Friday night, the behavior pattern in which he visits a pub "Gyuutami" next is extracted in this manner.

As just described, the behavior pattern extraction unit 205 extracts the user's behavior patterns from his movement history records whenever necessary, creates the behavior prediction rules by counting the number of movements from one location (place) to another location (place) where he visited next, for each date and time and each location (place or path) where the user existed, and records them in the behavior prediction rule storage unit 203.

FIG. 20 is a diagram showing one example of behavior prediction rules. FIG. 20 shows the locations to which the user moved next, the numbers of movements (frequency of movements) and the probability of movement for each date and time of the user's stay indicated by Date and Time (such as the date and time categorized as a Friday night) and for each location indicated by Location of his stay (place or path).

For example, FIG. 20 shows that in the case where the user existed on the path from the facility A0 (office) to the facility 4 (Book Born) on the date and time of Friday night, the number of movements to the facility A1 (a pub "Gyuutami") from that path is 45 and the probability thereof is 60%. Similarly, the number of movements to the facility A2 (a pub "Kurokiya") from that path is 15 and the probability thereof is 20%. The same applies to other cases.

Next, the information display control unit 204 obtains the current calendar attribute (year, month and day, day of the week, and time) and the current location from the calendar clock 107 and the GPS reception unit 108, and calculates the probability of movement that the user moves to each place next based on the behavior prediction rule 240 created as mentioned above (Step S303).

For example, as shown in FIG. 17, it is assumed that the current date/time is 18:00 on Friday, Feb. 21, 2003 and the current location of the user having the mobile terminal 11 is on the path from his office to Book Born. Since the current date/time belongs to Friday night and the current location belongs to the path from Office to Book Born, the information display control unit 204 calculates the probabilities that the user moves to respective places when he is on the path from the facility A0 (Office) to the facility 4 (Book Born) on Friday night, as indicated in the behavior prediction rule 240 (See FIG. 20). In this case, the probabilities to move to respective facilities, such as a 60% probability to move to the facility A1 (Pub Gyuutami), a 20% probability to move to the facility A2 (Pub Kurokiya) and a 4% probability to move to the facility A3 (Pachinko King), are calculated.

Next, the information display control unit 204 judges whether or not there exists a place with the probability higher than a predetermined value (for example, 70%) among the calculated probabilities to move to respective places (Step S304). If there exists a place with the probability higher than the predetermined value (Yes in Step S304), it obtains the latest information of that place from the facility information data storage unit 303 of the server apparatus 12, displays it on the display 15 (Step S307), and terminates the processing. This display is same as that in the mobile terminal 11 of the location prediction method A, and the data is obtained from the facility information data 303a (See FIG. 12) stored in the facility information data storage unit 303, and displayed.

On the other hand, if there exists no place with the probability higher than the predetermined value (No in Step S304), the information display control unit 204 replaces the respective places of the obtained probabilities with the categories, based on the category data 302a stored in the category data storage unit 302 of the server apparatus 12 (Step S305).

This processing for replacing with categories is same as that in the mobile terminal 11 of the server apparatus 12.

For example, the above-mentioned case where the probabilities that the user moves to the facility A1 (Gyuutami), the facility A2 (Kurokiya) and the facility A3 (Pachinko King) are respectively 60%, 20% and 4% is explained. The facility A1 (Gyuutami) is replaced with a category "Pub" based on the category data 302a as shown in FIG. 13, and the facility A2 (Kurokiya) is also replaced with the category "Pub". Although the facility A3 (Pachinko King) is not shown in FIG. 13, it is replaced with a category "Amusement place", for example. By this processing for replacing the facilities with the categories, the probability to move to the locations belonging to the category "Pub" becomes 80%.

Then, the information display control unit 204 judges whether or not there exists a category with the probability exceeding a predetermined value (for example, 70%) (Step S306), and if there exists no such category (No in Step S306), it terminates the processing.

On the other hand, if there exists a category with the probability higher than the predetermined value (Yes in Step S306), the information display control unit 204 obtains the current location of the mobile terminal 11 (user) from the GPS reception unit 108, obtains the information of the facilities which are near to the current location and belongs to the same category, from the facility information data storage unit 303, displays them on the display 105 (Step S308), and terminates the processing.

In the above example, the probability to move to the location belonging to the category "Pub" is 80%, which exceeds the predetermined value 70%. Therefore, the information display control unit 204 retrieves the facility which is nearest to the current location from the facilities belonging to the category "Pub" in the category-by-category facility information data 303b (See FIG. 14), based on the location information of the mobile terminal 11, specifies the facility A1 (Gyuutami), for example, and then displays the latest information and the like thereof on the display 105.

Figure 21:
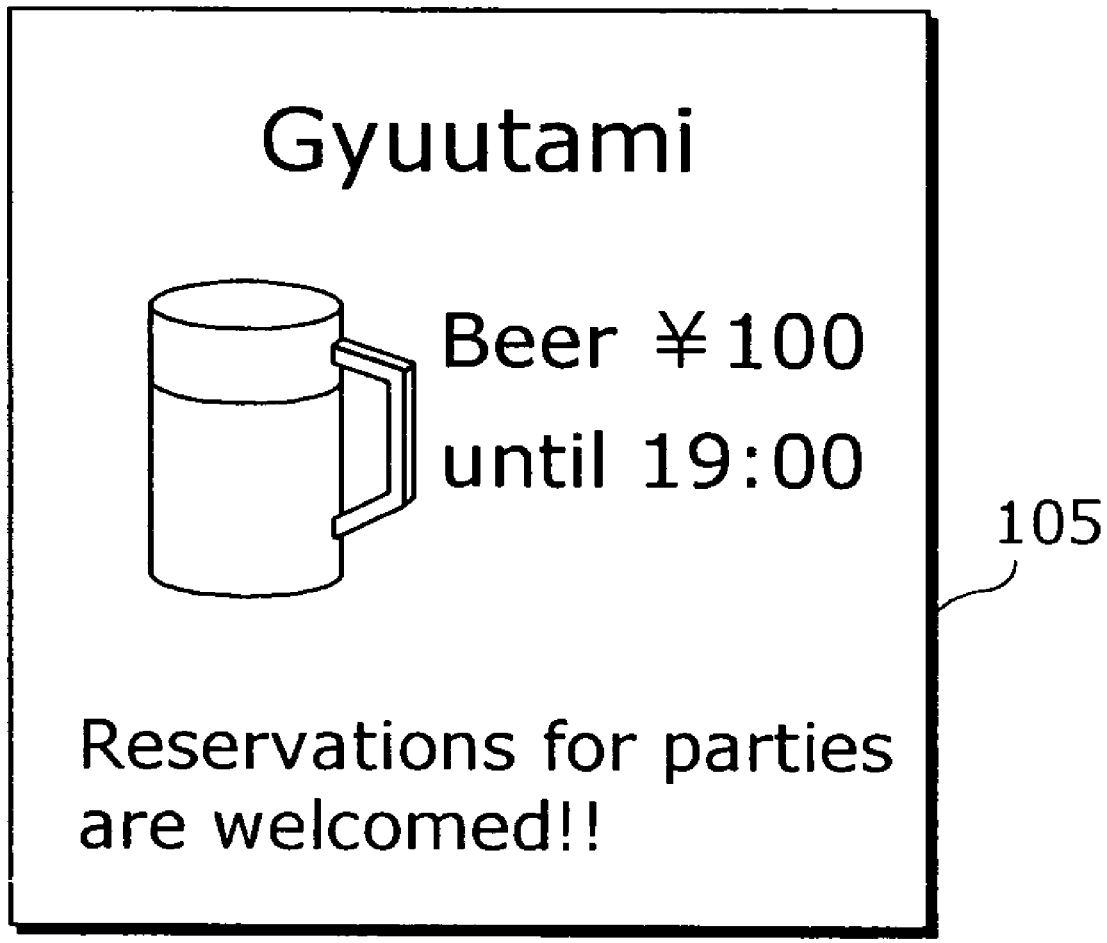
FIG. 21 is a diagram showing a display example shown on the display of the mobile terminal.

FIG. 21 is a diagram showing a display example of the display 105 of the mobile terminal 11. As shown in FIG. 21, the detailed information of "Gyuutami", namely, "Beer ¥190 until 17:00 . . . " is shown on the display 105.

In this case, information of a pub where the user has not visited before may be displayed if it is previously registered in the category-by-category facility information data 303b.

According to the mobile terminal using the above-mentioned location prediction method B, it becomes possible to predict the future location where the user of the mobile terminal 11 is likely to move after a predetermined period of time based on the current calendar attribute (year, month, day, day of the week and time) and the current place or path, and to obtain all in good timing the information that the user is likely to need, using the prediction results.

Furthermore, based on the user's past movement history, the mobile terminal 11 obtains not only the information of the location to which the user is likely to move with high probability but also the information of other locations belonging to the same category of that location to which the user is likely to move with high probability, so the user is able to obtain much more information that he is likely to need.

Note that when extracting behavior patterns, the mobile terminal 11 using the above location prediction method B sets fixed time categories such as weekdays and holidays, and morning, daytime and night. However, it is also possible to extract the behavior patterns by the method of changing the time categories dynamically based on the user's behavior patterns (i.e., the clustering method).

Furthermore, the mobile terminal 11 using the location prediction method B previously calculates, as a user's behavior prediction rule, the probability that the user of the mobile terminal 11 moves to each place in each time category. However, it is also possible to store, on a routine basis, the movement history records of the user of the mobile terminal 11 in each time category, and calculate the probability of moving to each place at the point of time when the current time and the current location of the mobile terminal 11 are obtained, so as to display the information obtained based on the movement probability.

Alternatively, the information may be notified by voice.

Additionally, as a method of specifying the location of the mobile terminal 11, it is possible to use not only the method using GPS but also other methods such as location detection using base stations (e.g., "i-area" that is a trademark registered for NTT DoCoMo) and location detection using electronic reference points.

(3. Mobile Terminal that Uses Location Prediction Method C)

In recent years, a mobile phone that is a mobile terminal has had not only a voice call function but also various functions such as e-mail communication, facility search using the Internet, search for time required up to a destination station. So, the mobile terminal that uses the location prediction method C predicts the location to which a user is likely to move (the future location of the mobile terminal), using location names (words expressing station names and places) used in text communication of the mobile phone (mobile terminal).

The following description is made on the assumption that the mobile terminal using the location prediction method C is a mobile phone.

Figure 22:
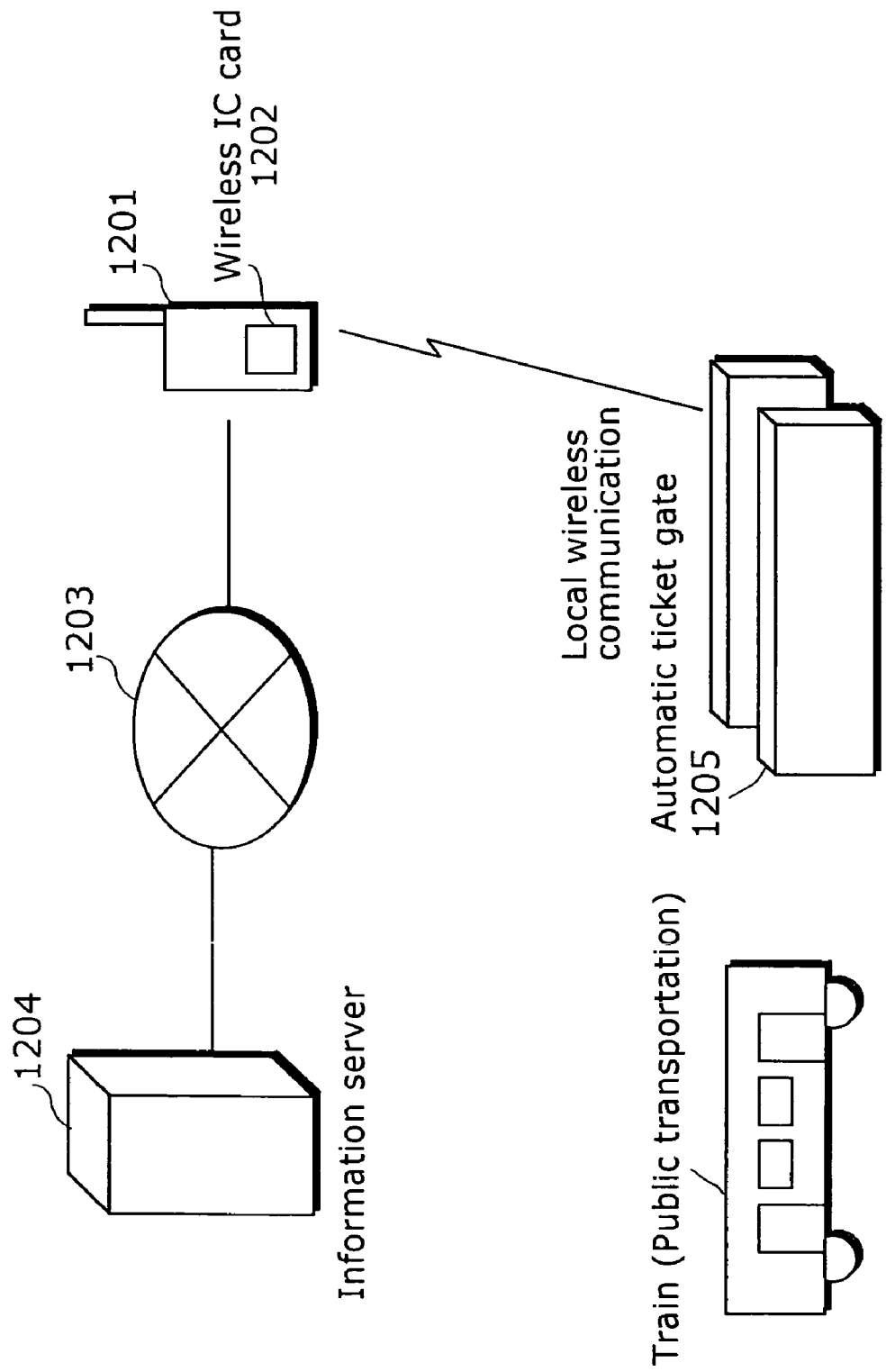
FIG. 22 is a configuration diagram showing a configuration of a system including a mobile phone that uses a location prediction method C.

FIG. 22 is a configuration diagram showing a configuration of a system including a mobile phone.

This system includes the above-mentioned mobile phone 1201 capable of doing search via voice call and networks, a wireless IC card 1202 that has a communication function via a local wireless (RF (radio frequency)) tag or the like and is mounted or integrated in the mobile phone, a public network 1203 such as the Internet, a server 1204 that performs information retrieval and information distribution, and an automatic ticket gate 1205 that communicates with the wireless IC card 1202 so as to record departure stations and route information on the wireless IC card 1202. Note that the wireless IC card 1202 may be integrated into the mobile phone, or inserted into the extended card slot of the mobile phone.

Figure 23:
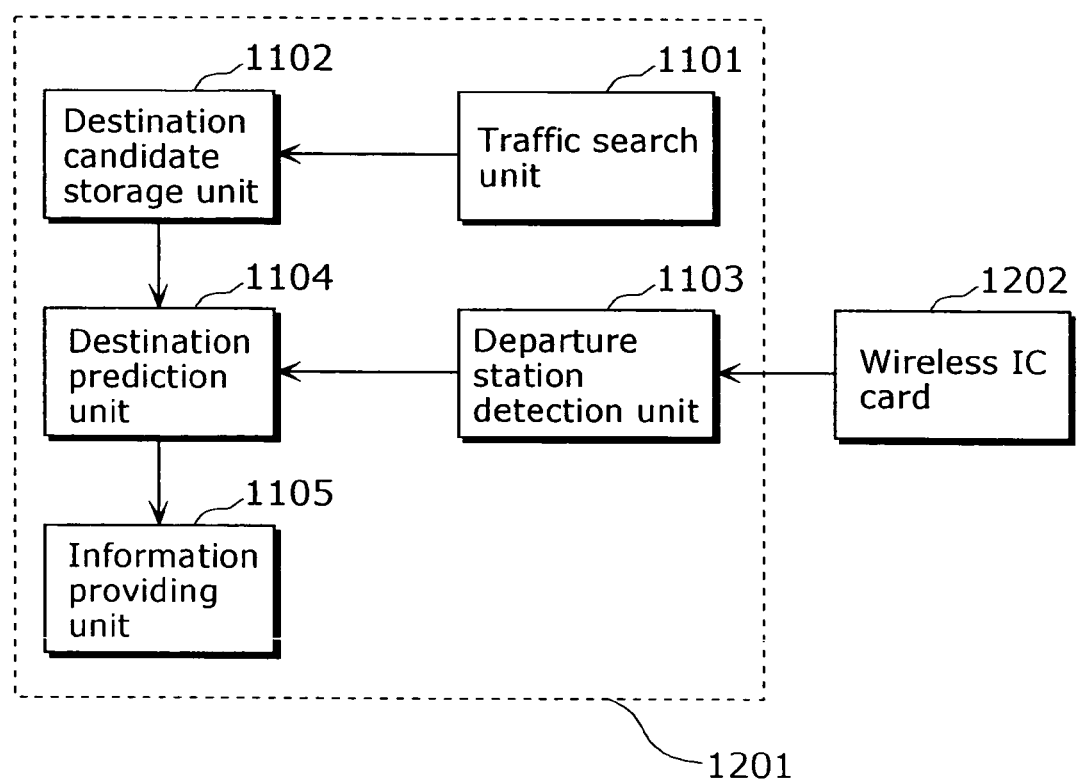
FIG. 23 is a structural diagram showing an internal structure of the mobile phone.

FIG. 23 is a structural diagram showing the internal structure of the mobile phone 1201.

The mobile phone 1201 includes a traffic search unit 110 that searches for traffic information (route) by communicating with the information server 1204, a destination candidate storage unit 1102 that stores the search results by the traffic search unit 1101, a departure station detection unit 1103 that detects a departure station, a destination prediction unit 1104 that predicts, based on the information of the departure station detected by the departure station detection unit 1103, destinations from among the candidates stored in the destination candidate storage unit 1102, and an information providing unit 1105 that provides information concerning the destination predicted by the destination prediction unit 1104.

Figure 24:
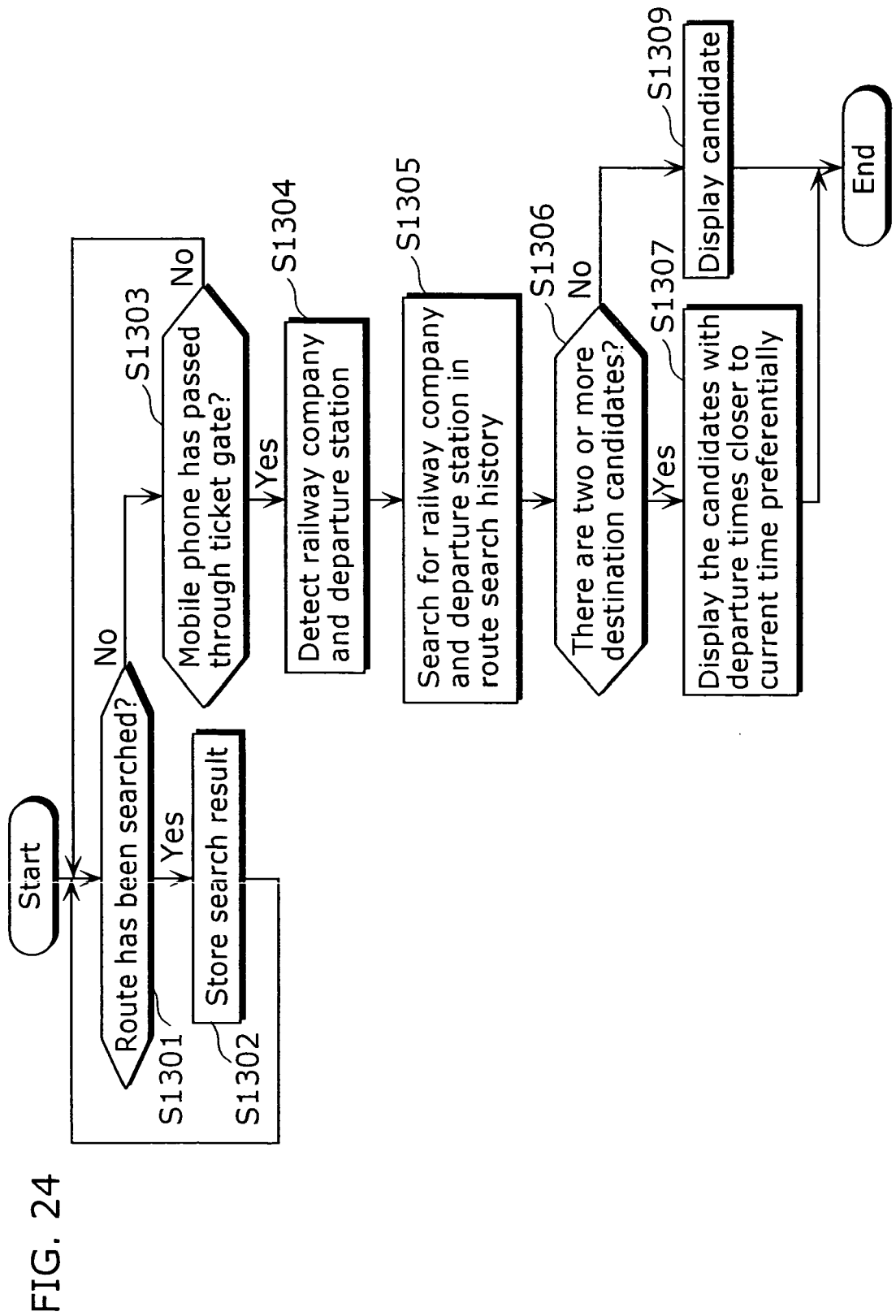
FIG. 24 is a flowchart showing operations of the mobile phone.

The operations of such a mobile phone 1201 are described by referring to FIG. 24.

FIG. 24 is a flowchart showing the operations of the mobile phone 1201.

The traffic search unit 1101 of the mobile phone 1201 judges whether or not it performed a search of a route such as a railway according to the user's operation (Step S1301). In the case where the traffic search unit 1101 performed the route search (Yes in Step S1301), it stores the search result into the destination candidate storage unit 1102 (Step S1302).

FIG. 25 is a diagram of a screen display showing one example of a screen displayed when the traffic search unit 1101 performs a route search.

As shown in FIG. 25 (A), the information concerning the departure station, the arrival station and the date and time when the user will use the route are inputted into the traffic search unit 1101 by the user's operation of the mobile phone 1201. When a route search button is selected after the information is inputted, the traffic search unit 1101 displays the result of the route search depending on the inputted information, as shown in FIG. 25 (B).

Then, the traffic search unit 1101 stores the information inputted as above and the result of the route search, as a route search history, into the destination candidate storage unit 1102.

FIG. 26 is a diagram showing the contents of the route search history stored in the destination candidate storage unit 1102.

Since the storage capacity of the destination candidate storage unit 1102 is limited, it obtains a route search history record from the traffic search unit 1101, deletes the previously stored route search history record in the order in which the records are stored, and stores the newly obtained history record preferentially.

After completing such storage, the mobile phone 1201 repeats the operations from Step S1301.

Here, in the case where the traffic search unit 1101 has not performed the route search (No in Step S1301), the departure station detection unit 1103 judges whether or not the mobile phone 1201 has passed through the automatic ticket gate 1205 (Step S1303).

To be more specific, when the mobile phone 1201 comes close to the automatic ticket gate 1205, the wireless IC card 1202 carries out a local communication with the automatic ticket gate 1205. The departure station detection unit 1101 judges whether or not the mobile phone 1201 has passed through the automatic ticket gate 1205 based on the local communication carried out with the automatic ticket gate 1205.

When the departure station detection unit 1101 judges that the mobile phone 1201 has not passed through the automatic ticket gate 1205 (No in Step S1303), the mobile phone 1201 repeats the operations from Step S1301.

When the departure station detection unit 1101 judges that the mobile phone 1201 has passed through the automatic ticket gate 1205 (Yes in Step S1303), it detects the railway company (route) and the departure station based on the local communication with the wireless IC card 1202 (Step S1304). Note that the wireless IC card 1202 holds the railway company and the departure station specified by the local communication, and the railway fare is charged, based on the stored railway company and departure station, at the automatic ticket gate placed in the arrival station.

Next, when the departure station detection unit 1101 detects the departure station "Gakuenmae" and the route "K Railway" the destination prediction unit 1104 searches for those departure station and route within the route search history stored in the destination candidate storage unit 1102 (Step S1305). Then, when the destination prediction unit 1104 finds those departure station and route, it selects, as a candidate for the destination, the arrival station associated with those departure station and route.

For example, the destination prediction unit 1104 retrieves "Gakuenmae" and "K Railway" in the route search history as shown in FIG. 26, and selects, as the candidates for the destination, the arrival stations "Tsuruhashi" and "Saidaiji" in the route search history records 1501 and 1502.

Here, the destination prediction unit 1104 judges whether or not there are two or more destination candidates (Step S1306).

When judging that there are two or more destination candidates (Yes in Step S1306), the destination prediction unit 1104 causes the information providing unit 1105 to display these candidates in order of departure time shown in the route search history records, the time closest to the current time first (Step S1307).

For example, after selecting, as destination candidates, the arrival stations "Tsuruhashi" and "Saidaiji" in the route search history records 1501 and 1502 as mentioned above when the current time is 9 o'clock, the destination prediction unit 1104 causes the information providing unit 1105 to display the destination candidates, "Tsuruhashi" first and then "Saidaiji", because the departure time 10:00 shown in the route search history record 1501 is closer to the current time than the departure time 11:00 shown in the route search history record 1502. Note that the destination prediction unit 1104 may cause the information providing unit 1105 to display the destination candidates in order of search date, the later date first. By doing so, it becomes possible, for example, to preferentially display the arrival station which has been searched just before getting on the train.

In addition, before causing the information providing unit 1105 to display the destination candidate, the destination prediction unit 1104 calculates the estimated arrival time based on the time required to arrive at the destination candidate shown in the route search history and the current time, and then causes to display the calculation result as well.

Figure 27:
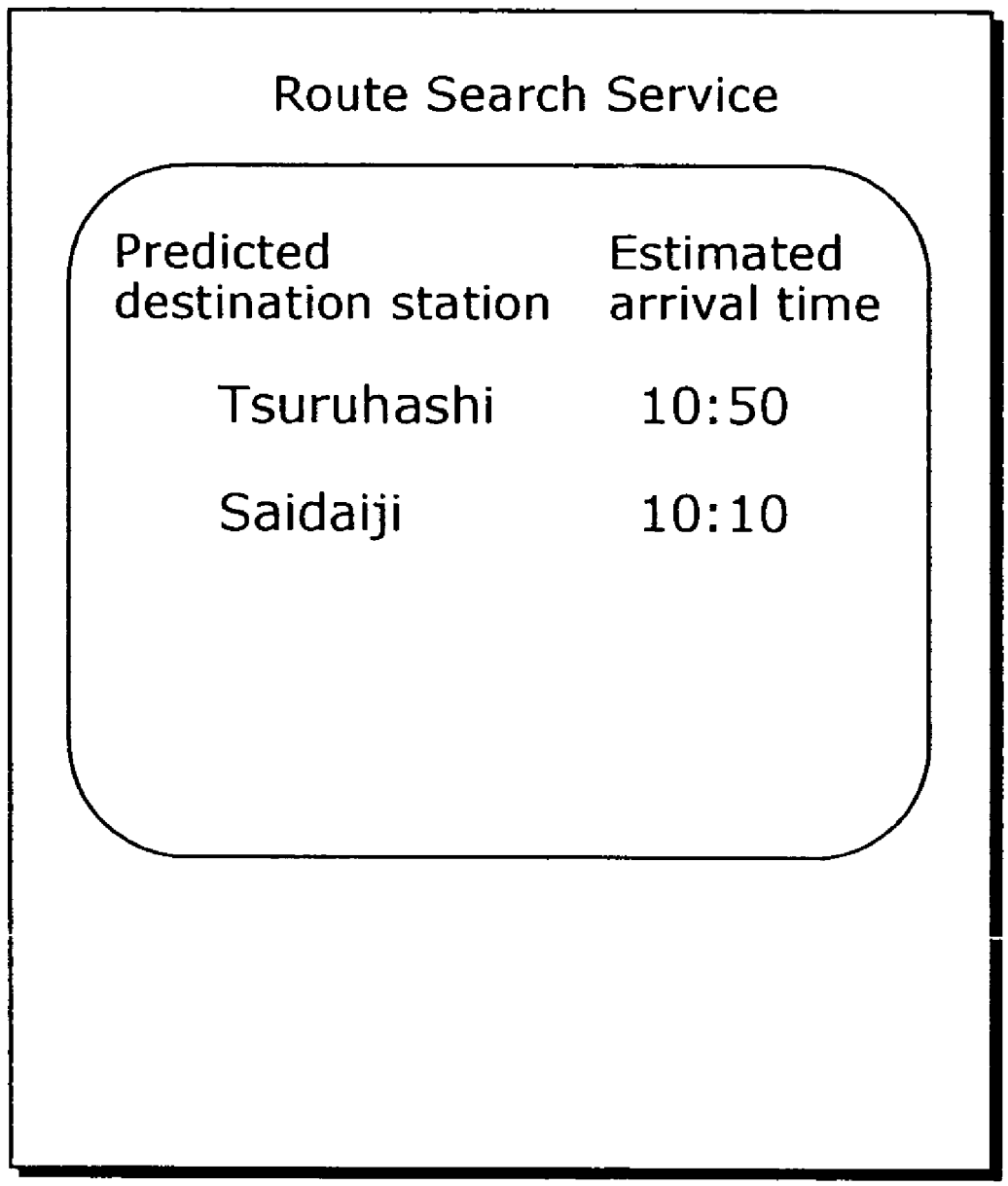
FIG. 27 is a diagram of a screen display showing a screen on which an information providing unit displays a destination candidate and an estimated arrival time.

FIG. 27 is a diagram of a screen display showing a screen on which the information providing unit 1105 displays destination candidates and estimated arrival times.

As shown in FIG. 27, the information providing unit 1105 displays "Tsuruhashi" and "Saidaiji" as the destination candidates, and at the same time displays the estimated arrival time "10:50" at "Tsuruhashi" and the estimated arrival time "10:10" at "Saidaiji".

When there is only one candidate in Step S1306 (No in Step S1306), the destination prediction unit 1104 causes the information providing unit 1105 to display the candidate destination as well as the estimated arrival time at that candidate calculated as mentioned above (Step S1308).

As a result, the mobile phone 1201 is able to predict the destination easily just by passing a station based on the past route search results on the Internet or the like, so as to automatically provide the information such as the estimated arrival time to the user. Conventional mobile terminals have a problem that they become more expensive as their structures become complicated because they have a positioning function such as GPS for predicting destinations. However, the mobile phone 1201 of the present invention is able to predict the destinations easily using the route search results, without pinpointing its own location using GPS or the like. Furthermore, since the mobile phone 1201 predicts the destination based not on the movement history but on the route search history, it is able to predict a location where it has never been before as a destination.

Note that after detecting a route and a departure station, the mobile phone 1201 may perform another route search by accessing the information server 1204. By doing so, the mobile phone 1201 is able to display the estimated arrival time based on the latest information stored in the information server 1204.

Note that the above-mentioned mobile phone 1201 may provide not only the estimated arrival time but also the commercial information relevant to the arrival station. For example, the mobile phone 1201 may communicate with the information server 1204 at the stage when it successfully predicts that it is heading for the "Tsuruhashi" station and provides the information that a shop in front of the "Tsuruhashi" station is holding a special sale, for example. Such information is previously registered in the information server 1204 by the information provider.

Note that the mobile phone 1201 does not include a component for detecting the current location using a GPS function, but it may include such a component. In that case, it becomes possible for the mobile phone 1201 to detect its own moving direction after passing through the automatic ticket gate 1205 and predict the destination.

Figure 28:
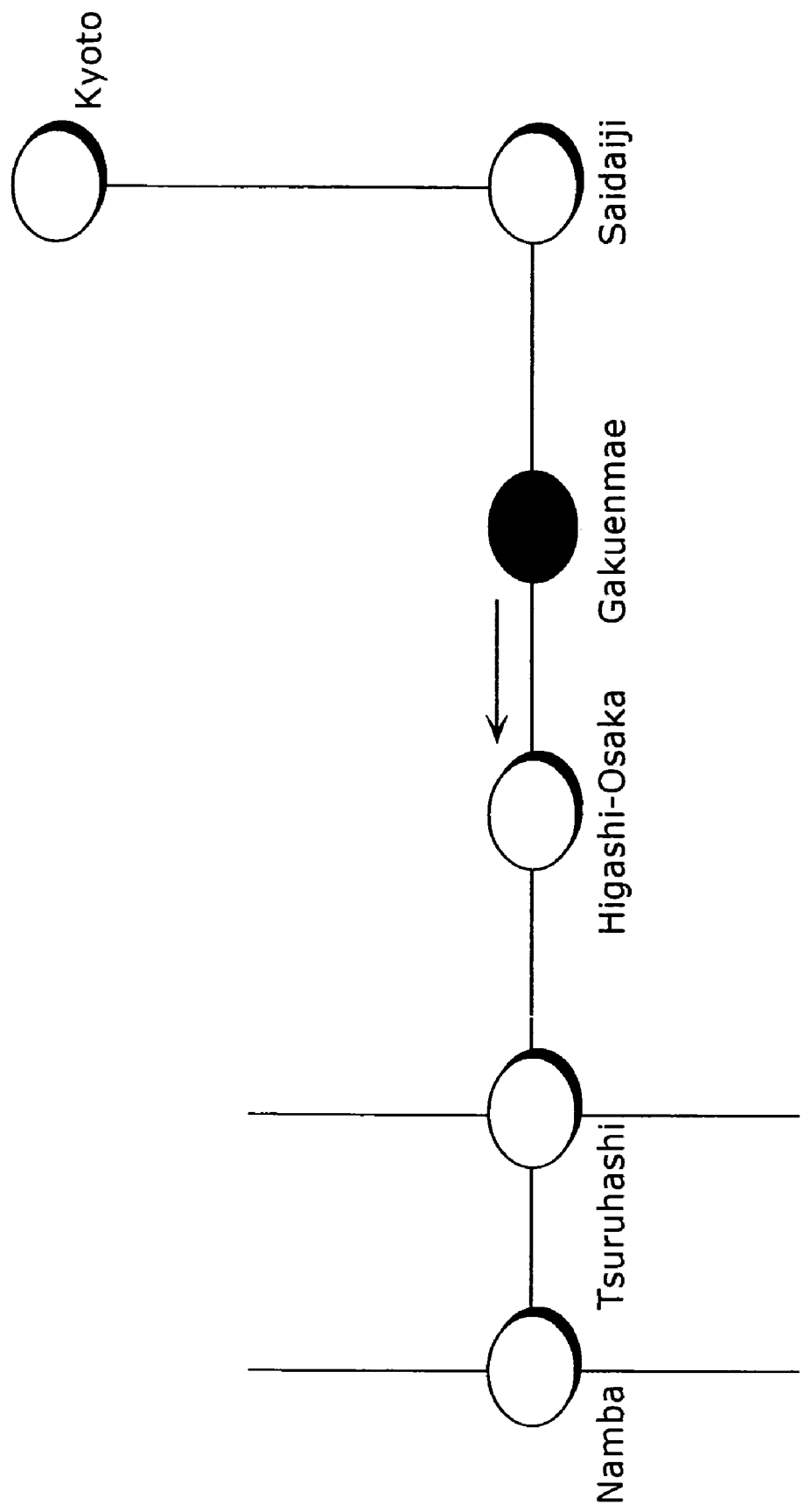
FIG. 28 is a diagram for explaining a method by which a mobile phone predicts a destination using GPS.

FIG. 28 is a diagram for explaining a method by which the mobile phone 1201 predicts a destination that is its own future location using GPS.

For example, when the mobile phone 1201 selects, as destination candidates, "Tsuruhashi" and "Saidaiji", by passing through the automatic ticket gate 1205 at the "Gakuenmae" station, it is able to also detect its own moving direction (moving direction of the train which the user gets on) using GPS and predict the destination "Tsuruhashi" based on the detected moving direction.

Additionally, the mobile phone 1201 displays, in Step S1307, the destination candidates in order of departure time shown in the route search history records, the time closest to the current time first, but it may display the candidates in order of search date, the date closest to the current date first. Alternatively, it is also possible for the mobile phone 1201 to handle a range from the departure time shown in the route search history record until one hour later as an effective history range, and preferentially display the candidates whose effective ranges include the current time. For example, it is assumed that the current time is 9 o'clock and the departure times 8:30 and 9:15 are shown in the route search history. In such a case, the effective range for the departure time 8:30 is a range from 8:30 until 9:30, while the effective range for the departure time 9:15 is a range from 9:15 until 10:15. Therefore, the current time is included in the effective range for the departure time 8:30, and thus the mobile phone 1201 preferentially displays, as the destination, the arrival station for which the mobile phone 1201 departs at 8:30.

Here, a modification of the above-mentioned mobile phone 1201 is described below.

The above-mentioned mobile phone 1201 stores the route search history records, while a mobile phone of the present modification predicts the destination using history records of communication such as e-mail operated by a user.

Figure 29:
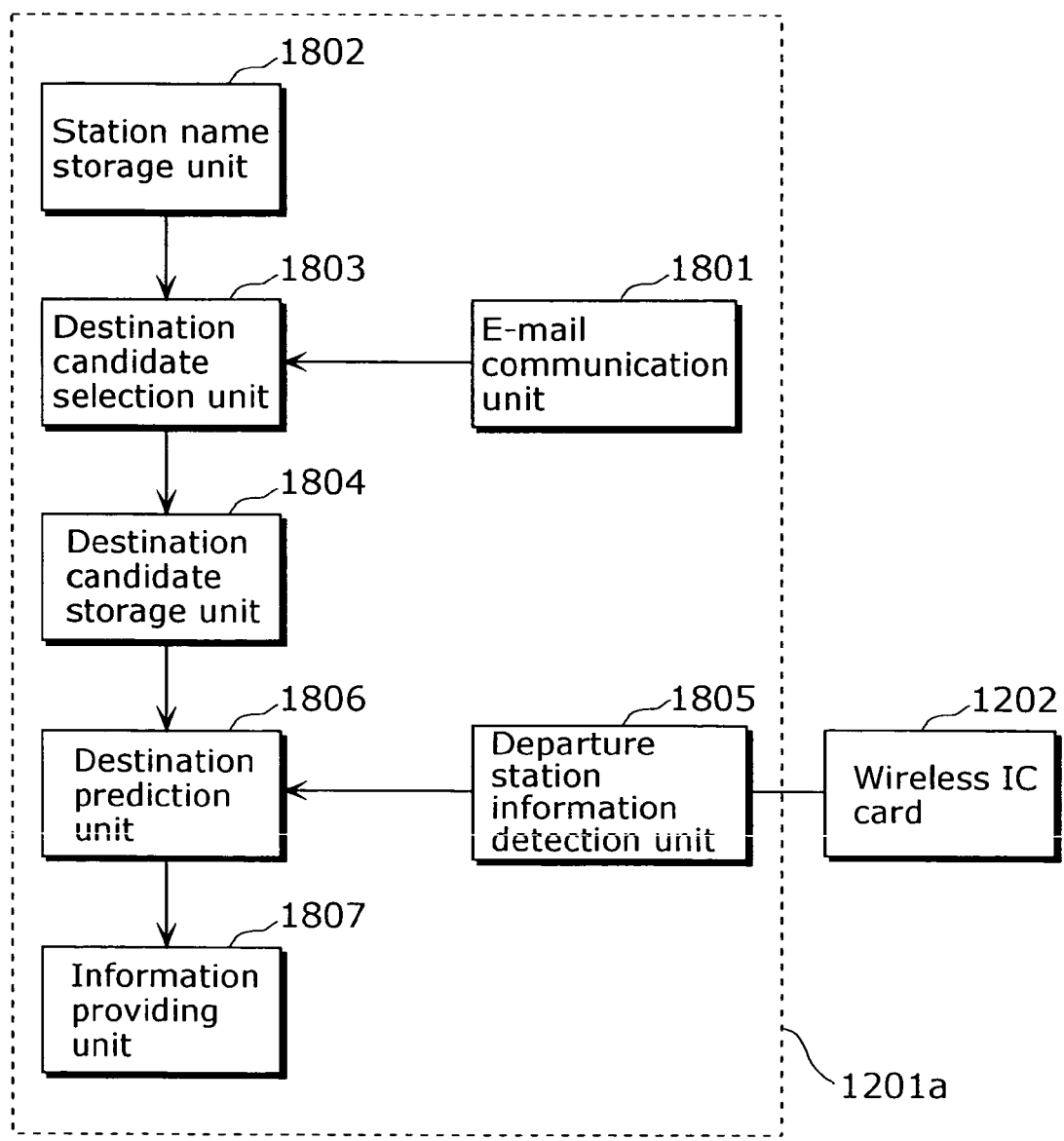
FIG. 29 is a structural diagram showing an internal structure of a mobile phone according to a modification.

FIG. 29 is a structural diagram showing an internal structure of the mobile phone according to the present modification.

This mobile phone 1201a includes an e-mail communication unit 1801 that sends and receives e-mails, a station name storage unit 1802 that stores station names and the like, a destination candidate selection unit 1803 that extracts a station name from an e-mail communication text, a destination candidate storage unit 1804 that stores the candidates selected by the destination candidate selection unit 1803, a departure station detection unit 1805 that detects a departure station, a destination prediction unit 1806 that predicts the destination from the departure station detected by the departure station detection unit 1805 and the candidates stored in the destination candidate storage unit 1804, and an information providing unit 1807 that provides the information concerning the destination predicted by the destination prediction unit 1806.

Here, a description is given for the operations of the mobile phone 1201*a* according to the present modification as mentioned above, by referring to FIG. 30.

Figure 30:
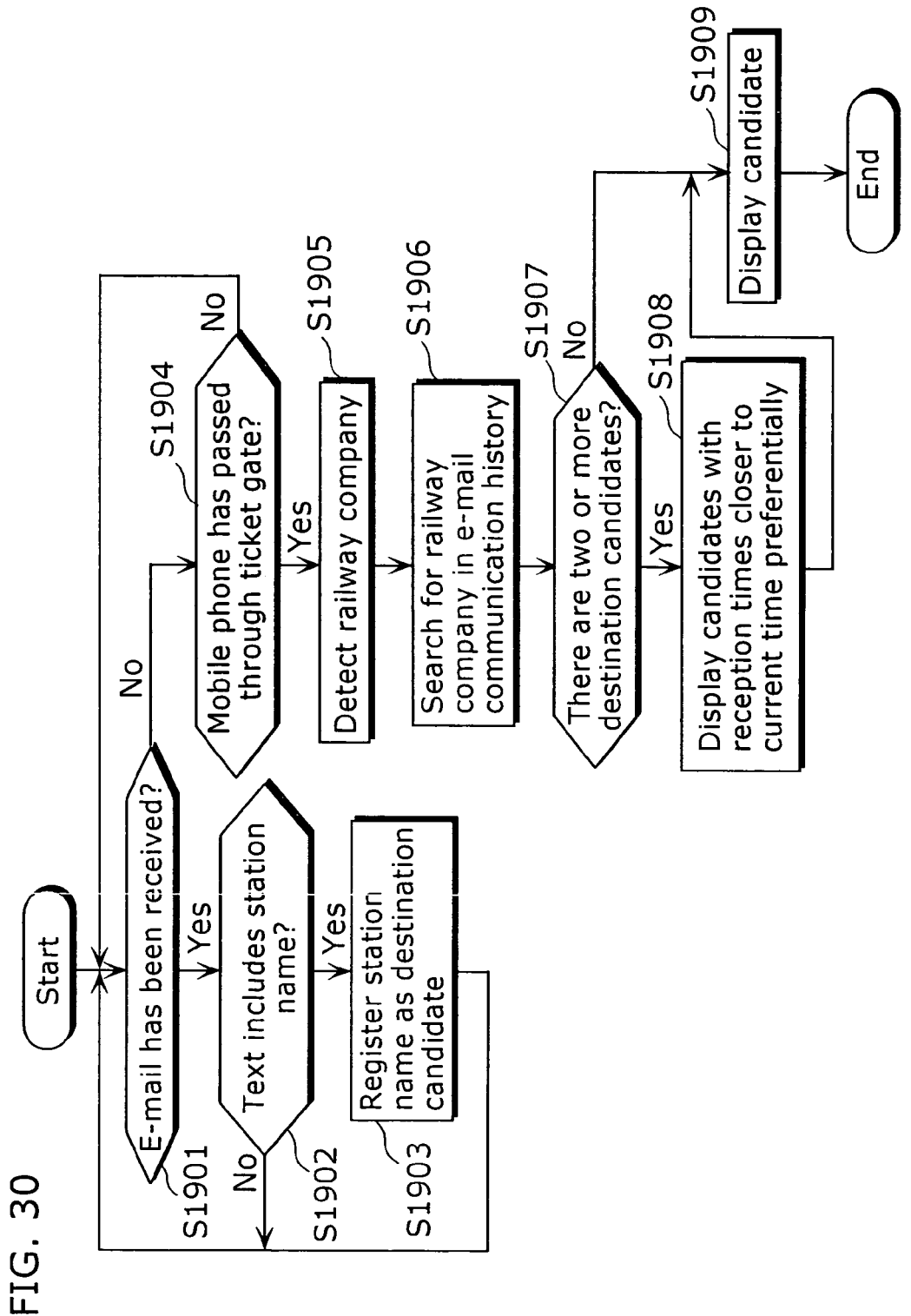
FIG. 30 is a flowchart showing operations of the mobile phone according to the modification.

FIG. 30 is a flowchart showing the operations of the mobile phone 1201*a* according to the present modification.

Firstly, the e-mail communication unit 1801 of the mobile phone 1201*a* judges whether or not it has received an e-mail (Step S1901). When the e-mail communication unit 1801 judges that it has received an e-mail (Yes in Step S1091), the destination candidate selection unit 1803 judges whether or not the text of the received e-mail includes a station name, by referring to the station names (station name list) stored in the station name storage unit 1802 (Step S1902). Here, if a station name is included (Yes in Step S1902), the destination candidate selection unit 1803 specifies the route corresponding to the station name included in the text based on the above station name list, and registers the station name and the route into the destination candidate storage unit 1804 (Step S1903). When a station name is not included (No in Step S1902) or the registration into the destination candidate storage unit 1804 has completed, the mobile phone 1201*a* repeats the operations from Step S1901.

FIG. 31 is a diagram showing the contents of the station name list stored in the station name storage unit.

As shown in FIG. 31, the station names "Tsuruhashi", "Higashi-Osaka" and others are registered by route into the station name list.

Figure 32:
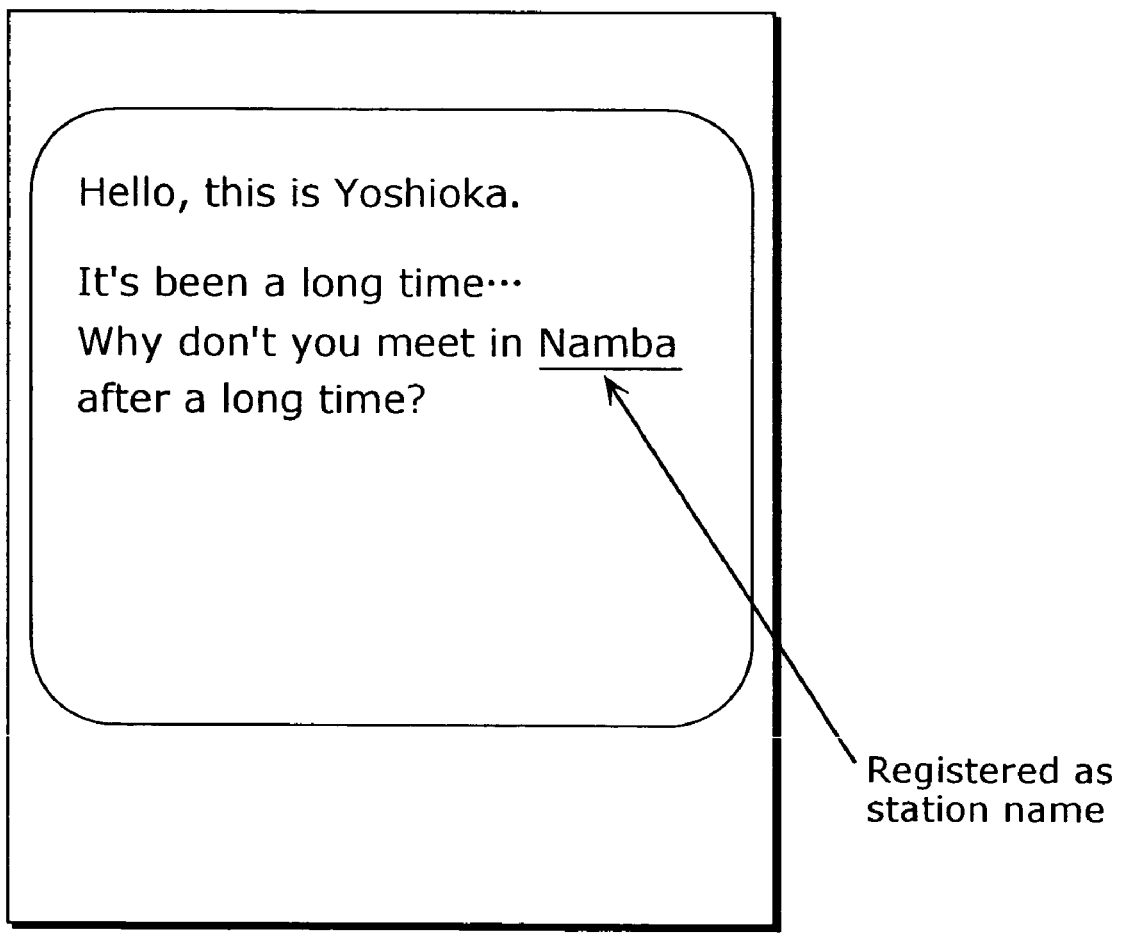
FIG. 32 is a diagram showing a text of an email received by an email communication unit.

FIG. 32 is a diagram showing the text of the e-mail received by the email communication unit 1801.

As shown in FIG. 32, the destination candidate selection unit 1803 searches for a station name in the words and phrases included in the text of the received e-mail, by referring to the station name list shown in FIG. 31, and when finding the station name "Namba", it specifies the routes "K Railway" and "N Railway" corresponding to the station name "Namba", by referring to the station name list again. Then, the destination candidate selection unit 1803 registers, into the destination candidate storage unit 1804, the station name "Namba", the routes "K Railway" and "N Railway", the time at which the e-mail has been received, the destination address of the e-mail and the registration time.

FIG. 33 is a diagram showing the records (of e-mail communication history) stored in the destination candidate storage unit 1804.

As shown in FIG. 33, the e-mail communication history records stored in the destination candidate storage unit 1804 include station names, routes, registration times, reception times and e-mail destination addresses.

When the e-mail communication unit 1801 judges that it has not received an e-mail in Step S1901 (No in Step S1901), the departure station detection unit 1805 judges whether or not the mobile phone 1201*a* has passed through the automatic ticket gate 1205 of the departure station (Step S1904), as is the case with the above-mentioned departure station detection unit 1103.

When the departure station detection unit 1805 judges that it has not passed through the automatic ticket gate 1205 (No in Step S1904), the mobile phone 1201*a* repeats the operations from Step S1901.

When the departure station detection unit 1805 judges that the user has passed the automatic ticket gate 1205 (Yes in Step S1904), the departure station detection unit 1805 further detects the railway company (route) based on the local communication using the wireless IC card 1202 (Step S1905).

Next, when the departure station detection unit 1805 detects the route "K Railway", for example, in Step S1905, the destination prediction unit 1806 searches for that route in the e-mail communication history stored in the destination candidate storage unit 1804 (Step S1906). Then, when finding that route, the destination prediction unit 1806 selects the station name associated with the route, as a destination candidate.

Here, the destination prediction unit 1806 judges whether or not there are two or more destination candidates (Step S1907).

When judging that there are two or more candidates (Yes in Step S1907), the destination prediction unit 1104 causes the information providing unit 1105 to display the destination candidates and the estimated arrival times at those destinations in order of reception times shown in the e-mail communication history, the time closest to the current time first (Step S1908).

When there is only one candidate in Step S1907, the destination prediction unit 1104 causes the information providing unit 1105 to display that destination candidate and the estimated arrival time at that destination (Step S1908).

Figure 34:
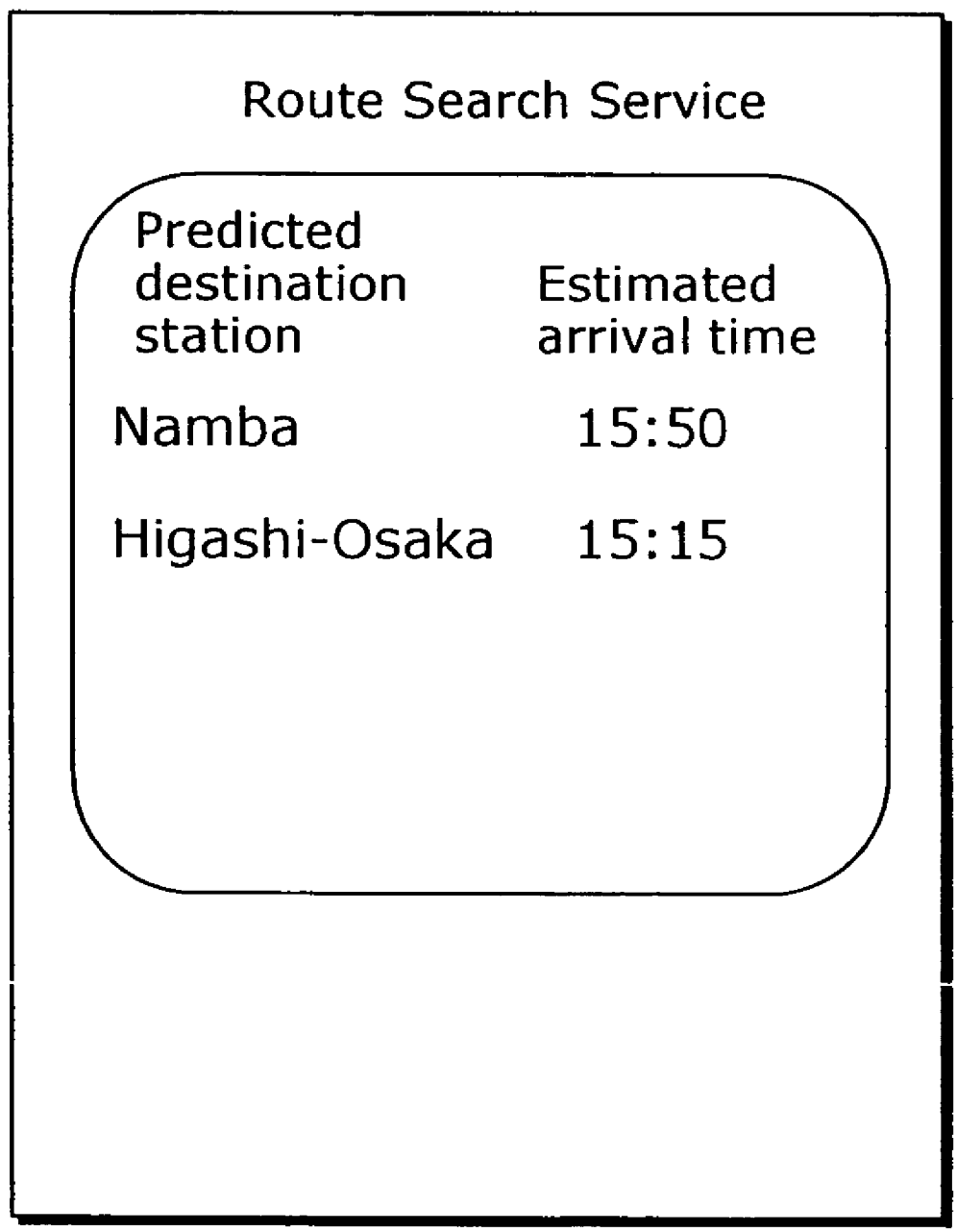
FIG. 34 is a diagram showing one example of a screen of a mobile phone displaying a prediction result.

FIG. 34 is a diagram showing one example of a screen of a prediction result displayed on the mobile phone 1201*a*.

In the case where the route "K Railway" is detected, for example, the mobile phone 1201*a* displays "Namba" and "Higashi-Osaka" as destination candidates and provides the user with the estimated arrival times at those stations, by referring to the e-mail communication history shown in FIG. 33. Note that the mobile phone 1201*a* never selects "Gakuen-mae" as a destination candidate because the departure station is "Gakuen-mae".

As described above, the mobile phone 1201*a* according to the present modification is able to predict the arrival station just by passing through the ticket gate of the departure station, using the e-mail communication history, so as to provide the user with the information concerning the arrival station. In other words, the mobile phone 1201*a* according to this modification is able to not only predict the destination easily without pinpointing its own location using a GPS or the like, as described above, but also predict a location where the user has never been before as a destination candidate. In addition, since people often communicate with each other using e-mail or the like when they meet someone, the mobile phone 1201*a* is able to predict the appropriate destination.

Note that while the mobile phone 1201*a* as mentioned above predicts the arrival station, namely, the location to which the mobile phone 1201 is likely to move, using the route search history and the e-mail communication history, it may further use the histories of results of searching for eating places and accommodations. For example, in the case where a user who makes a search for an eating place or an accommodation in Namba on a routine basis gets on a train of "K Railway", the mobile phone 1201*a* judges that the user is very likely to go to "Namba", and previously provides the user with the information concerning the "Namba" station. Therefore, the mobile phone 1201*a* is able to automatically provide the user with the information necessary for him in the future, using the past information access history, while the user does not need to set the route search and search conditions.

First Embodiment

A description is given below for the first embodiment of the present invention using the above location prediction method by referring to the diagrams.

The mobile phone according to the present embodiment previously holds the usage history of an e-mail application or the like for the user of the mobile terminal, and predicts, based on the current date and time and location, an application that the user is likely to use currently. The mobile terminal further predicts an application that the user is likely to use in the future location predicted by the above location prediction method.

Figure 35:
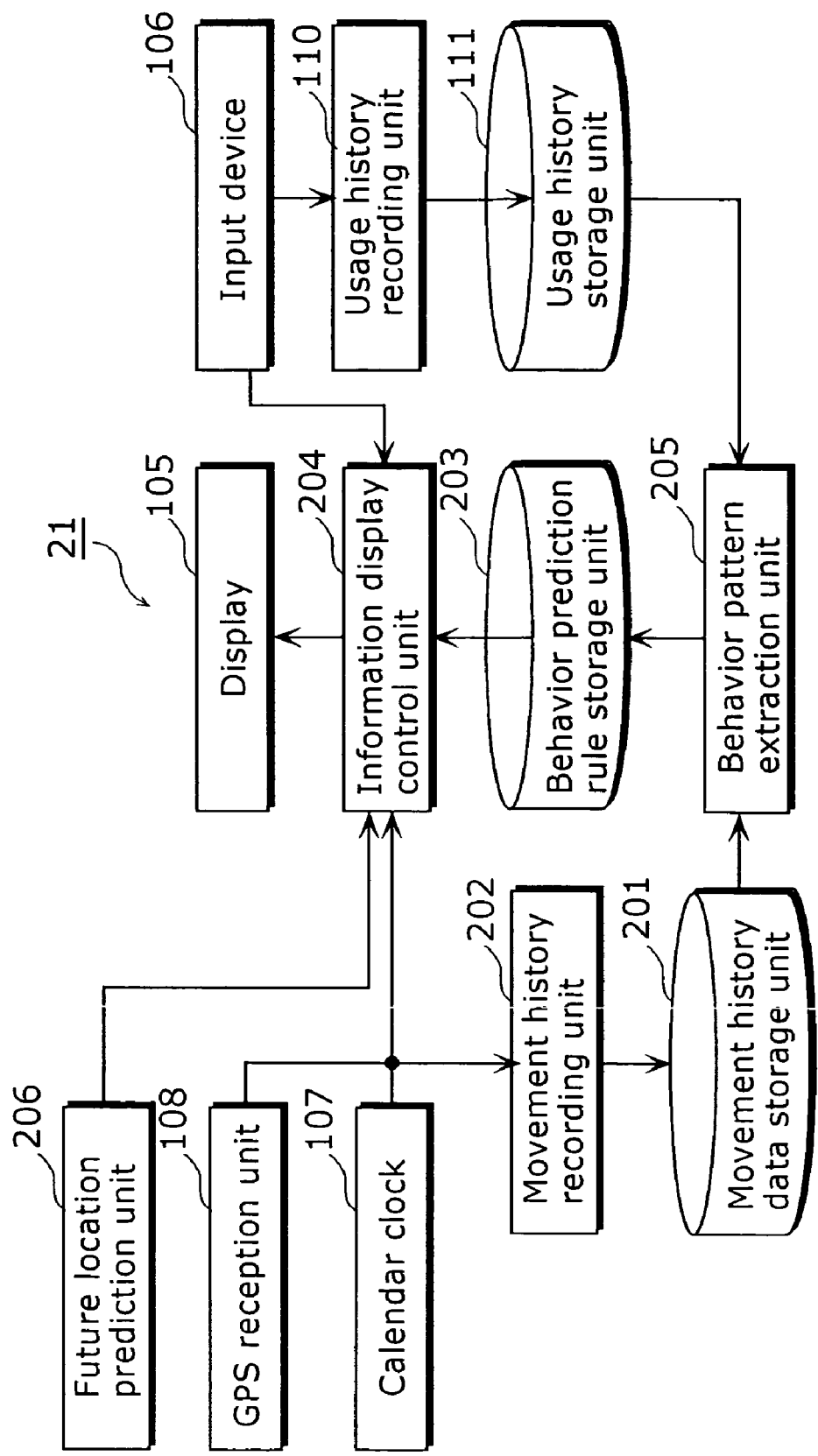
FIG. 35 is a functional block diagram showing a functional structure of a mobile terminal in a first embodiment.

FIG. 35 is a functional block diagram showing the functional structure of the mobile terminal in the present embodiment.

A mobile terminal (hereinafter referred to a mobile phone) 21 in the present embodiment includes a display 105, a GPS reception unit 108, a calendar clock 107, a movement history data storage unit 201, a movement history recording unit 202, a behavior prediction rule storage unit 203, an information display control unit 204, a behavior pattern extraction unit 205, an input device 106, a usage history recording unit 110, a usage history storage unit 111, and a future location prediction unit 206. Note that as for the above-mentioned components, the same reference numbers as those assigned to the components included in the mobile terminal 11 shown in FIG. 3 are assigned to the components having the same functions and structures as those of the mobile terminal 11, and the detailed description thereof is not repeated here.

The future location prediction unit 206 includes the components included in the mobile terminal 11 that uses the above location prediction method A or B and the components included in the mobile phone 1201 that uses the above location prediction method C. It predicts the future location and notifies the result to the information display control unit 204. When predicting the future location using the location prediction method A or B, the future location prediction unit 206 further predicts the date and time when the user will arrive at that location (calendar attribute) based on the past movement history, and notifies the result to the information display control unit 204. When predicting the future location using the location prediction method C, the future location prediction unit 206 further predicts the date and time when the user will arrive at that location (calendar attribute) based on the route search result history and notifies the result to the information display control unit 204, too.

Note that it is not always necessary that the mobile terminal 21 includes the future location prediction unit 206, but it is also possible that another component of the mobile terminal 21 than the future location prediction unit 206 executes the same operations as those executed by the future location prediction unit 206.

The input device 106 is an input operation button for accepting the input operations into the mobile phone 21.

The usage history recording unit 110 receives the output from the input device 106 and records the usage history of an e-mail application or the like into the usage history storage unit 111. Here, the usage history recording unit 110 keeps track of the current calendar attributes by obtaining the outputs from the calendar clock 107 or having the same function as the calendar clock 107. As a result, in this usage history, the used applications and their contents are associated with their usage dates and times.

The behavior pattern extraction unit 205 creates the application usage history for the user of the mobile phone 21 in association with the usage dates and times and usage locations.

For that purpose, the behavior pattern extraction unit 205 creates the application usage history using the movement history which is recorded by the movement history recording unit 202 into the movement history data storage unit 201 and the usage history which is recorded by the usage history recording unit 110 into the usage history storage unit 111. In this application usage history, the used applications and their contents are associated with the usage dates and times and the locations (paths or places) where they were used, as mentioned above. Note that a method of determining the places and the paths is same as that for the mobile terminal 11.

FIG. 36 is a diagram showing the records of the application usage history.

As shown in FIG. 36, in the application usage history, the used applications and their contents (destination addresses, titles and outgoing messages) are associated with their usage dates and times and usage locations (places or paths).

In other words, in the application usage history, operation input sequences inputted by the user's operations, such as an operation of selecting e-mail as an application, an operation of selecting destinations, and an operation of inputting message text, are recorded.

For example, this diagram shows that the user sent an e-mail message "I've just left the office. Please prepare meal for me." titled "Coming home soon" to the address "kazoku@xyz.ne.jp" of his family member at 20:00 on Friday, Feb. 7, 2003 on the path between the company and the station.

The behavior pattern extraction unit 205 extracts the user's application usage patterns based on this application usage history, creates usage prediction rules (application usage history which is organized in a predetermined format), and records them into the behavior prediction rule storage unit 203.

Figure 37:
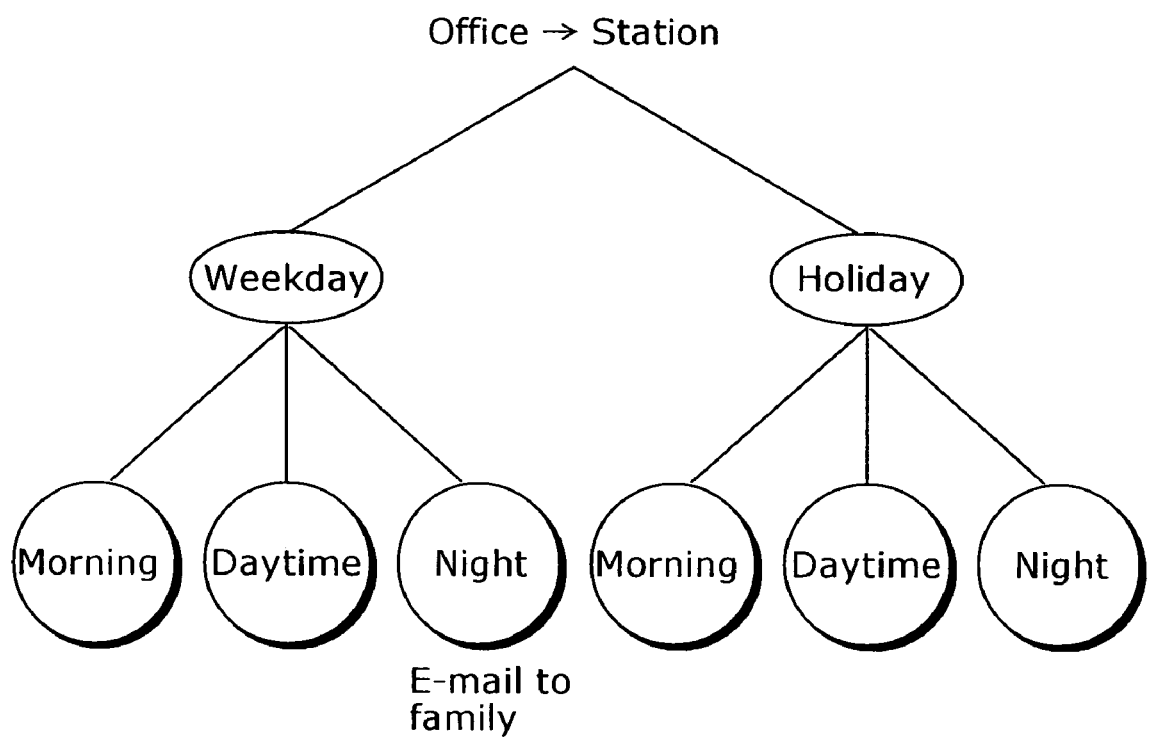
FIG. 37 is a diagram showing a method of extracting a usage pattern of an application in the first embodiment.

FIG. 37 is a diagram showing a method of extracting application usage patterns.

In this extraction method, the dates when the user used the application are categorized into any of the following: weekday (from Monday through Friday) morning (from 6:00 a.m. through noon); weekday daytime (from noon through 6:00 p.m.); weekday night (from 6:00 p.m. through 6:00 a.m. next morning); holiday (Saturday and Sunday) morning; holiday daytime; and holiday night.

For example, a description is given for the case where the usage pattern is extracted based on the history indicating that the user sent an e-mail message to his family member on the way (path) from the office to the station at 20:00 on Friday, Feb. 7, 2003, as shown in FIG. 36.

Firstly, the date on which the user sent the e-mail message to his family member on the path between the company and the station is categorized into a weekday or a holiday. Here, it is categorized into a weekday because it is Friday. Next, the time at which the user sent the e-mail message is categorized into one of morning, daytime and night. Here, it is categorized into night because it is 20:00. The usage pattern that the user sent the e-mail to his family member on the path from the office to the station on weekday night is extracted as mentioned above.

The behavior pattern extraction unit 205 creates the user's application usage prediction rules by accumulating the usage patterns extracted as mentioned above.

FIG. 38 is a diagram showing the application usage prediction rule 320.

FIG. 38 shows the used application, the used item, the number of uses and the details of usage, per usage date and time and usage location.

The usage dates and times are the time categories of the weekday morning, weekday daytime, weekday night, holiday morning, holiday daytime and holiday night categorized as mentioned above, and the usage locations show the places or the paths determined as mentioned above.

The used applications are the applications such as an e-mail and a game used by the user, the used items are the e-mail destinations in descending order of the number of transmissions in the case of an e-mail application, whereas the used game software in descending order of the number of uses in the case of a game application.

The number of uses are the number of transmissions per destination in the case of an e-mail application, whereas the number of uses per game software in the case of a game application.

The details of usage are the details of e-mail messages (the latest titles and the latest messages) in the case of an e-mail application, whereas the information indicating the information indicating the status of the previous use in the case of a game application.

For example, as for the use of the e-mail application on weekday night on the path from the office to the station, the user has sent e-mail messages to his wife 75 times, that is the largest number of uses, while he has sent e-mail messages to his friend Mr. Yamada 38 times, that is the second largest number of uses. As for the use of the game application on weekday night on the path from the office to the station, the user has used a game software A 12 times, that is the largest number of uses, while he has used a game software B 3 times, that is the second largest number of uses.

The usage prediction rules are created as mentioned above.

The information display control unit 204 finds out, from among the usage prediction rules 320, an application corresponding to the result of the current location detected by the GPS reception unit 108 and the current calendar attribute measured by the calendar clock 107, and presents the found application as a prediction result. In other words, the information display control unit 204 predicts an application corresponding to the current location and date and time, and presents that application. For example, when the current location is on the path from the office to the station and the current date and time belongs to weekday night, the information display control unit 204 finds out e-mail as an application whose number of uses is the largest in those categories of paths and calendar attributes shown in the usage history rules 320, and presents the e-mail message.

Furthermore, the information display control unit 204 finds out an application corresponding to the location and calendar attribute predicted by the future location prediction unit 206 from the usage prediction rules 320, and presents the found application as a prediction result. In other words, the information display control unit 204 predicts an application corresponding to the future location and date and time, and starts up that application.

Alternatively, it is also possible for the information display control unit 204 to present applications in descending order of the number of uses, and predict a destination when the user selects e-mail.

FIG. 39 is a flowchart showing the operational processes for an application performed by the information display control unit 204.

Figure 40:
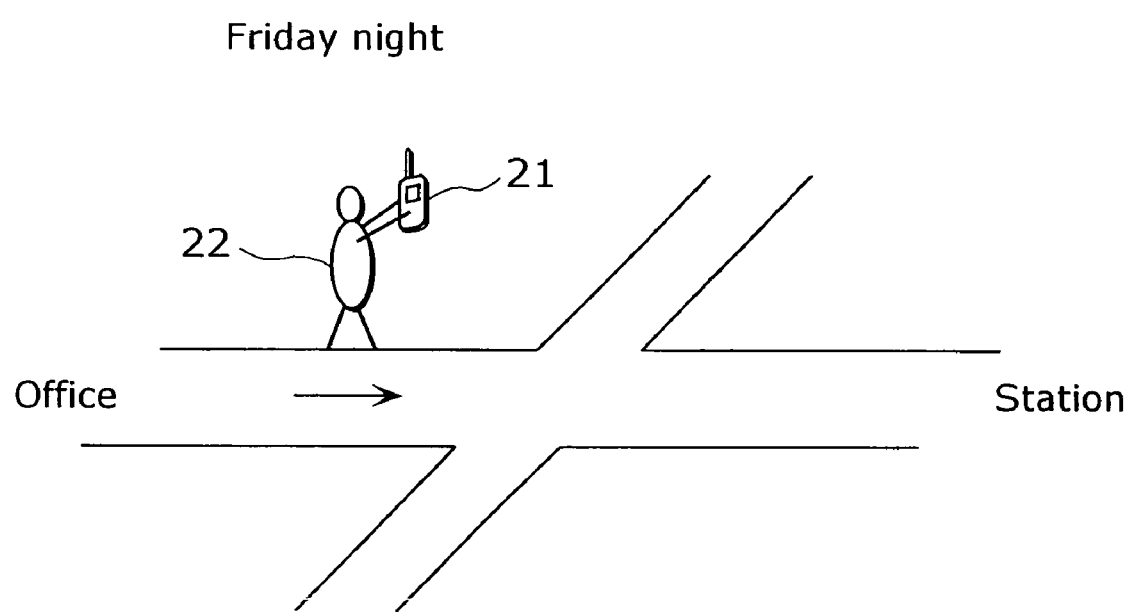
FIG. 40 is a diagram for explaining operation processes for applications performed by the information display control unit in the first embodiment.

Here, a description is given, for example, for the case where the user 22 of the mobile phone 21 is heading for the nearest station from his office on Friday night, as shown in FIG. 40. In the case shown in FIG. 40, the current date and time (Friday night) belongs to weekday night, and the current location of the mobile phone belongs to the path from the company to the station.

The information display control unit 204 first obtains the current date and time and the current location of the mobile phone 21 from the calendar clock 107 and the GPS reception unit 108 (Step S500). Next, the information display control unit 204 calculates the usage probability of each application at the applicable date and time and location based on the usage prediction rules 320, displays them in descending order of usage probability, and displays a message that prompts the user to select an application to be used (Step S501).

Figure 41A:
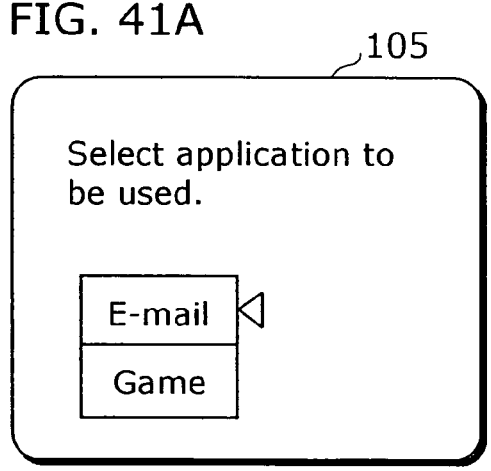
FIG. 41A is a diagram showing a display example of a message.

FIG. 41A shows one example of such a message. The applications with higher usage probabilities are displayed, then E-mail first and Game next. By operating a cursor indicated on the right of E-mail, either E-mail or Game is selected.

Next, the information display control unit 204 judges whether or not the user has clicked E-mail based on the output from the input device 106 (Step S502), and performs the operational processing of another application (Step S515) when he has not clicked E-mail (No in Step S502), and ends the processing.

On the other hand, when the user has clicked E-mail (Yes in Step S502), the information display control unit 204 displays a message for asking the user whether or not he will use the past history (Step S503).

Figure 41B:
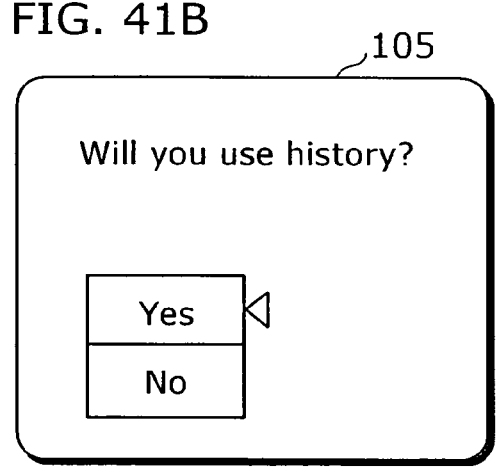
FIG. 41B is a diagram showing a display example of a message asking whether or not a past history is to be used.

FIG. 41B shows one example of a message for asking whether or not the user will use the past history.

Then, the information display control unit 204 judges whether or not the user has selected to use the past history (Step S504), regards the next mode as a normal e-mail input mode when the user has not selected (No in Step S504), and ends the processing. On the other hand, when the user has selected to use the past history (Yes in Step S504), it calculates the probability of each e-mail destination based on the current location of the mobile phone 21 and the current date and time as well as the usage prediction rules 320 (See FIG. 38), and displays the candidates on the display 105 (Step S505).

For example, the probability is calculated based on the usage prediction rules 320 shown in FIG. 38. In the case where the number of transmissions of e-mail messages on the path from the office to the station on weekday night is 100 times, the probability for the user's wife is 75% (the number of uses is 75 times), while the probability for his friend Mr. Yamada is 15% (the number of uses is 15 times). Wife and Mr. Yamada whose probabilities are 15% or higher are shown on the display 105, as destination candidates.

Figure 41C:
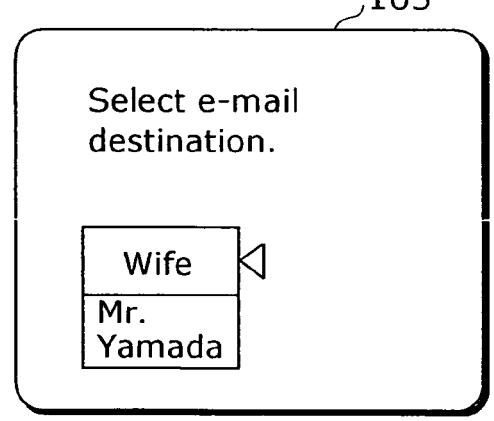
FIG. 41C is a diagram showing a message prompting selection of a person to whom an-email is to be sent.

FIG. 41C shows a display of a message for prompting the user to select an e-mail destination and destination candidates. Wife and Mr. Yamada are displayed in descending order of probability of past transmissions.

As described above, after displaying the destination candidates on the display 105, the information display control unit 204 judges whether or not the user has selected one of the candidates (Step S506). When judging that he has selected the candidate (Yes in Step S506), the information display control unit 204 displays, on the display 105, the latest message (including the title and ongoing message) that the user has sent to the selected destination (Step S507).

Figure 41D:
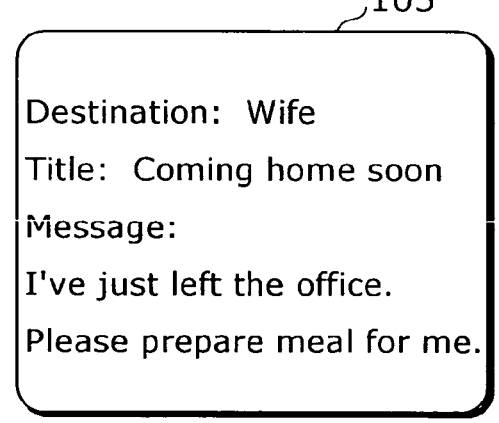
FIG. 41D is a diagram showing a display example of a message which was sent in the past.

FIG. 41D shows one example of the latest message that the user has sent before. As shown in FIG. 41D, the display 105 shows the destination "Wife", the title "Coming home soon", the message "I've just left the office. Please prepare meal for me." The user can edit the displayed message.

The information display control unit 204 accepts the input (editing) on the message (Step S508), and judges whether or not the e-mail send button has been pressed (Step S509). Then, it accepts the input of the message until the send button is pressed, and when it judges that the send button has been pressed (Yes in Step S509), it sends the e-mail (Step S510).

As described above, in the present embodiment, the application corresponding to the current and future locations of the mobile terminal 21 as well as the calendar attribute is specified according to the usage prediction rule and shown as a prediction result. Therefore, it is possible to appropriately present the application that the user is likely to use at the location on those date and time.

Note that, in the present embodiment, the application usage history is created in association with the calendar attributes and the locations of the mobile terminal, the current calendar attribute and the current location of the mobile terminal are obtained, and the probability of the user's application use or input operation is calculated based on such attribute and location. However, it is possible alternatively to record the application usage history in association with only the calendar attribute and calculate the probability of the user's application use or input operation based on only the current calendar attribute. For example, it is possible to display, as candidates for an e-mail destination party, the user's family members during the daytime, whereas his friends during the night, regardless of the location.

Furthermore, in the present embodiment, the probability of the user's application use or input operation is calculated depending on the situation such as a calendar attribute and a location, but it is also possible to apply this method to the telephone book of the mobile phone so as to display the telephone numbers in descending order of probability of destination partners, the partner having the highest probability of being selected as a destination first, depending on the situation such as a time category, a day of the week and a location.

Alternatively, it is also possible to change the conversion method from "hiragana (Japanese syllabary characters)" into "kanji (Chinese characters)", depending on the situation such as a time category, a week of the day and a location.

Second Embodiment

A description is given below for a mobile terminal in the second embodiment of the present invention, by referring to the diagrams.

The mobile terminal in the first embodiment predicts the application that the user is likely to use, based on the current or future situation shown in the usage prediction rules 320, and presents the application, and it also predicts the destination of an e-mail message in the case where the application is e-mail.

On the other hand, the mobile terminal in the present embodiment predicts not only the e-mail destination but also other content parameters. Here, the content parameters are, in the case where the application is e-mail, a destination, an outgoing message, an arrival time and others. In the case where the application is a television receiver that displays video or a music player that plays back music, the content parameters are a program (music number), a sound volume, playback mode and others, while in the case where the application is a game, the content parameters are data necessary for the game.

A description is given here mainly for content parameter control in the case of e-mail.

Figure 42:
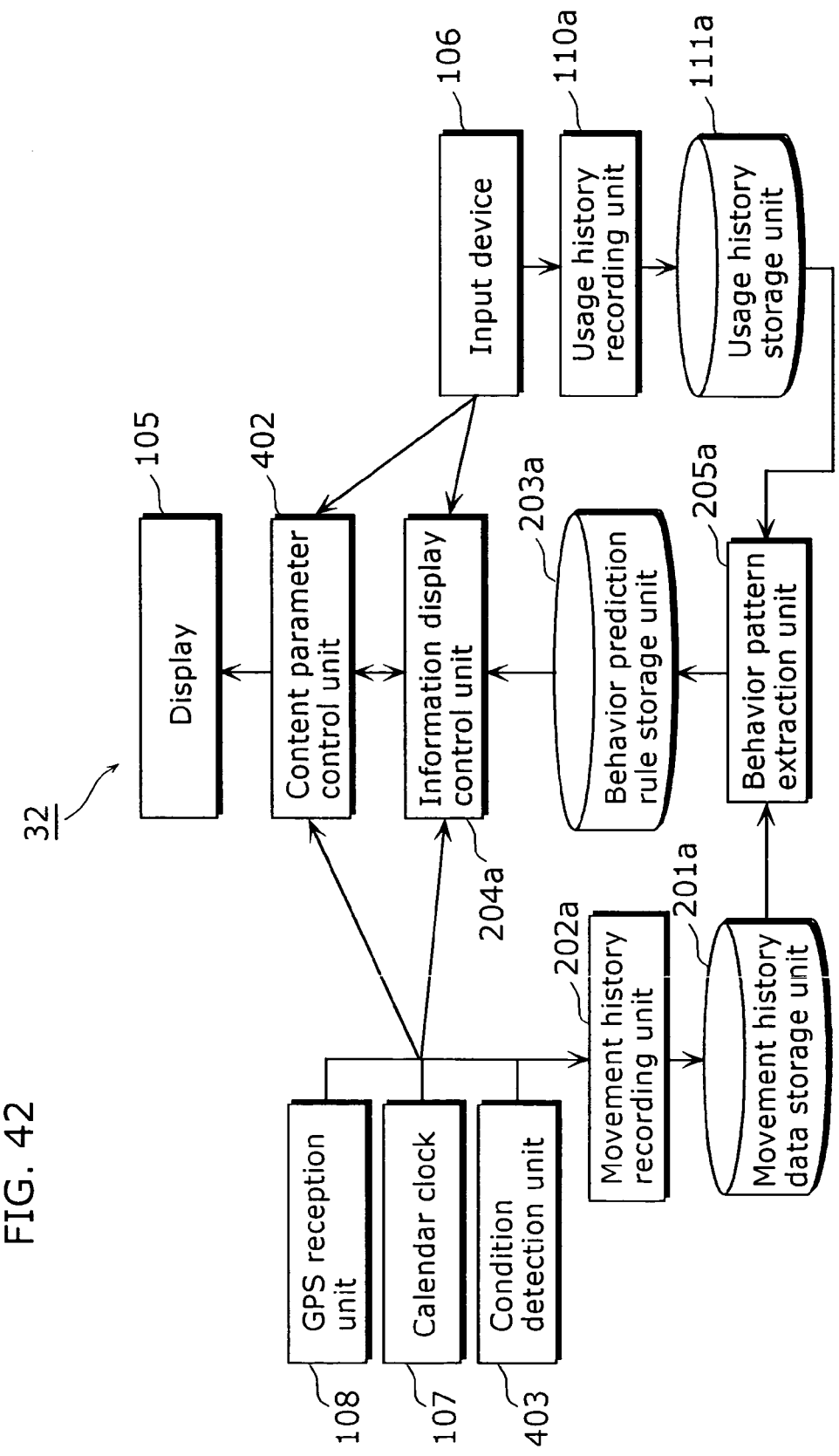
FIG. 42 is a functional block diagram showing a functional structure of a mobile terminal in a second embodiment.

FIG. 42 is a functional block diagram showing the functional structure of the mobile terminal in the present embodiment.

A mobile terminal 32 in the present embodiment includes a display 105, a GPS reception unit 108, a calendar clock 107, a condition detection unit 403, a movement history data storage unit 201a, a movement history recording unit 202a, a behavior prediction rule storage unit 203a, an information display control unit 204a, a behavior pattern extraction unit 205a, an input device 106, a usage history recording unit 110a, a usage history storage unit 111a, and a content parameter control unit 402. Note that as for the above-mentioned components included in the mobile terminal 32 in the present embodiment, the reference numbers same as those assigned to the components included in the mobile terminal 11 or 12 are assigned to the elements having the same functions and structures as those of the mobile terminal 11 shown in FIG. 3 or the mobile terminal 21 shown in FIG. 35, and the detailed description thereof is not repeated here.

The condition detection unit 403 detects the weather condition around the mobile terminal 32. For example, the condition detection unit 403 is composed of a temperature sensor, a humidity sensor and the like, and detects the temperature and humidity around the mobile terminal 32, or detects the weather based on the detected humidity. In the case where the mobile terminal 32 is mounted on a car, the condition detection unit 403 detects the weather around the mobile terminal 32 by detecting the operation of a wiper. Note that the condition detection unit 403 may detect the weather condition around the mobile terminal 32 by communicating via the Internet.

The movement history recording unit 202a performs the same operations as those of the movement history recording unit 202 in the first embodiment, but it also stores the detection results by the condition detection unit 403, in association with the movement history, into the movement history data storage unit 201a.

The usage history recording unit 110a performs the same operations as those of the usage history recording unit 110 in the first embodiment, but it also stores, into the usage history storage unit 111a, a template that is a content parameter used for e-mail in the case where the e-mail is used as an application, in association with the usage history. Here, the template is something that serves as a model or an example of text suitable for a purpose of an e-mail, and is previously registered in the content parameter control unit 402.

The usage history recording unit 110a associates the template with the usage history, as mentioned above, when the template is used. When the template is not used, the usage history recording unit 110a specifies a template suitable for a text message which is created by a user in his own way by analyzing the syntax and meaning of the text. Then, the usage history recording unit 110a stores the specified template, in association with the usage history, into the usage history storage unit 111a.

Figure 43:
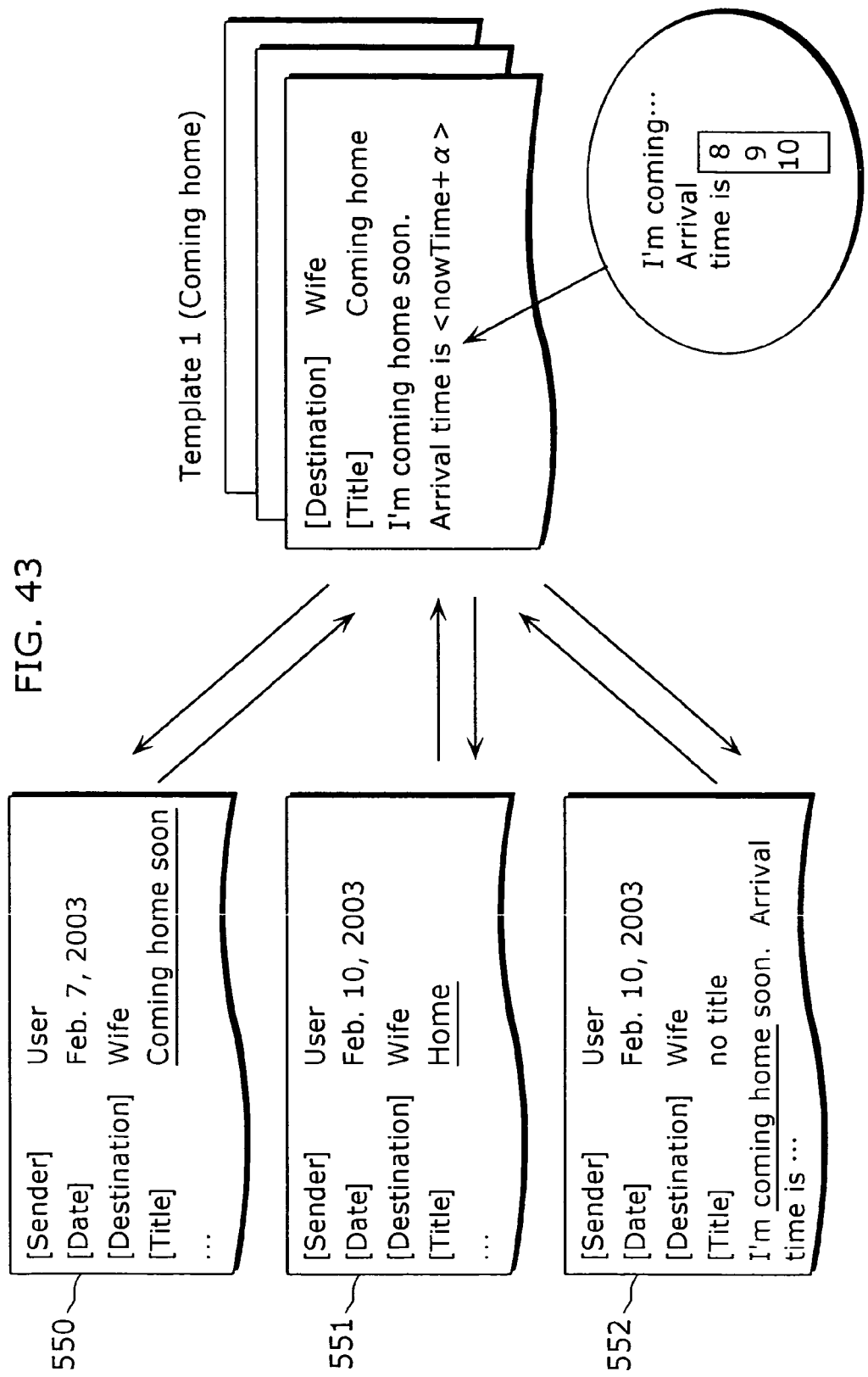
FIG. 43 is a diagram for explaining one example of a template in the second embodiment.

FIG. 43 is a diagram for explaining one example of a template in the second embodiment.

The usage history recording unit 110a analyzes text messages 550, 551 and 552 which are created by the user in his own way, and when finding that the text message 550 includes a description of "coming home soon", the text message 551 includes a description of "home" and the text message 552 includes a description of "coming home", it judges that these text messages 550, 551 and 552 are suitable for a template 1. Then, the usage history recording unit 110a associates these e-mail messages with the template 1.

Here, the template 1 is a model of a text for the purpose of notifying of coming home, and the arrival time is inserted into the text. This arrival time is specified by adding a predetermined time period to the current time ("nowTime") specified based on the calendar clock of the usage history recording unit 110a itself or the calendar clock 107.

For use of the template 1, the user uses it as it is without editing the text of the template 1, or by editing the text of the template 1 through the operation of the input device 106.

The behavior pattern extraction unit 205a generates the application usage history based on the movement history stored in the movement history date storage unit 201a and the usage history stored in the usage history storage unit 111a.

FIG. 44 is a diagram showing the contents of the application usage history in the present embodiment.

The application usage history in the present embodiment includes a used application (FIG. 44 shows only an e-mail application as one example), a destination address that is a content parameter, a template (FIG. 44 shows the templates 1 and 2 as one example), a title, an outgoing message, a usage date and time of the used application, a usage route and a weather condition.

For example, the application usage history record 501 shows that the template 1 was used, while the application usage history record 502 shows that the template 2 was used. Here, the template 1 is a model of a text for the purpose of notifying of coming home, as mentioned above, whereas the template 2 is a model for the purpose of notifying of coming home as well as asking someone to come and pick up because of rain.

Here, the behavior pattern extraction unit 205a further extracts the user's application usage patterns based on the above application usage history, creates usage prediction rules and stores them into the behavior prediction rule storage unit 203a.

FIG. 45 is a diagram showing the contents of the usage prediction rules stored in the behavior prediction rule storage unit 203a.

The behavior pattern extraction unit 205a extracts, from the application usage history record 501, a usage pattern that the user used e-mail of the template 1 to his family member on the route from the office to the station on a fair weekday night, and extracts, from the application usage history record 502, a usage pattern that the user used e-mail of the template 2 to his family member on the route from the office to the station on a rainy weekday night. Then, the behavior pattern extraction unit 205a accumulates the extracted usage patterns so as to create the usage prediction rules as shown in FIG. 45.

Figure 46:
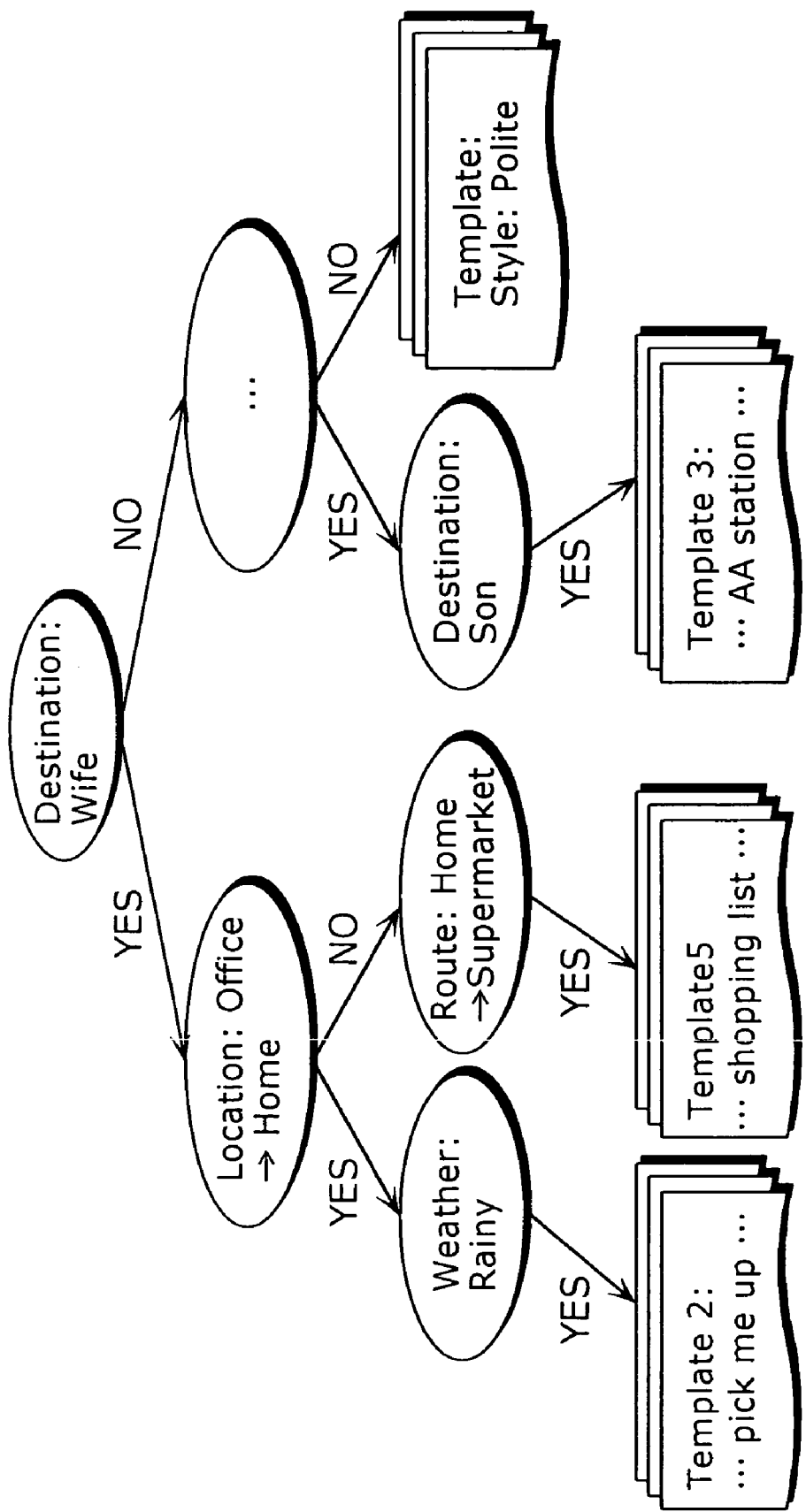
FIG. 46 is a diagram for explaining a method of extracting a usage pattern in the second embodiment.

For the extraction of usage patterns in the present embodiment, the usage situations are categorized into weekday and holiday, morning, daytime and night, and the like, in a predetermined order or criterion, as is the case with the first embodiment FIG. 46 is a diagram for explaining a method of extracting a usage pattern in the present embodiment.

For example, the behavior pattern extraction unit 205a judges, for the e-mail shown in the application usage history, whether or not the destination is the user's wife, and when the destination is his wife, it further judges whether or not the usage location is on the route from his office to his home, and when the usage location is on that route, it further judges whether or not it is rainy, and when it is rainy, it judges which template was used. On these judgments, one usage pattern is extracted.

Here, the behavior pattern extraction unit 205a may extract usage patterns by dynamically changing the order of these judgments, the categorization rules and the categories themselves, by a clustering method or the like. To be more specific, the behavior pattern extraction unit 205a judges whether or not the usage of the application falls within the records (such as destinations and usage locations) shown in the application usage history, in descending order of correlation between them.

For example, in the case where the user's usage pattern on Monday and Tuesday is different from the usage pattern on other days of the week because Monday and Tuesday are his holidays, other days than Monday and Tuesday have a strong correlation with the working days. So, the behavior pattern extraction unit 205a first extracts a usage pattern by judging whether or not e-mail is used on another day than Monday and Tuesday. Or, if the application usage history shows that the user often sends e-mail messages to his son, using the template 3 (that is a model for asking him if he wants the user to come and pick him up), on rainy days, regardless of the date and time, the behavior pattern extraction unit 205a judges whether it is rainy or not, as well as whether the destination is his son or not. As a result, the usage pattern that e-mail of the template 3 is sent to his son on a rainy day is extracted. Or, if the application usage history shows that the user often sends e-mail messages to his wife, using the template 2 (that is a model for asking her to come and pick him up), on rainy days, and that he often sends e-mail messages to his wife, using the template 5 (that is a model for asking her to send a shopping list), on the route by way of a supermarket, the behavior pattern extraction unit 205a extracts the usage pattern that e-mail of the template 2 is sent to his wife on a rainy day and the usage pattern that e-mail of the template 5 is sent to his wife on the route by way of a supermarket, based on the extraction method shown in FIG. 46.

The information display control unit 204a specifies, by referring to the usage prediction rules stored in the behavior prediction rule storage unit 203a, the application with a larger number of uses (higher usage probability) from among the applications corresponding to the output results from the GPS reception unit 108, the calendar clock 107 and the condition detection unit 403, and presents that application.

The content parameter control unit 402 specifies, by referring to the usage prediction rules stored in the behavior prediction rule storage unit 203a, the content parameter with a larger number of uses (higher usage probability) from among the content parameters (such as a destination and a template) corresponding to the output results from the GPS reception unit 108, the calendar clock 107 and the condition detection unit 403, and inputs the specified content parameter into the application presented and started by the information display control unit 204a.

Figure 47:
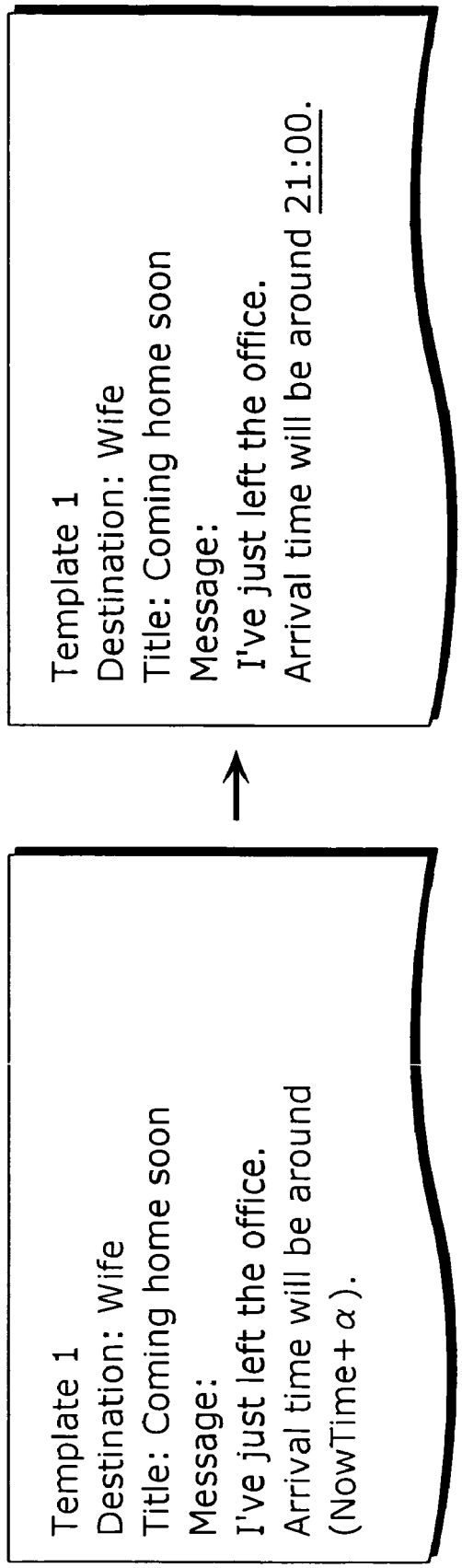
FIG. 47 is a diagram showing a state in which a content parameter control unit in the second embodiment inputs a content parameter for an e-mail application.

FIG. 47 is a diagram showing a state in which the content parameter control unit 402 inputs a content parameter into an e-mail application.

When the content parameter control unit 402 judges that the user left the office and is heading for his home based on the output results from the GPS reception unit 108, the calendar clock 107 and the condition detection unit 403, it specifies, for example, the content parameter that the destination is his wife and the content parameter that the used template is the template 1, by referring to the usage prediction rules.

Then, the content parameter control unit 402 inputs the address of his wife into the e-mail destination field and the template 1 into the e-mail text field. Here, a variable section such as "an arrival time" is set in the template 1 depending on the current time and situation, as mentioned above. Therefore, "the current time (20:00)+a predetermined coefficient α (1:00)=21:00 is inputted into this "arrival time". Note that the coefficient α may be variable based on the past usage history.

For example, the content parameter control unit 402 calculates the coefficient α, using the time at which the user used the template 1 and the arrival time which was written by the user by editing the template 1. By doing so, it becomes possible to set the coefficient α appropriately depending on the user's life style.

It is also possible to set a sentence (<Sentence 1>) which can be selectively changed by the user in the template 1. For example, the user selects any one of the sentences "Please cool beer", "Please record TV program on 48Ch" and others, and inputs the selected sentence into the template 1.

Figure 48:
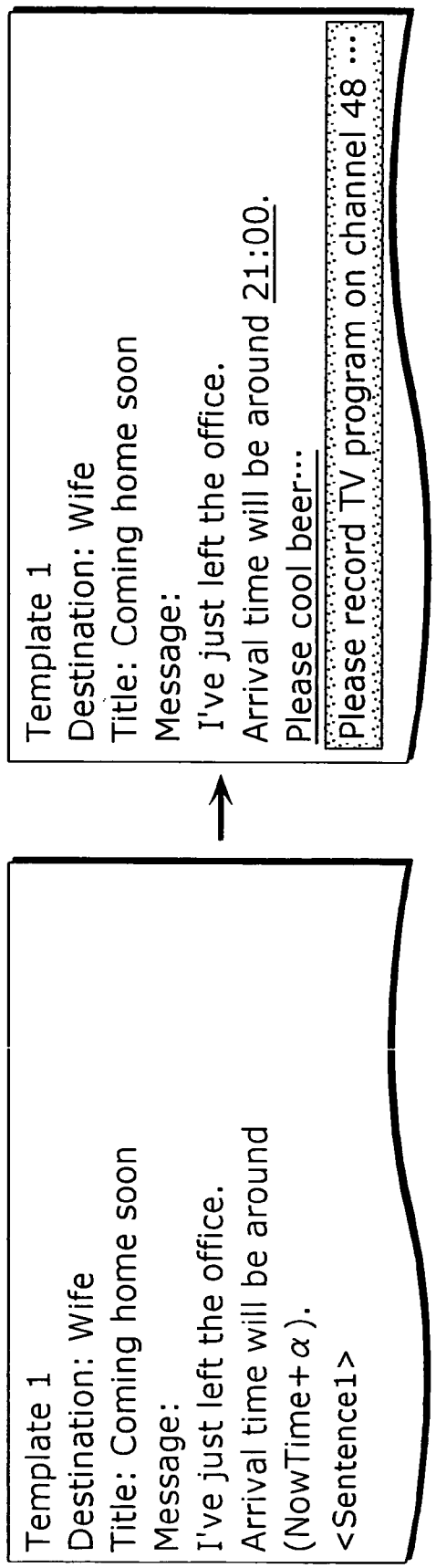
FIG. 48 is a diagram for explaining a case where a selectively changeable sentence is set as a template 1 in the second embodiment.

FIG. 48 is a diagram for explaining a case where a selectively changeable sentence is set in the template 1.

As shown in FIG. 48A, the display 105 shows the sentences such as "Please cool beer" and "Please record TV program on 48Ch" so that one of them can be selected as <Sentence 1> in the template 1. The user selects any one of the sentences by operating the input device 106.

In order to prompt the user to select such a sentence, the content parameter control unit 402 previously holds these sentences in association with the template 1, as shown in FIG. 48B. The content parameter control unit 402 also holds the number of uses of these sentences. Therefore, the content parameter control unit 402 causes the display 105 to display the sentence with the largest number of uses preferentially and hatch the other sentences for display.

Figure 49:
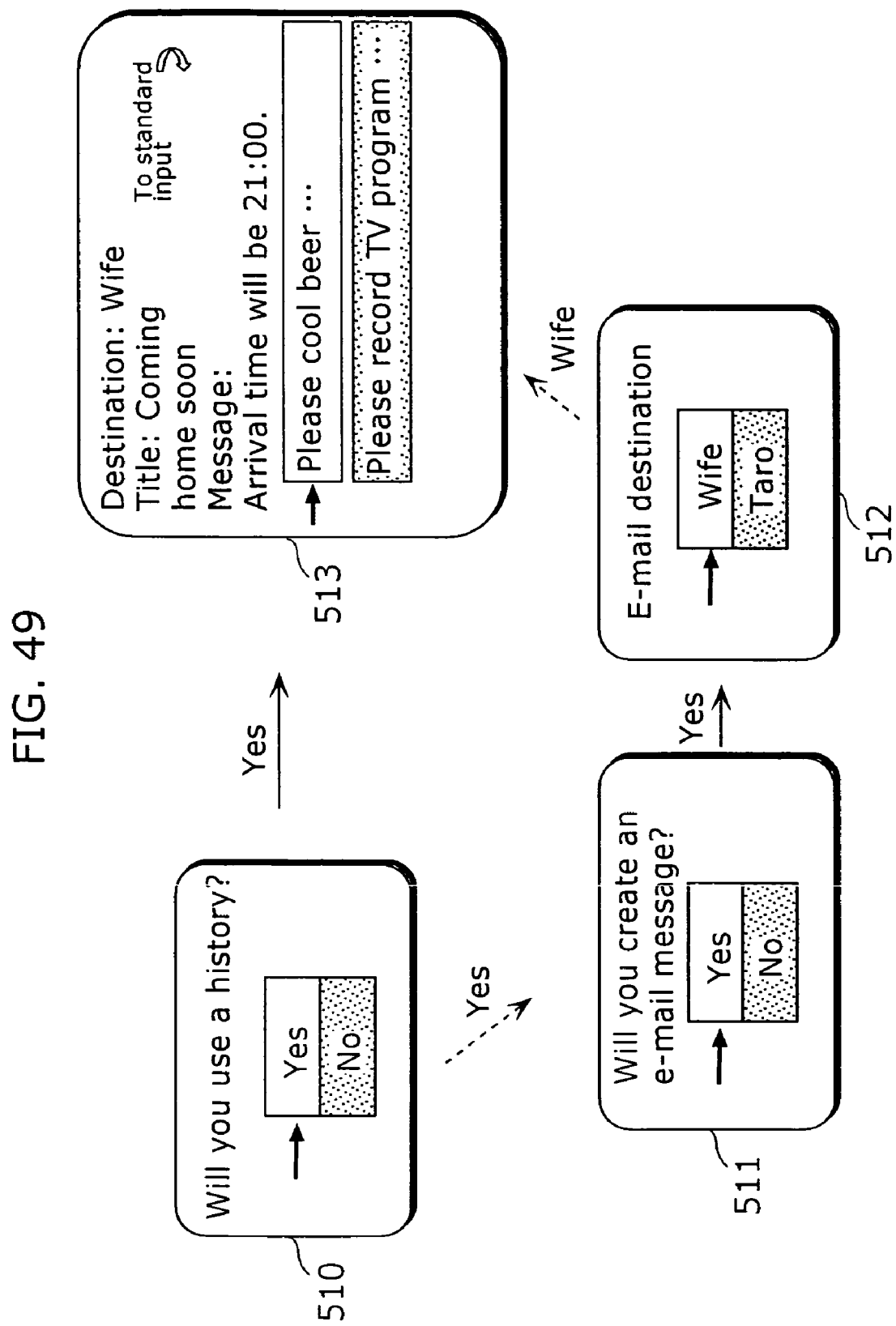
FIG. 49 is a diagram showing a screen displayed on a display depending on operations of an information display control unit and a content parameter control unit in the second embodiment.

FIG. 49 is a diagram showing a screen on the display 105 shown depending on the operations of the information display control unit 204a and the content parameter control unit 402.

Firstly, the information display control unit 204a causes the display 105 to display a screen 510 inquiring the user about whether to use a history or not, depending on the output from the input device 106.

When "Yes" is selected here, the information display control unit 204a predicts e-mail as an application and starts it up, while the content parameter control unit 402 predicts the above-mentioned content parameters and inputs them into the e-mail application. Then, the content parameter control unit 402 displays, on the display 105, a screen 513 showing those inputs.

Or, when "Yes" is selected on the screen 510, the information display control unit 204a predicts e-mail as an application, and causes the display 105 to display a screen 511 inquiring whether to create an e-mail message or not. When "Yes" is selected here, the content parameter control unit 402 predicts a destination as a content parameter, and causes to display a screen 512 showing destination candidates. When "Wife" is selected here, the content parameter control unit 402 predicts a template as a content parameter, and causes to display the screen 513 same as the screen mentioned above.

A description is given below for the overall operations of the mobile terminal 32 in the above-mentioned present embodiment.

Figure 50:
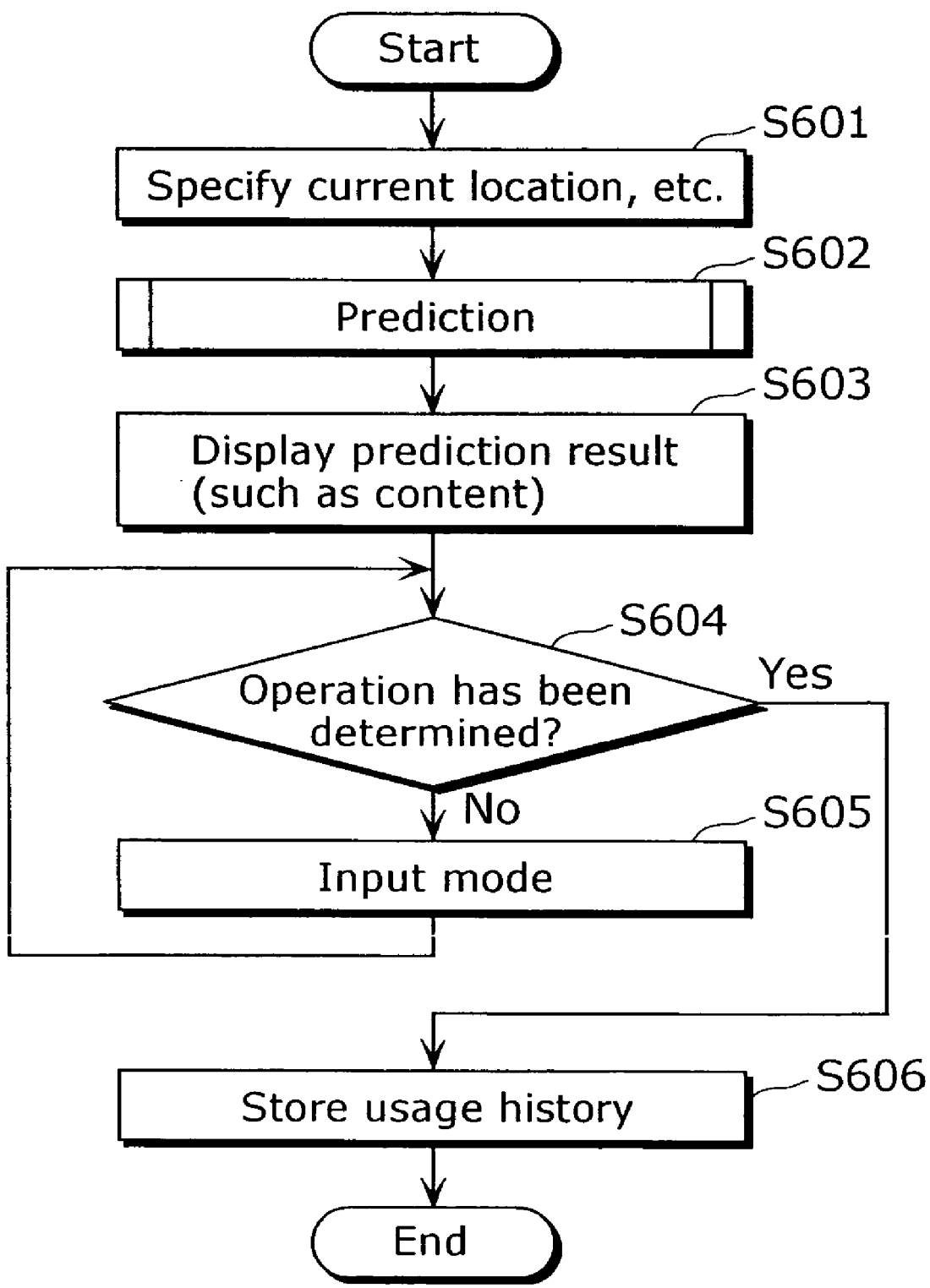
FIG. 50 is a flowchart showing overall operation of the mobile terminal in the second embodiment.

FIG. 50 is a flowchart showing the overall operations of the mobile terminal 32.

Firstly, when the user selects the use of the history (for example, the screen 510 in FIG. 49) by operating the input device 106, the mobile terminal 32 specifies the current date and time and the current location based on the operations of the calendar clock 107 and the GPS reception unit 108, and specifies the weather condition based on the operation of the condition detection unit 403 (Step S601). For example, in the case where the user of the mobile terminal 32 is heading from the office to the station at 20:00 on Friday, the mobile terminal 32 specifies 20:00 on Friday as the current date and time, and specifies the route from the office to the station as the current location.

Next, the mobile terminal 32 predicts an application and content parameters using the usage prediction rules stored in the usage prediction rule storage unit 203 (Step S602). For example, the mobile terminal 32 predicts e-mail as an application corresponding to the specification result in Step S601, and predicts a destination "Wife" and a template "Template 1" as content parameters. Then, the mobile terminal 32 displays the content parameters (Step S603). For example, it displays 21:00 (the current time 20:00+1:00) as the arrival time shown in the template 1.

Then, the mobile terminal 32 judges, based on the user's operation of the input device 106, whether the operation appropriate for the prediction has been determined or not (Step S604). To be more specific, when the user instructs transmission of e-mail because he feels no need to edit the template 1, the mobile terminal 32 judges that the operation appropriate for the prediction has been determined, whereas, when the user instructs editing, the mobile terminal 32 judges that the operation appropriate for the prediction has not been determined.

Here, when judging that the operation has been determined (Yes in Step S604), the mobile terminal 32 stores the usage history of e-mail (Step S606). To be more specific, the used application, the template 1 and the like are stored as a history in the usage history storage unit 111a. When judging that the operation has not been determined (No in Step S604), the mobile terminal 32 goes into input mode (Step S605). Namely, the mobile terminal 32 goes into a state in which the text of the template 1 can be edited. After that, the mobile terminal 32 repeats the operations from Step S604.

Figure 51:
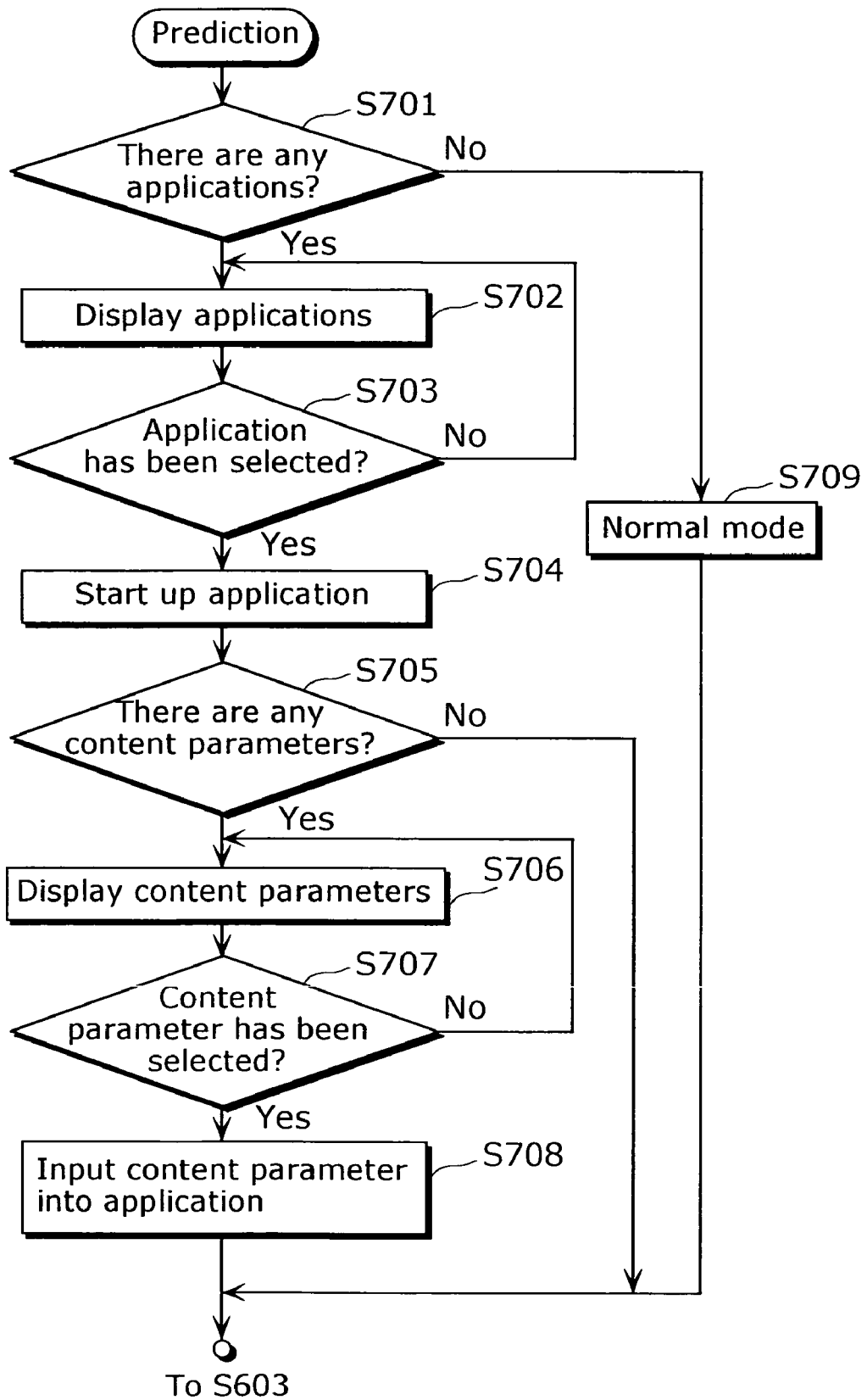
FIG. 51 is a flowchart showing in detail an operation of prediction in the second embodiment.

FIG. 51 is a flowchart showing in detail the prediction operation.

The information display control unit 204a and the content parameter control unit 402 (these units are referred to just as a control unit) of the mobile terminal 32 first judges, in Step S602 in FIG. 50, whether or not there are any application candidates, by referring to the usage prediction rules (Step S701). Here, if there is no application candidate (No in Step S701), the control unit goes into the normal mode (Step S709), while if there are any application candidates (Yes in Step S701), the control unit causes the display 105 to display that application candidates (Step S702).

Next, the control unit judges, based on the output from the input device 106, whether or not any one of the applications has been selected from among the displayed candidates (Step S703). When judging that no application has been selected, the control unit repeats the operations from Step S702, and when judging that any one of the applications has been selected, the control unit starts up the selected application (Step S704). Next, the control unit judges whether there are any candidates for content parameters by referring to the usage prediction rules (Step S705). Here, when there are any candidates for content parameters (Yes in Step S705), the control unit causes the display 105 to display the candidates for content parameters (Step S706).

Next, the control unit judges, based on the output from the input device 106, whether or not any one of the content parameters has been selected from among the displayed candidates (Step S707). Here, when judging that no content parameter has been selected (No in Step S707), the control unit repeats the operations from Step S706, and when judging that any one has been selected, the control unit inputs the selected content parameter into the started-up application (Step S708).

Note that in the case where there is only one application candidate, the control unit may start up that application without executing the operations of Steps S702 and S703. In the case where there is only one content parameter candidate in Step S705, the control unit may input that content parameter into the application without executing the operations of Steps S706 and S707.

As described above, according to the present embodiment, the application and content parameter appropriate for the location, date and time and weather condition of the mobile terminal 32 are specified based on the usage prediction rules and displayed as prediction results. Therefore, it becomes possible to predict an application and a content parameter appropriate for the current situation so as to improve the user's usability.

(Modification 1)

A description is given here for the first modification of the present embodiment.

The mobile terminal according to the first modification not only starts its prediction when accepting the operation of giving an instruction to use a history, but also starts the prediction based on the detection result by a sensor.

For example, the mobile terminal according to the first modification includes a power sensor for detecting power on/off, a mode sensor for detecting a mode (such as a manner mode and a normal mode) switching, or a light sensor.

If the mobile terminal includes a power sensor, it starts predicting an application or the like when the power is turned on, whereas if it includes a mode sensor, it starts the prediction when a mode is switched. If it includes a light sensor, it starts predicting an application or the like depending on the surrounding lightness. To be more specific, when the user takes the mobile terminal out of his bag, the light sensor detects sudden lightness, and the mobile terminal starts the prediction when detecting the lightness.

In the case where the mobile terminal is constituted as an in-car apparatus for a car navigation system, it may include, for example, a wiper sensor for detecting a movement of a wiper, a brake sensor for detecting a condition of a side brake, a lever sensor for detecting whether a shift lever is positioned to parking or not, a stop sensor for detecting a stop of a car, or a sight line sensor for detecting a user's line of sight.

It the mobile terminal includes a brake sensor, it starts prediction when a side brake is put on. If it includes a lever sensor, it starts prediction when a shift lever is positioned to parking. If it includes a stop sensor, it starts prediction when a car stops. And if it includes a sight line sensor, it starts prediction when the user turns his sight to the display 105 on the mobile terminal.

Here, if the mobile terminal includes a wiper sensor, it may use the wiper sensor as the condition detection unit 403.

To be more specific, the condition detection unit 403 detects that it is in the rainy condition if the wiper is moving. The mobile terminal starts predicting an application or the like when the wiper movement starts.

Figure 52:
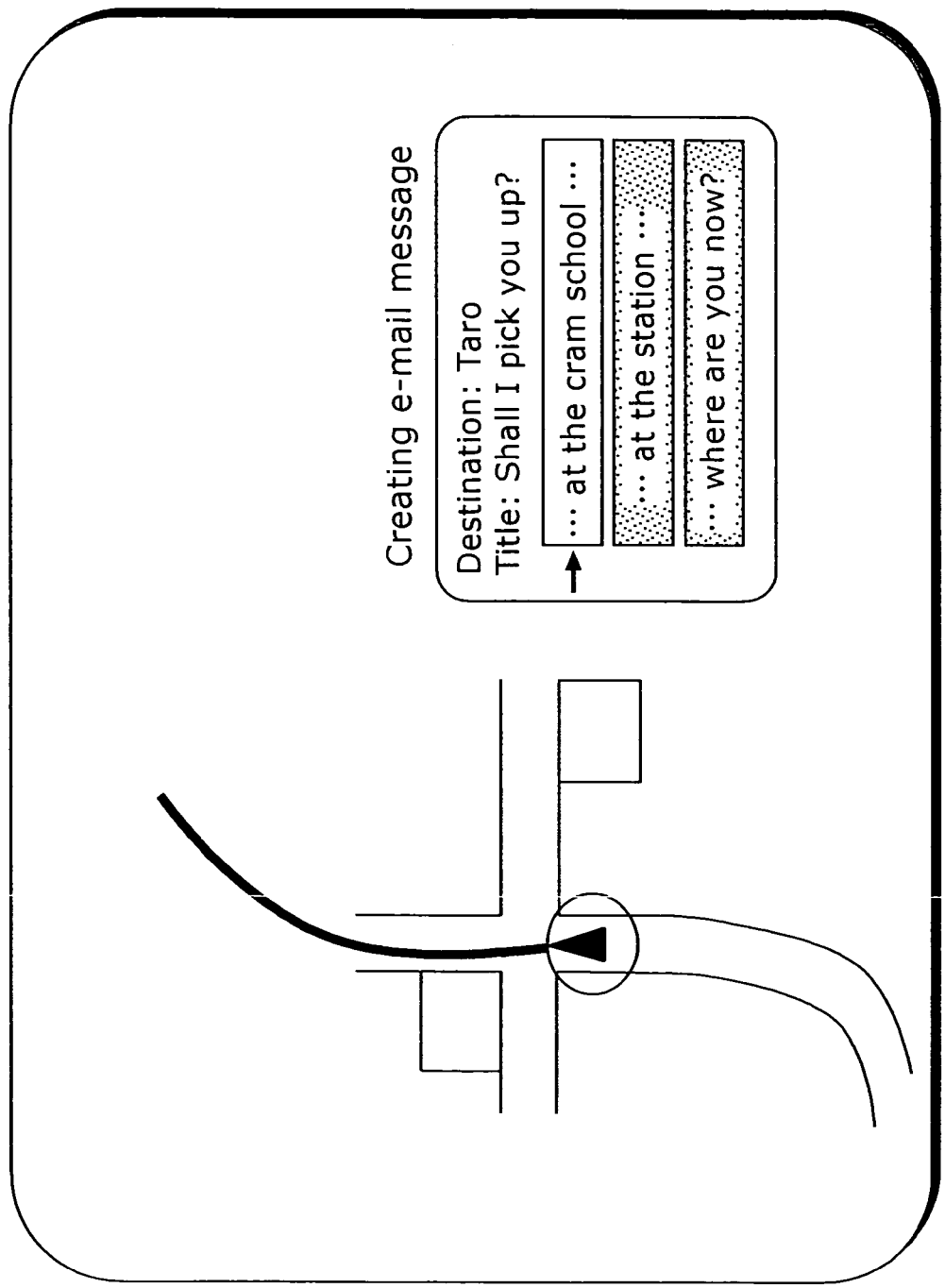
FIG. 52 is a diagram showing a screen displayed on a mobile terminal equipped with a wiper sensor in the second embodiment.

FIG. 52 is a diagram showing a screen displayed on the mobile terminal equipped with a wiper sensor.

When the user moves the wiper, the mobile terminal specifies the current weather is rain based on the detection result by the wiper sensor, and starts predicting an application and a content parameter based on the specification of rain.

As a result, the mobile terminal predicts an e-mail application and starts it up. The mobile terminal further predicts a template for asking whether or not to come and pick up the user's son "Taro", and displays the text of the template.

As described above, in the present modification, prediction is started based on a sensor detection result. Therefore, even if the user forgets to use an application and a content parameter, it is possible to prompt the user to use them. It is possible to call the user's attention or give advice to him, for example, to remind the user to come and pick up his child when it rains. Furthermore, in the present modification, the user does not need to conduct complicated operations of the mobile terminal while driving a car, but can drive safely. In addition, the mobile terminal according to the present modification starts up e-mail during the user's normal motions for driving a car so as to make him input a content parameter, so it is possible to complete e-mail transmission in a short time such as a waiting time for the traffic light to change.

(Modification 2)

A description is given for the second modification of the present embodiment.

A mobile terminal according to the second modification is constituted as an in-car device for a car navigation system, and inserts an arrival time predicted using a navigation function into a template.

Figure 53:
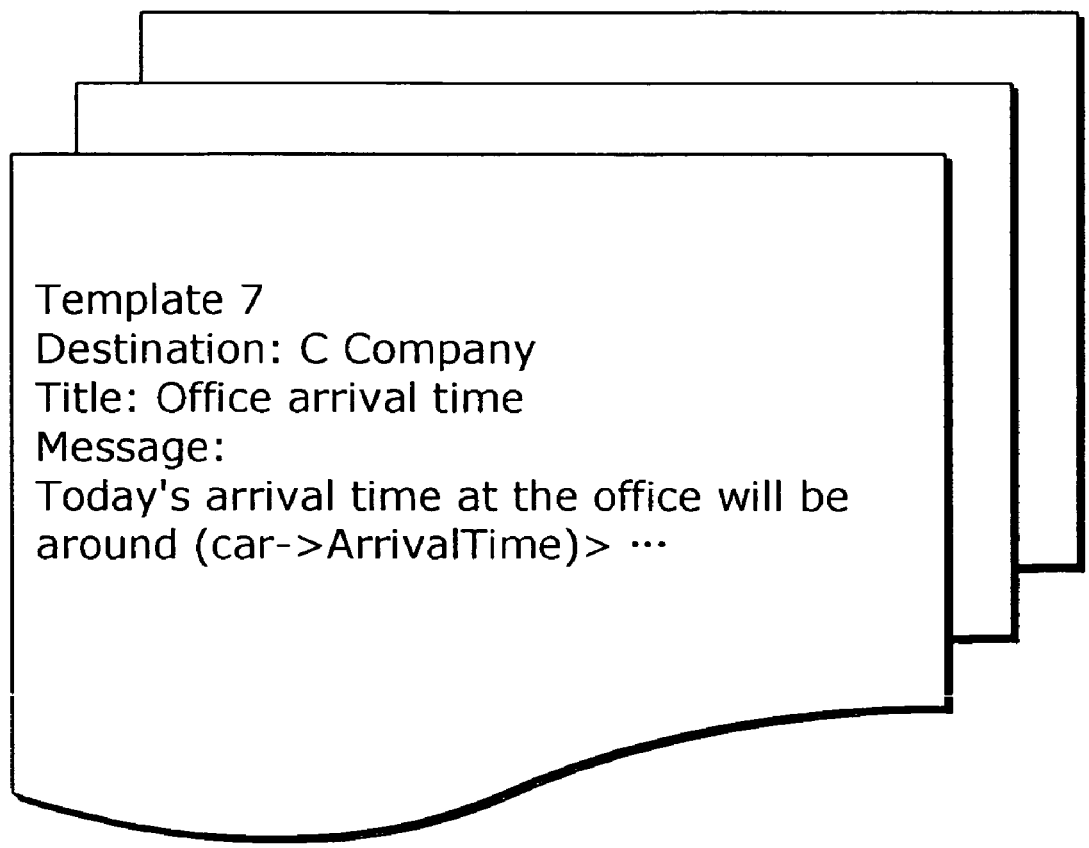
FIG. 53 is a diagram showing contents of a template in which an arrival time predicted by a navigation function is inserted in the second embodiment.

FIG. 53 is a diagram showing contents of a template into which an arrival time predicted by a navigation function is inserted.

In a template 7 shown in FIG. 53, a rule (car→ArrivalTime) indicating that an arrival time predicted by the navigation function is to be inserted is set. When the mobile terminal predicts the template 7 as a content parameter, it predicts an arrival time (10:20) using the navigation function, and inserts the arrival time (10:20) into the template 7.

Figure 54:
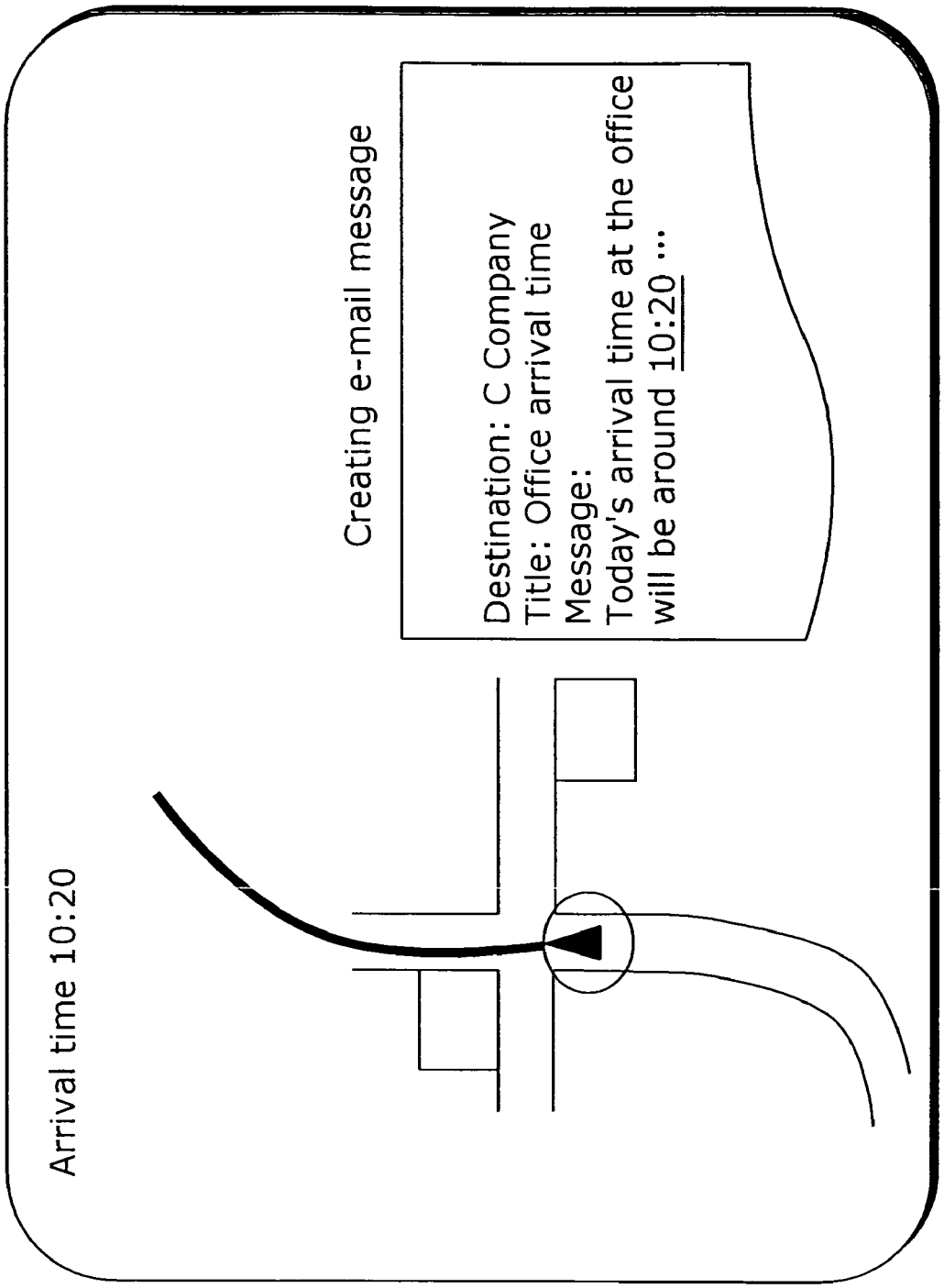
FIG. 54 is a diagram showing a screen displayed on the mobile terminal in the second embodiment.

FIG. 54 is a diagram showing a screen displayed on the mobile terminal.

For example, in the case where the user always sends e-mail informing his arrival time to his office when he is likely to be late for work, the usage prediction rules created based on the user's e-mail usage history are stored in the behavior prediction rule storage unit 203a.

As a result, when the user is likely to be late, the mobile terminal predicts e-mail as an application and the template 7 as a content parameter, based on the current date and time, the current location and the like. Then, the mobile terminal pops up the contents of the template 7 on the screen of the navigation apparatus, without receiving the input from the user.

By doing so, the user can become aware of informing the office of his arrival time, and further create an e-mail message easily without inputting text and send it.

Note that the mobile terminal according to the present modification inserts the arrival time predicted by the navigation function, but it may obtain the arrival time from the server by communication via the Internet or the like and then insert it.

(Modification 3)

A description is given here for the third modification of the present embodiment.

The mobile terminal according to the present modification predicts, as content parameters, a sound volume, an image display mode, an operation mode such as a manner mode. To be more specific, the mobile terminal according to the present modification holds the usage prediction rules including the above content parameters such as a sound volume.

FIG. 55 is a diagram showing the contents of the use prediction rules stored in the behavior prediction rule storage unit 203a of the mobile terminal in the present modification.

As shown in FIG. 55, the usage prediction rules include "Channel: Ch8" and "Volume: 75" as content parameters corresponding to the application "television (TV)", as well as "Manner mode" as a content parameter corresponding to the applications in general.

For example, the mobile terminal judges that it is now weekday night and on the route from AA station to BB station, it predicts, as content parameters corresponding to the application in general, "Manner mode", "Reception-permitted party: C Company" and the like, and sets the predicted mode and the like by itself.

By doing so, even if the user forgets to make such settings, it becomes possible to switch the mode to the manner mode or switch the reception-permitted party to another party, depending on the current situation. The setting of the manner mode varies from place to place. For example, the ordinary manner mode is set in a train or the like so that any airwaves are shut out, while the manner mode is set in the Shinkansen "bullet" train or the like so that only the e-mail messages can be received. Additionally, the manner mode is set in the office's conference room so that the incoming calls from specific numbers which are set as emergency contact numbers are received while other calls are not received. Since the setting of the manner mode varies from place to place as mentioned above, the user needs to change the setting per place, which is inconvenient to the user.

The above-mentioned mobile terminal according to the present modification is able to automatically set the manner mode appropriate for the situation using the manner mode history which was set in the past, and thus prevents the user from forgetting to change the setting. Alternatively, the mobile terminal may only display the content parameters such as a predicted manner mode. In this case, it is possible to notify the user of the appropriate setting so as to prompt him to change the setting.

Note that the mobile terminal according to the present modification predicts, as content parameters, a sound volume, an image display mode, an operation mode such as a manner mode, but it may predict such an operation mode as an operation mode of the mobile terminal (itself), regardless of the application.

Note that the mobile terminal in the present embodiment or each modification thereof presents the user the content parameter such as a template that is the prediction result by displaying it, but it may present it by voice. Alternatively, the mobile terminal may input the user's voice. To be more specific, the mobile terminal recognizes the user's voice, converts it into text, and inputs the text into a sentence of an e-mail message. By doing so, it becomes possible to improve user's usability as well as driving safety.

Third Embodiment

State-of-the-art mobile phones (mobile terminals) are configured so that a wide variety of applications are available on them, and have increasingly larger size displays. As a result, they consume a larger amount of power, which increasingly require charging batteries away from home.

Against this backdrop, the mobile terminal in the present embodiment not only predicts an application and a content parameter which are likely to be used currently and in the future, but also prevents shortage of power caused by the use of the application and the content parameter. To be more specific, this mobile terminal judges whether or not the execution of the application causes shortage of power, and when it judges the shortage of power, it presents the user a message for prompting him to charge and a place where he can charge. By doing so, the user can charge the mobile terminal before executing the application, and therefore it becomes possible to prevent such a situation that the execution of the application is interrupted due to shortage of power.

Figure 56:
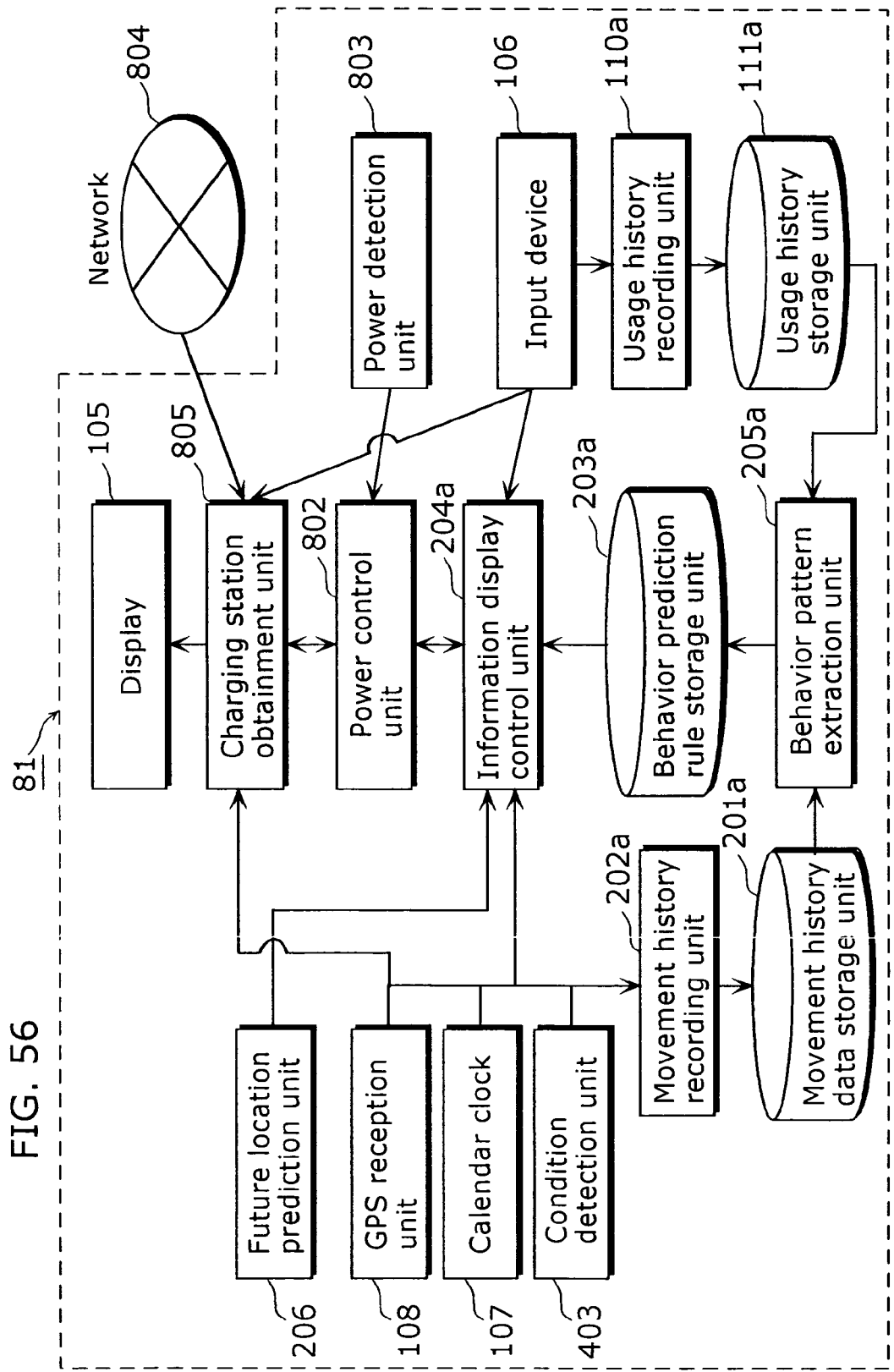
FIG. 56 is a functional block diagram showing a functional structure of a mobile terminal in a third embodiment.

FIG. 56 is a functional block diagram showing the functional structure of the mobile terminal in the present embodiment.

A mobile terminal 81 in the present embodiment includes a display 105, a GPS reception unit 108, a calendar clock 107, a condition detection unit 403, a movement history data storage unit 201*a*, a movement history recording unit 202*a*, a behavior prediction rule storage unit 203*a*, an information display control unit 204*a*, a behavior pattern extraction unit 205*a*, an input device 106, a usage history recording unit 110*a*, a usage history storage unit 111*a*, a power detection unit 803, a power control unit 802, and a charging station obtainment unit 805. Note that as for the above-mentioned components included in the mobile terminal 81 in the present embodiment, the reference numbers same as those assigned to the components included in the mobile terminal 11, 21 or 32 shown in FIG. 3, FIG. 35 or FIG. 42 are assigned to the components having the same functions and structures as those of the mobile terminal 11, 21 or 32, and the detailed description thereof is not repeated here.

The usage history recording unit 110*a* creates a usage history by associating the used applications and content parameters with the usage dates and times, and stores the usage history into the usage history storage unit 111*a*, as is the case with the first and second embodiments. Then, the usage history recording unit 110*a* in the present embodiment adds application usage duration into the content parameters.

As a result, the behavior pattern extraction unit 205*a* in the present embodiment creates usage prediction rules in which the used applications are associated with their usage durations.

FIG. 57 is a diagram showing the contents of the usage prediction rules created by the behavior pattern extraction unit 205*a*.

When the behavior pattern extraction unit 205*a* extracts a usage pattern that the application "TV" was used under usage situations such as a time "weekday night" and a location "AA station→BB station" in a manner indicated by content parameters such as a sound volume "50" and a usage duration "60 minutes", it updates the usage prediction rule shown in FIG. 57 so that the number of uses in the extracted usage pattern increases by one.

The future location prediction unit 206 in the present embodiment includes the components included in the mobile terminal 11 using the location prediction method B, and holds the behavior prediction rules for predicting the future location. The future location prediction unit 206 predicts the future location of the mobile terminal 81 by referring to these behavior prediction rules, and notifies the information display control unit 204*b* of the prediction result. The future location prediction unit 206 further predicts the date and time (calendar attribute) when the mobile terminal 81 is likely to arrive at the location based on the past movement history, and also notifies the information display control unit 204*b* of the prediction result, too.

FIG. 58 is a diagram showing the contents of the usage prediction rules held by the future location prediction unit 206.

As shown in FIG. 58, the behavior prediction rules show that the movement probability that the mobile terminal 81 is likely to move from AA station to BB station in the future is 95% in the case where the current date and time is "weekday night" and the current location is "office to AA station".

The information display control unit 204*b* has both the function of the information display control unit 204*a* of the mobile terminal 32 in the second embodiment and the function of the content parameter control unit 402, and predicts an application and a content parameter appropriate for the future or current location of the mobile terminal 81. To be more specific, the information display control unit 204*b* specifies the application and the content parameter corresponding to the location predicted by the future location prediction unit 206 or the location detected by the GPS reception unit 108, by referring to the usage prediction rules stored in the behavior prediction rule storage unit 203*a*.

For example, when the future location prediction unit 206 predicts the future location "AA station to BB station" and the future date and time by referring to the behavior prediction rules shown in FIG. 58, the information display control unit 203*b* obtains the weather condition at the predicted date and time from the condition detection unit 403. Here, the condition detection unit 403 obtains the weather condition at the date and time from the server via the Internet.

Then, the future location prediction unit 206 retrieves, from the usage prediction rules shown in FIG. 57, the usage situation that corresponds to the above-mentioned future location, date and time and weather condition, and predicts, as an application and content parameters that are likely to be used in the future, the application "TV" and the content parameters (such as the sound volume "50" and the usage duration "60 minutes") associated with the retrieved usage situation.

Furthermore, the information display control unit 204*b* retrieves, from the usage prediction rules shown in FIG. 57, the usage situation that corresponds to the output results from the GPS reception unit 108, the calendar clock 107 and the condition detection unit 403, and predicts, as an application and content parameters that are likely to be used currently, the application and content parameters associated with the retrieved usage situation.

The power detection unit 803 detects the remaining amount of power of the mobile terminal 81.

The power control unit 802 holds a power consumption table. The power control unit 802 further specifies the remaining amount of power detected by the power detection unit 803 and the application and content parameters predicted by the information display control unit 204*b*, and by referring to the power consumption table, judges whether or not the power shortage will occur when the predicted application is executed. To be more specific, the power control unit 802 judges whether charging of the battery is needed or not, and if it is needed, causes the display 105 display a message for prompting the user to charge.

FIG. 59 is a diagram showing the contents of the power consumption table.

As shown in FIG. 59, in the power consumption table 853, applications such as "music player" and "television (TV)", content parameters such as "volume 75", and power coefficients corresponding to respective applications and content parameters are registered. The power coefficient indicates the amount of power required per unit time. For example, the power consumption table shown in FIG. 59 shows that the amount of power "5" is needed per unit time for the execution of the application "television (TV)" at the sound volume "50".

For example, when the information display control unit 204*b* predicts the application "television (TV)" and the content parameters (the volume "50" and the usage duration "60 minutes") and the like, the power control unit 802 specifies the power coefficient "5" for the application "television (TV)" and the volume "50", by referring to the above power consumption table 853. Next, the power control unit 802 calculates, using the power coefficient "5" and the usage duration "60 minutes", the amount of power which is to be consumed when the application is executed with the above content parameters. To be more specific, the power control unit 802 predicts the amount of power consumption 300 (Power coefficient "5"×Usage duration "60 minutes"=300). The power control unit 802 compares the detection result by the power detection unit 803 and the above power consumption amount "300" so as to judge whether charging is needed or not.

For example, if the current remaining amount of battery power is "200" as a result of detection by the power detection unit 803, the power control unit 802 compares the remaining amount of battery power "200" and the power consumption amount "300", and judges that charging is needed. Note that the power detection unit 803 may judge that charging is needed when the difference between the remaining amount of battery power and the amount of power consumption is a predetermined threshold or smaller. For example, if the threshold is "10", the power detection unit 803 judges that charging is needed because the amount of power obtained by subtracting the amount of power consumption "200" from the remaining amount of battery power "210" is "10", which is highly possible to cause power shortage.

Figure 60:
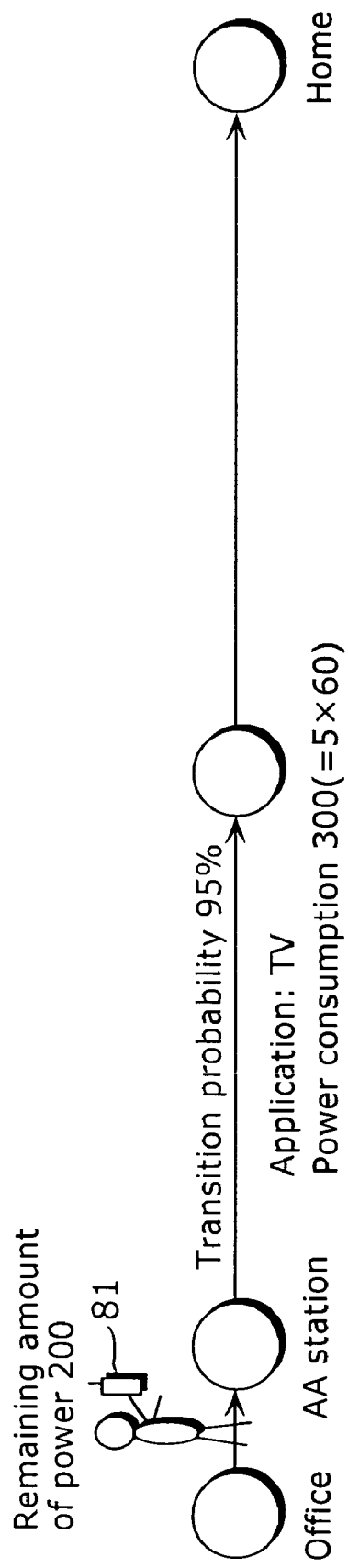
FIG. 60 is a diagram for explaining how a power control unit in the third embodiment predicts power consumption.

FIG. 60 is a diagram for explaining how the power control unit 802 predicts an amount of power consumption.

For example, when the user of the mobile terminal 81 is moving from his office to AA station at 20:00 on Friday night, the future location prediction unit 206 of the mobile terminal 81 predicts, by referring to the behavior prediction rule shown in FIG. 58 as mentioned above, that the mobile terminal 81 will move "from AA station to BB station" on weekday night. The information display control unit 204*b* predicts, based on the prediction result by the future location prediction unit 206 and the usage prediction rules shown in FIG. 57, that the user will use the application "television (TV)" and the content parameters (such as the volume "50" and the usage duration "60 minutes") on "Weekday night" on the way "from AA station to BB station".

As a result, the power control unit 801 predicts the amount of power consumption "300" as mentioned above, and further judges that charging is needed by comparing the predicted amount "300" with the remaining amount of power "500" detected by the power detection unit 803.

Figure 61:
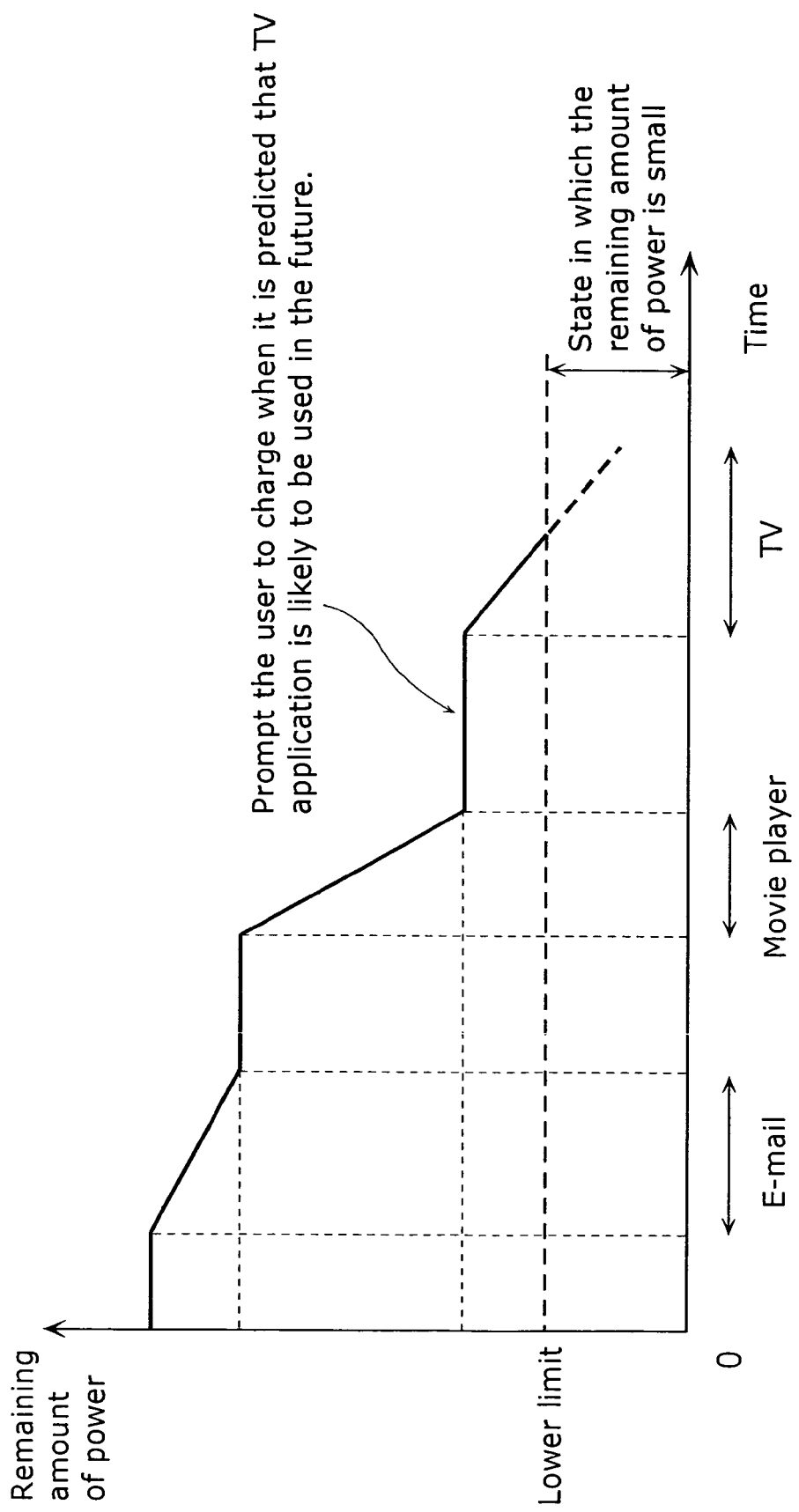
FIG. 61 is a diagram showing transition of values in remaining amount of power of the mobile terminal in the third embodiment.

FIG. 61 is a diagram showing the transition of values in the remaining amount of power of the mobile terminal 81.

As shown in FIG. 61, when the power control unit 801 predicts the application "television (TV)" and the content parameters (such as "sound volume 50", "usage duration 60 minutes", it judges whether the remaining amount of power becomes the lower limit (for example, "200") or less when the application is executed. When judging that it becomes the lower limit or less, the power control unit 801 causes the display 105 to display a message indicating that charging is needed, on the route from the office to AA station.

FIG. 62 is a diagram showing one example of a screen displayed on the display 105 by the power control unit 801.

For example, as shown in FIG. 62(*a*), the display 105 displays a message such as "There could be a power Shortage"; "Charging is needed" and an OK button. When the user presses the OK button by his operation, the display 105 displays a message "Display of charging station is necessary?"

As described above, in the present embodiment, before the user carrying the mobile terminal 81 gets on a train moving from AA station to BB station, an application and a content parameter to be used in the train are predicted and a message informing the user whether charging is needed or not is displayed. Therefore, it becomes possible to prevent the application from being interrupted due to power shortage.

When "Yes" is selected on the screen shown in FIG. 62(*b*), the charging station obtainment unit 805 notifies the server via the network 804 of the current location detected by the GPS reception unit 108, and obtains the data indicating the nearest charging station from the server. Then, the charging station obtainment unit 805 causes the display 105 to display a map indicating the charging station based on the data.

Figure 63:
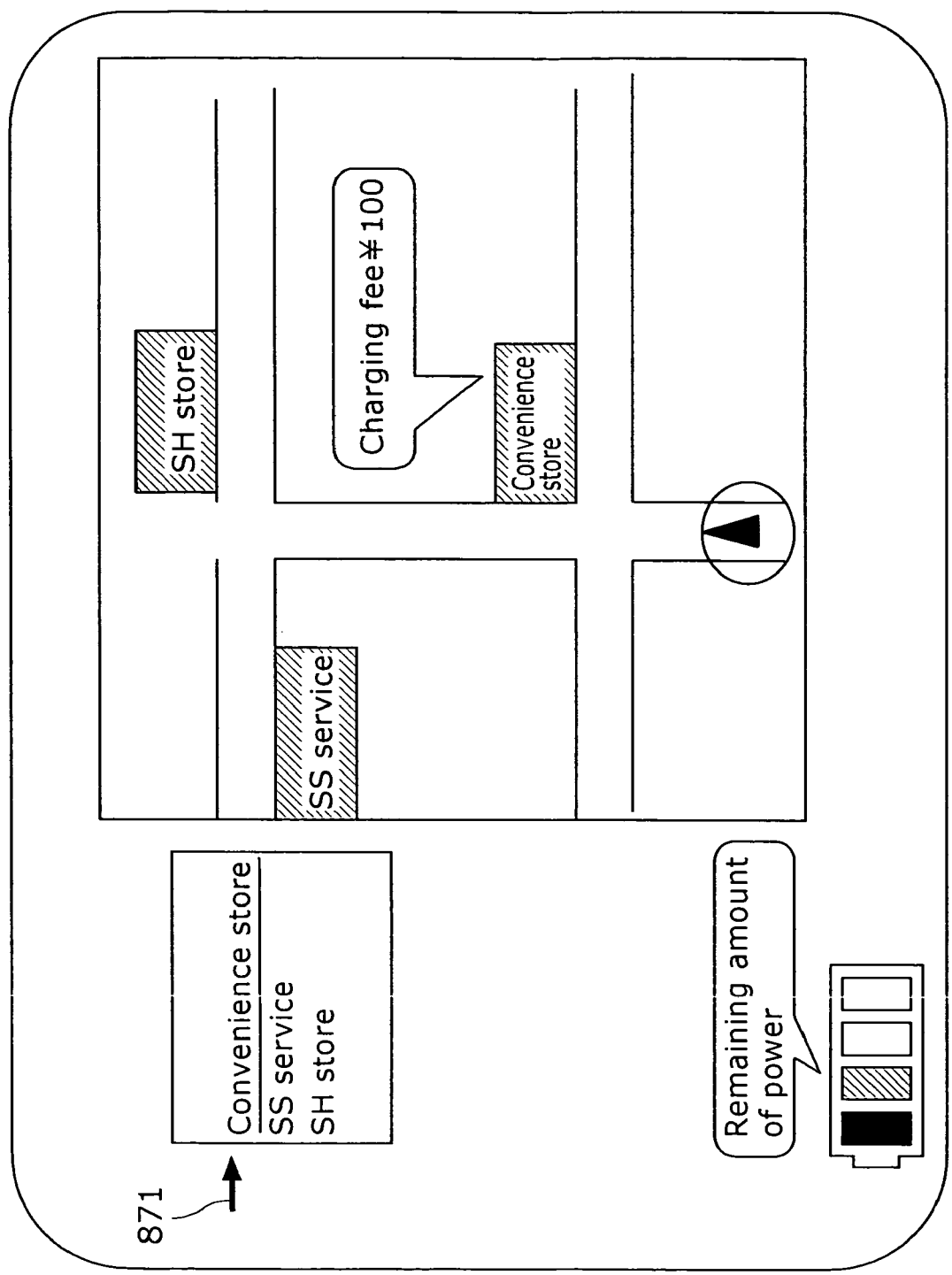
FIG. 63 is a diagram showing one example of a map displayed on the display in the third embodiment.

FIG. 63 is a diagram showing one example of the map displayed on the display 105.

As shown in FIG. 63, the charging station obtainment unit 805 causes the display 105 to display the map showing the charging stations, an icon that is a visual representation of the remaining amount of power and a list of charging stations.

The list of charging stations shows the names of charging stations in ascending order of distance from the user. When any of the names of the charging stations included in the list is marked with an arrow 871 by the user's operation of the input device 106, the detailed information (such as fees and services) on the marked charging station is displayed on the map.

The charging station obtainment unit 805 obtains the remaining amount of power detected by the power detection unit 803 via the power control unit 802, and causes to display the remaining amount of power using the above icon.

Note that the charging station obtainment unit 805 causes the display 105 to display the nearest charging station based on the data obtained from the server, but it may cause to display the charging stations that the user has used before or the like.

Figure 64:
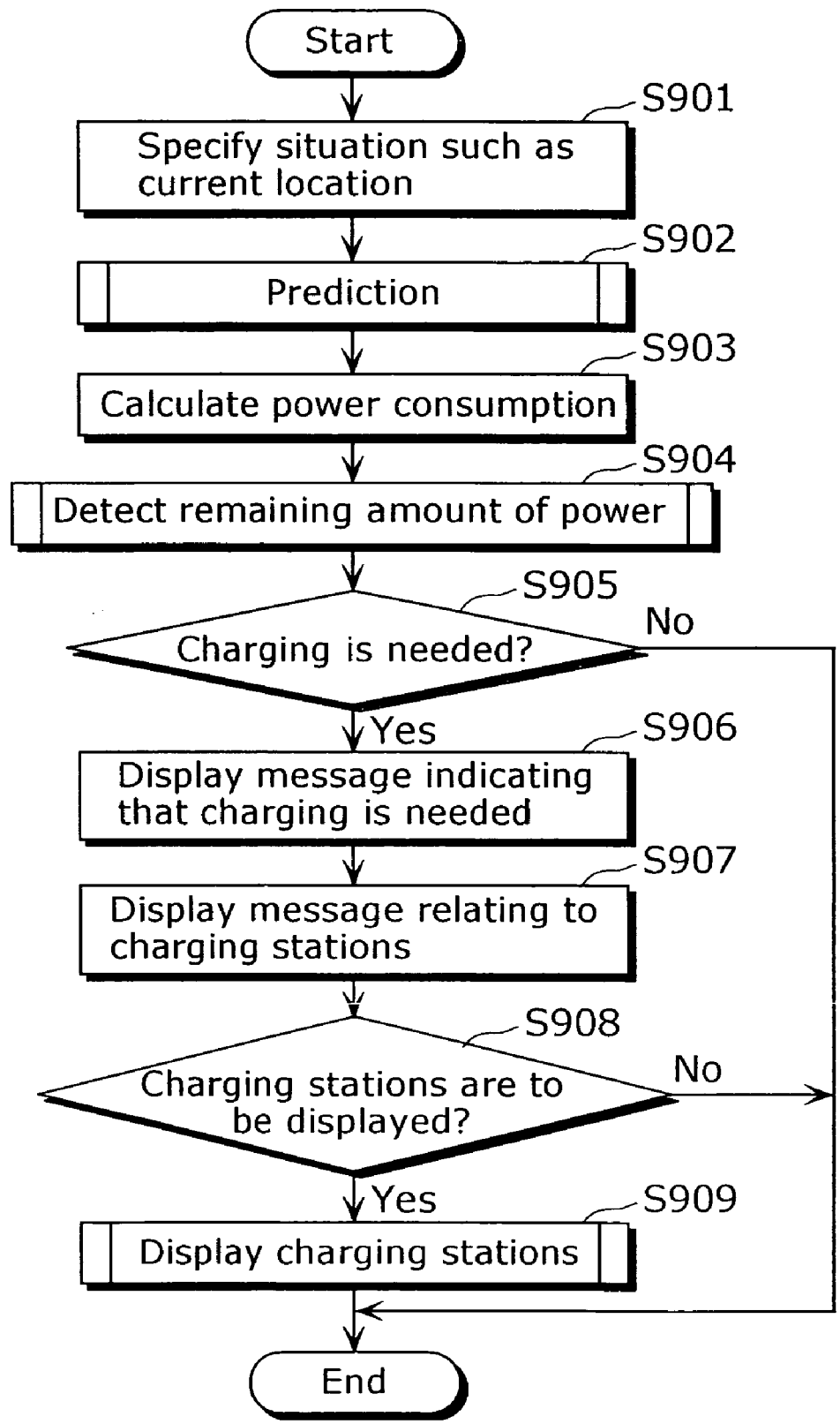
FIG. 64 is a flowchart showing operations of the mobile terminal in the third embodiment.

A description is given here for the operations of the mobile terminal 81 in the present embodiment by referring to FIG. 64.

FIG. 64 is a flowchart showing the operations of the mobile terminal 81.

Firstly, the information display control unit 204 of the mobile terminal 81 specifies the current date and time, location and weather condition based on the output results from the GPS reception unit 108, the calendar clock 107 and the condition detection unit 403 (Step S901).

Next, the information display control unit 204*b* predicts an application and a content parameter that are likely to be used in the future or currently, by referring to the usage prediction rules stored in the behavior prediction rule storage unit 203*a* (Step S902).

For example, in the case where the user of the mobile terminal 81 is moving from his office to the station at 20:00 on Friday, the information display control unit 204 predicts, based on the usage prediction rules shown in FIG. 57, that the application "music player" and the content parameters (such as "usage duration: 20 minutes") are to be used currently.

The power control unit 801 calculates, based on the prediction results of the above application and content parameters and the power consumption table 853, the amount of power which is to be consumed when the application and content parameters are used (Step S903).

Next, the power detection unit 803 detects the remaining amount of power (Step S904), while the power control unit 801 judges whether charging is needed or not by comparing the remaining amount of power and the amount of power consumption (Step S905).

When it judges that charging is needed (Yes in Step S905), it causes the display 105 to display a message informing that charging is needed (Step S906). The power control unit 801 further causes the display 105 to display a message inquiring the user whether or not to display charging stations (Step S907).

Then, the charging station obtainment unit 805 judges whether or not the user has instructed to display charging stations, based on the output result from the input device 106 (Step S908). When it judges that the user has instructed so (Yes in Step S908), the charging station obtainment unit 805 causes the display 105 to display the nearest charging station (Step S909).

As mentioned above, in the present embodiment, a message for prompting the user to charge the mobile terminal and charging stations are previously displayed if the remaining amount of power is small. Therefore, it becomes possible to prevent the use of the application from being interrupted due to power shortage.

Note that in the present embodiment, when the application "television (TV)" is predicted based on the usage prediction rules shown in FIG. 57, that application is started at the same time when it is predicted. Since the broadcast start time of a TV program is predetermined, it becomes possible to prevent the user from missing the TV program by starting the application "TV" at the same time as the prediction.

(Modification)

A description is given here for a modification of the present embodiment.

The charging station obtainment unit of the mobile terminal according to the present modification causes the display 105 to preferentially display the charging stations located on the route to the destination of the mobile terminal.

Figure 65:
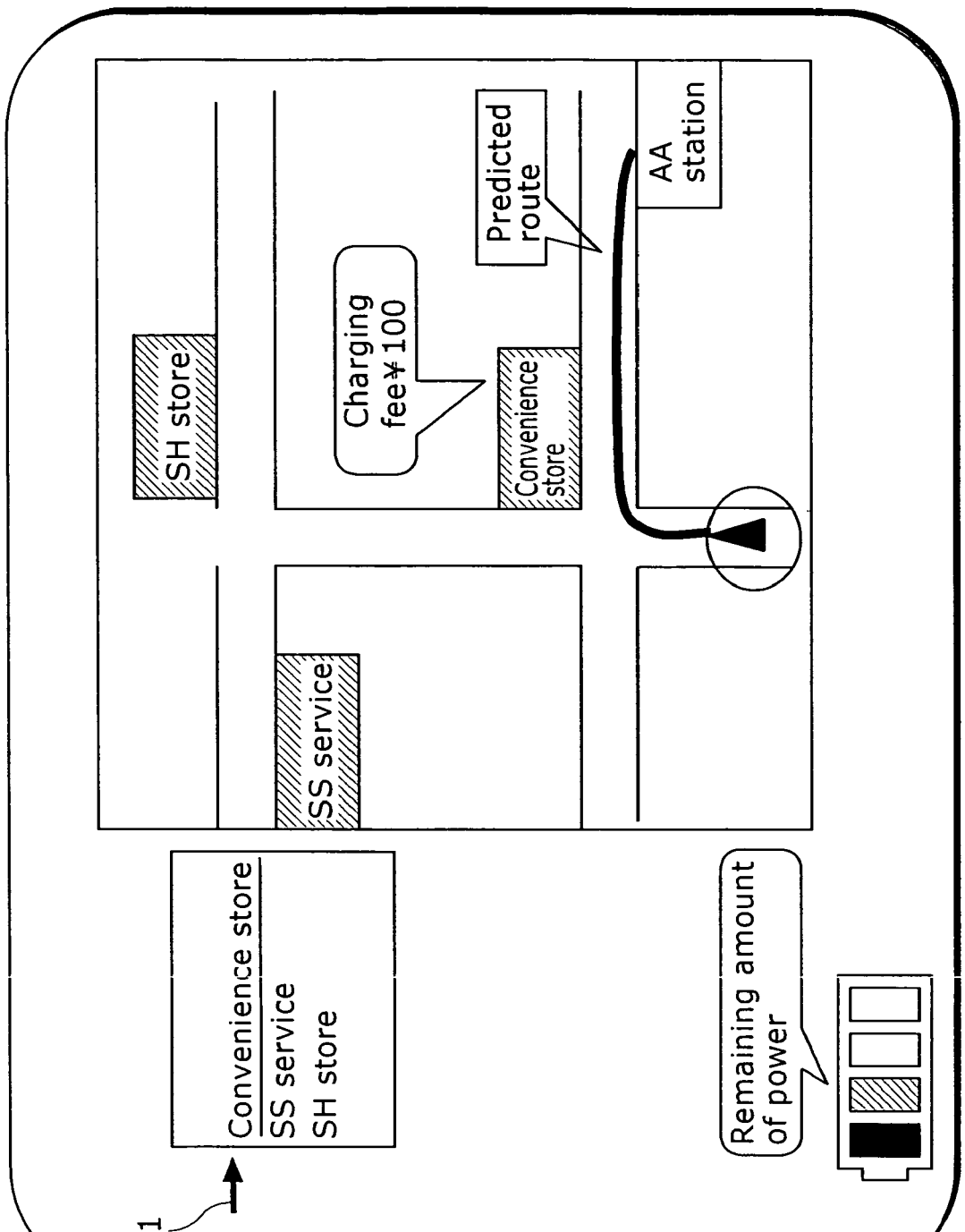
FIG. 65 is a diagram showing a screen display that displays preferentially charging stations which are located on the route to a destination in the third embodiment.

FIG. 65 is a diagram showing a screen on a display that preferentially displays charging stations located on the route to the destination.

For example, in the case where the user carrying the mobile terminal is moving from his office to AA station at 20:00 on Friday, the future location prediction unit 206 judges that the mobile terminal will move from AA station to BB station, based on the behavior prediction rule shown in FIG. 58. Then, the charging station obtainment unit causes to preferentially display the charging stations on the route from the current location of the mobile terminal to AA station.

Figure 66:
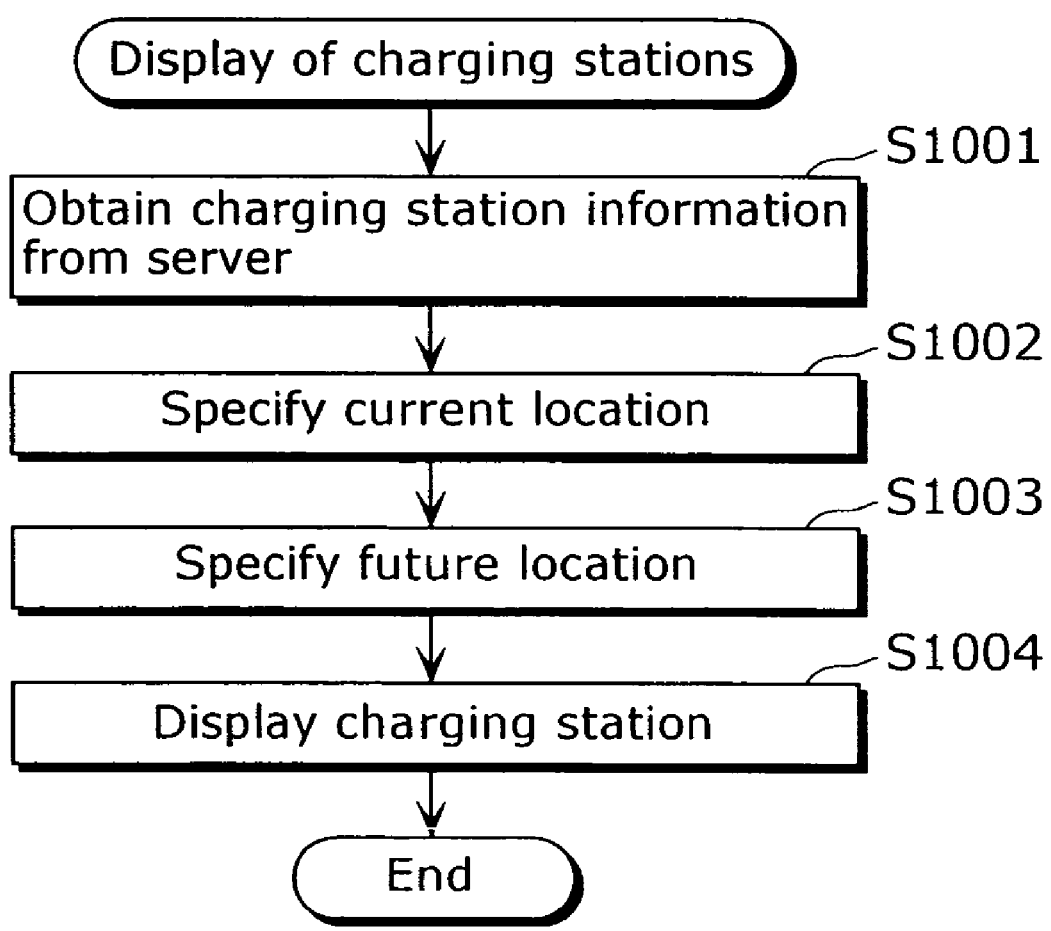
FIG. 66 is a flowchart showing operations of a charging station obtainment unit according to a modification of the third embodiment.

FIG. 66 is a flowchart showing the operations of the charging station obtainment unit according to the present modification.

The charging station obtainment unit first sends the detection result of the GPS reception unit 108 to the server in Step S909 in FIG. 64, and obtains the data indicating the nearest charging stations (charging station information) from the server (Step S1001). This data includes the nearest charging stations such as "convenience store", "SS service" and "SH store"

Next, the charging station obtainment unit specifies the current location detected by the GPS reception unit 108 (Step S1002), and further specifies the future location predicted by the future location prediction unit 206 (Step S1003). Then, the charging station obtainment unit causes the display 105 to preferentially display the charging stations on the route from the current location to the future location. For example, the charging station obtainment unit causes the display 105 to display the detailed information on the charging station "convenience store" which is located on the route from the office to AA station.

In the present modification as mentioned above, the charging station which is located on the route to the destination is preferentially displayed. Therefore, it becomes possible to save the user the time and trouble of changing the destination and going a long way round.

Note that in the present modification, the charging station which are located on the route to the destination is preferentially displayed, but the charging stations which the user has used before or the stations which bring certain advantages such as lower fee to the user may be displayed. By doing so, the convenience for the user can be enhanced. In the case where the charging stations which the user has used before are displayed, the user's past charging station usage history is stored and the charging stations shown in that history are preferentially displayed.

Note that in the present embodiment and the present modification thereof, the power control unit 802 may obtain the power coefficient corresponding to an application such as a game when the application is downloaded from the server, and add the application and the power coefficient to the power consumption table 853. For example, when a game application "AA racing" is downloaded from the server, the power coefficient "3" corresponding to that application is also downloaded at the same time.

Note that in the present embodiment and the present modification thereof, it is judged whether charging is needed or not based on the predicted application and content parameter. However, if the remaining amount of power is a predetermined lower limit or smaller at the time point when the application and the content parameter are predicted, it may be judged that charging is needed regardless of the prediction results. For example, in the case where the lower limit is 30 and the remaining amount of power is 30, the power control unit 802 judges that charging is needed for fear of power shortage even if any application is predicted.

Note that in the present embodiment and the present modification thereof, the power control unit 802 specifies the remaining amount of power based on the detection result by the power detection unit 803, but the remaining amount of power may be specified based on the usage duration of the application or the call duration. By doing so, it becomes possible to simplify the structure of the mobile terminal 81 by omitting the power detection unit 803.

Note that in the present embodiment and the present modification thereof, it is also possible to judge whether charging is needed or not by predicting the current application and content parameter when the input device 106 is operated, as is the case with the second embodiment. Or, it is also possible to judge whether charging is needed or not when a specific event is detected by a sensor or the like.

Additionally, in the present embodiment and the present modification thereof, the need for charging may be informed to the user by sound or the like. For example, the mobile terminal 81 may inform the user by sound or voice that charging is needed, when it comes close to the charging station "convenience store" before entering AA station on the route from the office to AA station.

Furthermore, in the present embodiment and the present modification thereof, when the user does not charge the mobile terminal even through charging is needed, the application may be executed in low power mode. Or, the application may be executed in low power mode with receiving a prior approval from the user.

Forth Embodiment

The mobile terminal in the present embodiment predicts an application and a content parameter that are likely to be used currently or in the future, and shows the user a message indicating that new data is required for using the application and content parameter and the place where such data is provided.

FIG. 67 is a functional block diagram showing the functional structure of the mobile terminal in the present embodiment.

A mobile terminal 91 in the present embodiment includes a display 105, a GPS reception unit 108, a calendar clock 107, a condition detection unit 403, a movement history data storage unit 201a, a movement history recording unit 202a, a behavior prediction rule storage unit 203a, an information display control unit 204a, a behavior pattern extraction unit 205a, an input device 106, a usage history recording unit 110a, usage history storage unit 111a, and a data obtainment place detection unit 806. Note that as for the above-mentioned components included in the mobile terminal 91 in the present embodiment, the reference numbers same as those assigned to the components included in the mobile terminal 81 shown in FIG. 56 are assigned to the components having the same functions and structures as those of the mobile terminal 81, and the detailed description thereof is not repeated here.

The usage history recording unit 110a creates a usage history by associating the used applications and content parameters with the usage dates and times, and stores the usage history into the usage history storage unit 111a, as is the case with the third embodiment. In the case where the used content parameter is specific data, the usage history recording unit 110a in the present embodiment adds additional data indicating whether the specific data has been obtained from the server or not into the usage history.

As a result, the behavior pattern extraction unit 205a in the present embodiment creates a usage prediction rules including the additional data.

FIG. 68 is a diagram showing the contents of the usage prediction rules created by the behavior pattern extraction unit 205a.

When the behavior pattern extraction unit 205a extracts a usage pattern that the application "Music player" is used with the content parameters "Volume: 75" and "Album to be played back: CountDown 100" under the usage situations "Time: Weekday night" and "Route: Office to station", it updates the usage prediction rule shown in FIG. 68 so that the number of uses of the extracted usage pattern increases by one.

Here, the additional data shown as "To be obtained" is added into the data named "Album to be played back: Count-Down 100" registered in the usage prediction rule. In other words, this data "Album to be played back: CountDown 100" indicates the latest music number at the time point when the application "Music player" is used, and the additional data indicates that the latest data "Album to be played back: CountDown 100" must be downloaded from the server when the application "Music player" is used.

When the application "Movie player" is used, the latest data "Program to be reproduced: AB stock news" is needed, so the additional data same as the above data is added into the data named "Program to be reproduced: AB stock news" registered in the usage prediction rule. Furthermore, when the application "Game" is needed, the data "Character data" is needed, so the additional data same as the above data is added into the data named "Character data" registered in the usage prediction rule.

The information display control unit 204b predicts an application and a content parameter that are likely to be used currently or in the future by referring to the usage prediction rules shown in FIG. 68, as is the case with the third embodiment. For example, the information display control unit 204b predicts the application "Music player" as well as the content parameter "Album to be played back: CountDown100" under the usage situation of the time "Weekday night" and the location "From office to station". When the data "Album to be played back: CountDown100" is predicted as a content parameter, the information display control unit 204b notifies the data obtainment place detection unit 809 that this data needs to be downloaded from the server. The information display control unit 204b predicts the application "Movie player" as well as the content parameter "Program to be reproduced: AB stock news" under the usage situation of the time "Weekday night" and the location "From AA station to BB station". When the "Program to be reproduced: AB stock news" is predicted as a content parameter, the information display control unit 204b notifies the data obtainment place detection unit 809 that this data needs to be downloaded from the server.

When the data obtainment place detection unit 806 obtains, from the information display control unit 204b, a notification that the data "Album to be played back: CountDown100" needs to be obtained, it checks whether it holds the data "Album to be played back: CountDown100" or not, and when it finds that it does not hold that data, it causes the display 105 to display a message (non-holding) notifying the user that it does not hold that data and inquiring the user whether a location at which the data can be downloaded needs to be displayed or not.

Figure 69:
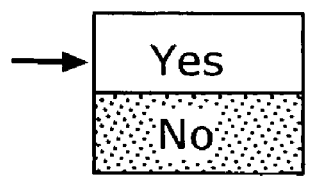
FIG. 69 is a diagram showing one example of a screen that displays a non-holding message in the fourth embodiment.

FIG. 69 is a diagram showing one example of the screen of the display 105 that displays a non-holding.

As shown in FIG. 69, the display 105 displays a non-holding message indicating that "No music to be played back is held. Is display of download place needed?"

When the user selects "Yes" by operating the input device 106 in the state of this screen display, the data obtainment place detection unit 806 obtains, from the server via the network 804, the download place data indicating the place where the data "Album to be played back: CountDown100" can be downloaded.

When the data obtainment place detection unit 806 judges that it holds the data notified from the information display control unit 204b, it communicates with the server via the network 804 so as to check whether the held data is the latest one or not. When judging that the data is not latest one, the data obtainment place detection unit 806 causes the display 105 to display a message (update message) notifying the user that the data is not latest and inquiring the user whether the place where the data can be downloaded needs to be displayed or not.

Figure 70:
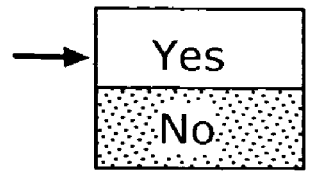
FIG. 70 is a diagram showing one example of a screen that displays an update message in the fourth embodiment.

FIG. 70 is a diagram showing one example of the screen of the display 105 that displays an update message.

As shown in FIG. 70, the display 105 displays an update message "Music to be played back has been updated. Is display of download place is needed?"

When the user selects "Yes" by operating the input device 106 in the state of this screen display, the data obtainment place detection unit 806 obtains, from the server via the network 804, the download place data indicating a location at which the data "Album to be played back: CountDown100" can be downloaded, in the same manner as mentioned above.

When the data obtainment place detection unit 806 obtains the download place data from the server as mentioned above, it notifies the server of the name of the data to be obtained and the current location detected by the GPS reception unit 108. The server retrieves, from the download place list data held in itself, the place where the data with the notified name can be downloaded and which is located near the notified current location, and sends the place corresponding to the retrieval result, as download place data, to the data obtainment place detection unit 806.

FIG. 71 is a diagram showing the contents of the download place list data held by the server.

As shown in FIG. 71, in the download place list data, the data names such as "Album to be played back: Count-Down100", the places where the data of the data names can be downloaded, the fees to be billed for the data download, and the coupons are registered.

When the server receives a notification of the data name (for example, "Album to be played back: CountDown100") and the current location from the data obtainment place detection unit 806, it searches for the data name within the download place list data. When it finds that data name, the data obtainment place detection unit 806 further retrieves the place nearest to the current location notified from the data obtainment place detection unit 806, from among the places associated with that data name.

Then, the server generates download place data indicating the retrieved place and the fee to be billed and the coupon related to the place, and sends the download place data to the data obtainment place detection unit 806.

For example, for the data "Album to be played back: Count-Down100", the server generates download place data indicating a place "Latitude N3, Longitude E3", a fee to be billed "¥20/kbyte" and a coupon "2 points", and sends it to the data obtainment place detection unit 806. For the data "Program to be reproduced: AB stock news", the server generates download place data indicating a place "Latitude N1, Longitude E1, Radius 1 km", a fee to be billed "¥10/kbyte" and a coupon "1 point", and sends it to the data obtainment place detection unit 806.

When the data obtainment place detection unit 806 obtains the above-mentioned download place data, it causes the display 105 to display the contents of that data.

Figure 72A:
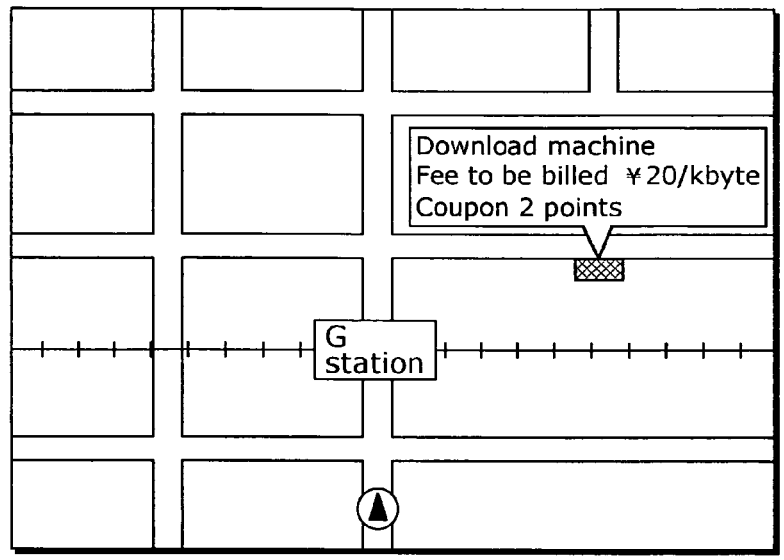
FIG. 72 is a diagram showing screens that display contents of download place data in the fourth embodiment.
Figure 72B:
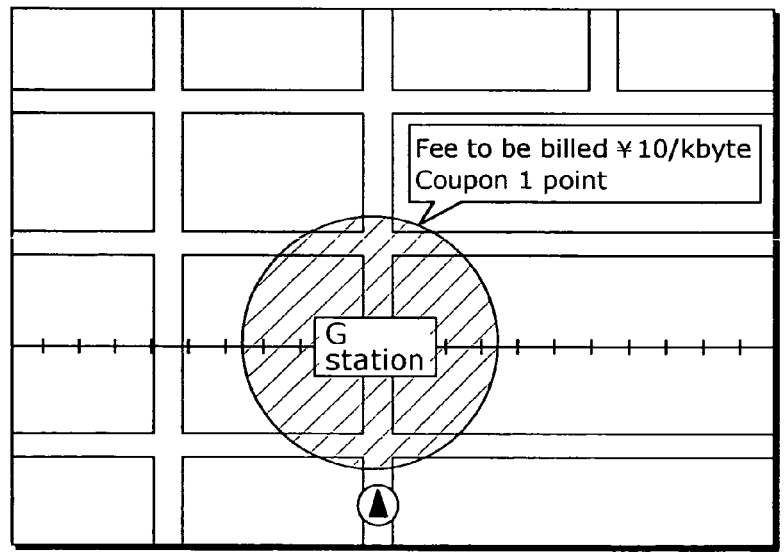

FIGS. 72A and 72B are diagrams showing screens that display the contents of the download place data.

When the data obtainment place detection unit 806 obtains the download place data for the data "Album to be played back: CountDown100", indicating the place "Latitude N3, Longitude E3", the fee to be billed "¥20/kbyte" and the coupon "2 points", it causes to display that place on a map as well as the details of the fee to be billed and the coupon, as shown in FIG. 72A. Note that the place shown by this download place data is a facility where a download machine is placed for downloading the above data to the mobile terminal 91 via the direct connection with the mobile terminal 91.

When the data obtainment place detection unit 806 obtains the download place data for the data "Program to be reproduced: AB stock news", indicating the place "Latitude N1, Longitude E1, Radius 1 km", the fee to be billed "¥10/kbyte" and the coupon "1 point", it causes to display that place on a map as well as the details of the fee to be billed and the coupon, as shown in FIG. 72B. Note that the place shown by this download place data is a place where the data can be downloaded via wireless communication.

A description is given here for the operations of the mobile terminal 91 in the present embodiment, by referring to FIG. 73.

FIG. 73 is a flowchart showing the operations of the mobile terminal 91.

Firstly, the information display control unit 204b of the mobile terminal 91 specifies the current date and time, location and weather condition based on the output results from the GPS reception unit 108, the calendar clock 107 and the condition detection unit 403 (Step S1101).

Next, the information display control unit 204b predicts an application and a content parameter that are likely to be used currently or in the future, by referring to the usage prediction rules stored in the behavior prediction rule storage unit 203a (Step S1102).

For example, in the case where the user of the mobile terminal 91 is moving from his office to the station at 20:00 on Friday, the information display control unit 204b predicts that the application "Music player" and the content parameter (the data "Album to be played back: CountDown100") are used currently, based on the usage prediction rule shown in FIG. 68.

Here, the information display control unit 204 judges whether or not additional data is added into the data "Album to be played back: CountDown100" registered in the usage prediction rule, and when it judges that the additional data is added, it notifies the data obtainment place detection unit 806 of the judgment result.

The data obtainment place detection unit 806 judges whether or not it is necessary to download the data "Album to be played back: CountDown100" from the server based on the notification from the information display control unit 204b and the communication with the server (Step S1103).

When judging that the download is needed (Yes in Step S1103), the data obtainment place detection unit 806 causes the display 105 to display the above non-holding or update message (Step S1104).

Then, the data obtainment place detection unit 806 judges, based on the output result from the input device 106, whether or not the user has instructed to display the data obtainment places (Step S1106). When judging that the user has instructed (Yes in Step S1106), the data obtainment place detection unit 805 causes the display 105 to display the data obtainment places (Step S1107).

(Modification)

A description is given here for a modification of the present embodiment.

The data obtainment place detection unit of the mobile terminal according to the present modification causes the display 105 to preferentially display the data obtainment places which are located on the route to the destination of the mobile terminal, as is the case with the modification of the third embodiment.

For example, in the case where the user carrying the mobile terminal is moving from his office to AA station at 20:00 on Friday, the future location prediction unit 206 judges that the mobile terminal will move from AA station to BB station, based on the behavior pattern shown in FIG. 58. Then, the data obtainment place detection unit preferentially displays the data obtainment places which are located on the route from the current location to AA station, based on the download place data obtained from the server.

Figure 74:
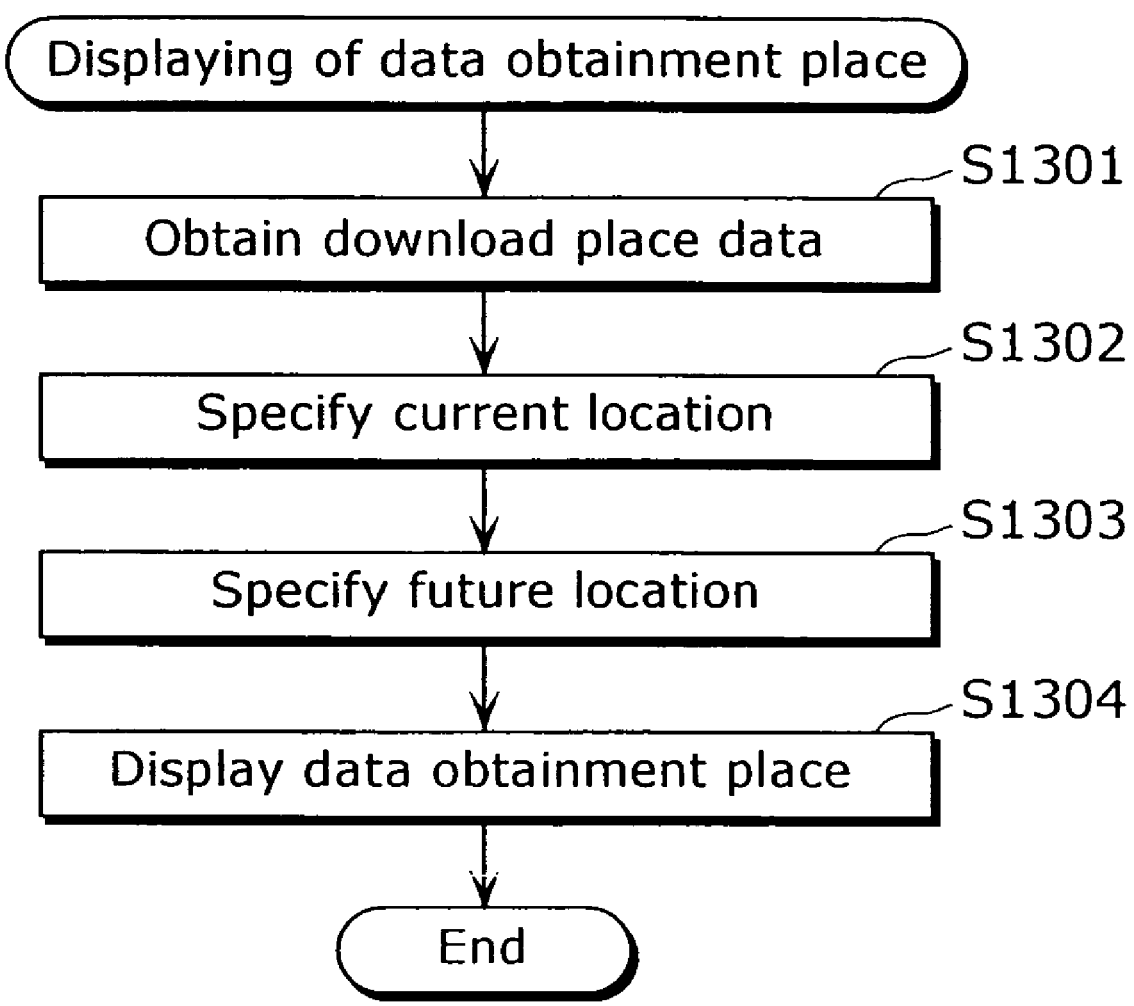
FIG. 74 is a flowchart showing operations of a data obtainment place detection unit according to a modification of the fourth embodiment.

FIG. 74 is a flowchart showing the operations of the data obtainment place detection unit according to the present modification.

In Step S1107 shown in FIG. 73, the data obtainment place detection unit first sends, to the server, the detection result by the GPS reception unit 108 and the data name predicted by the information display control unit 204b, and obtains the download place data from the server (Step S1301). This download place data indicates a plurality of nearest places where the data of the above name can be downloaded.

Next, the data obtainment place detection unit specifies the current location detected by the GPS reception unit 108 (Step S1302), and further specifies the future location predicted by the future location prediction unit 206 (Step S1303). Then, the data obtainment place detection unit causes the display 105 to preferentially display the data obtainment place which is located on the route from the current location to the future location (Step S1304).

In the present modification, the data obtainment place which is located on the route to the destination is preferentially displayed, out of the nearest data obtainment places. Therefore, it becomes possible to save the user the time and trouble of changing the destination and going a long way round.

Note that in the present modification, the data obtainment place which is located on the route to the destination is preferentially displayed. However, it is also possible to preferentially display the data obtainment place which has been used before by the user or the data obtainment place which brings a certain advantage such as lower fee to the user. Therefore, it becomes possible to enhance the user's convenience.

The present invention has been described using the embodiments and modifications, but the present invention is not limited to these embodiments and modifications.

For example, in the embodiments and modifications, the display 105 displays the names of the predicted applications or the screens that appear when those applications are started up.

However, if two or more displays 105 are included, it is also possible to preferentially start up the applications of the number of the displays with higher usage probabilities and display the screens of the started applications on respective displays 105. Therefore, it becomes possible for the user to select any of the predicted applications for use after checking the contents of the applications, and therefore, enhance the usability for the user.

INDUSTRIAL APPLICABILITY

The application program prediction method according to the present invention has an effect that an application program of a mobile terminal that a user is likely to use can be predicted appropriately depending on the location of the mobile terminal. For example, it is possible to apply this method to a mobile phone, an in-car device of a car navigation system and the like.

The invention claimed is:

1. An application program prediction method by which a mobile terminal, having installed therein a plurality of application programs, predicts at least one application program that a user is likely to use, the application program prediction method comprising:
   an application executing step of selecting and executing an application program installed in the mobile terminal;
   a location detecting step of detecting a location where the mobile terminal exists when the application program is executed in the application executing step;
   a usage history creating step of creating a usage history of the application program by storing the application program in association with the location of the mobile terminal when the application program is executed, the application program being executed in the application executing step, and the location of the mobile terminal being detected in the location detecting step; and
   a predicting step of determining a predetermined location, searching for the location in the usage history, and presenting, as a prediction result, the application program associated with the location searched for in the usage history and the predetermined location,
   wherein the predicting step includes:
   a future location predicting step of predicting a future location of the mobile terminal;
   a current application specifying step of specifying, based on the usage history, an application program corresponding to the future location predicted in the future location predicting step; and
   a current application presenting step of presenting the application program specified in the specifying step, as a prediction result of an application program that the user is likely to use in the future, and the future location predicting step includes:
a station specifying step of specifying a station where the mobile terminal currently exists through communication carried out between the mobile terminal and a device placed in the station; and
a retrieving step of retrieving, from a past route search result, an arrival station corresponding to a departure station that is the station specified in the station specifying step, and
the arrival station retrieved in the retrieving step is regarded as the future location of the mobile terminal.

2. The application program prediction method according to claim 1,
wherein the predicting step further includes:
a current location detecting step of detecting a current location of the mobile terminal;
a current application specifying step specifying, based on the usage history, an application program corresponding to the current location detected in the current location detecting step; and
a current application presenting step presenting the application program specified in the current application specifying step, as a prediction result of an application program that the user is likely to use currently.

3. The application program prediction method according to claim 2,
wherein in the usage history creating step, the usage history is created, the usage history including a name of the application program executed in the application executing step and a content for the application program inputted by a user's operation,
in the current application specifying step, a content corresponding to the current location detected in the current location detecting step is further specified based on the usage history, and
in the current application presenting step, the content specified in the current application specifying step is further presented as a content of the application program that the user is likely to use currently.

4. The application program prediction method according to claim 3,
wherein in the current application specifying step, an e-mail is specified as an application program corresponding to the current location detected in the current location detecting step, and
in the current application presenting step, a prediction result is presented, the prediction result indicating that the e-mail is specified as the application program that the user is likely to use currently.

5. The application program prediction method according to claim 4,
wherein in the current application specifying step, a destination of the e-mail is specified as a content corresponding to the current location detected in the current location detecting step, and
in the current application presenting step, the destination is presented.

6. The application program prediction method according to claim 4,
wherein in the current application specifying step, a template of a text of the e-mail is specified as a content corresponding to the current location detected in the current location detecting step, and
in the current application presenting step, the template is presented.

7. The application program prediction method according to claim 1,
wherein in the usage history creating step, the usage history is created, the usage history including a name of the application program executed in the application executing step and a content for the application program inputted by a user's operation,
in the specifying step, a content corresponding to the future location predicted in the future location predicting step is further specified based on the usage history, and
in the presenting step, the content specified in the specifying step is further presented as a content of the application program that the user is likely to use in the future.

8. The application program prediction method according to claim 7, further comprising:
a power detecting step of detecting a remaining amount of power of the mobile terminal;
a calculating step of calculating an amount of power which is to be consumed when the application program and the content specified in the specifying step are used; and
a message presenting step of presenting a message prompting to charge when the remaining amount of power detected in the power detecting step is smaller than the amount of power consumption calculated in the calculating step.

9. The application program prediction method according to claim 8, further comprising:
a sending step of sending current location information indicating a current location of the mobile terminal to a predetermined apparatus via a communication network;
an obtaining step of obtaining, from the predetermined apparatus, charging place information indicating a place where the mobile terminal can be charged, in the vicinity of the location indicated in the current location information; and
a charging place presenting step of presenting the charging place based on the charging place information obtained in the obtaining step.

10. The application program prediction method according to claim 7,
wherein the content is distribution data to be distributed via a communication network, and
the application program prediction method further comprises:
a judging step of judging whether or not the mobile terminal holds a latest version of the distribution data specified in the specifying step; and
a presenting step of presenting a message for notifying that the mobile terminal does not hold the latest version of the distribution data, when it is judged in the judging step that the mobile terminal does not hold the latest version.

11. The application program prediction method according to claim 10, further comprising:
a sending step of sending current location information indicating a current location of the mobile terminal to a predetermined apparatus via a communication network;
an obtaining step of obtaining, from the predetermined apparatus, obtainment place information indicating a data obtainment place where the mobile terminal can obtain the latest version of the distribution data, in the vicinity of the location indicated in the current location information; and
an obtainment place presenting step of presenting the data obtainment place based on the obtainment place information obtained in the obtaining step.

12. The application program prediction method according to claim 1, further comprising:
- a mode setting step of setting an operation mode of the mobile terminal;
- a setting location detecting step of detecting a location of the mobile terminal where the operation mode is set in the mode setting step;
- a setting history creating step of creating a setting history of the operation mode set in the mode setting step, in association with the location detected in the setting location detecting step; and
- a mode predicting step of specifying an operation mode corresponding to a current location of the mobile terminal based on the setting history, and presenting the set operation mode as a prediction result.

13. A mobile terminal that predicts at least one application program that a user is likely to use from among a plurality of pre-installed application programs, the mobile terminal comprising:
- an application execution unit operable to select and execute an application program installed in the mobile terminal;
- a location detection unit operable to detect a location where the mobile terminal exists when the application program is executed by said application execution unit;
- a usage history creation unit operable to create a usage history of the application program by storing the application program in association with the location of the mobile terminal when the application program is executed, the application program being executed said application executing unit, and the location of the mobile terminal being detected by said location detecting unit; and
- a prediction unit operable to determine a predetermined location, searching for the location in the usage history, and presenting, as a prediction result, the application program associated with the location searched for in the usage history and the predetermined location,
- wherein the predicting unit includes a future location prediction unit operable to predict a future location of the mobile terminal, a specification unit operable to specify, based on the usage history, an application program corresponding to the location predicted by said future location predicting unit, and a presentation unit operable to present the application program specified by said specification unit, as a prediction result of an application program that the user is likely to use in the future, and
- said future location prediction unit includes:
- a station specification unit operable to specify a station where the mobile terminal currently exists, through communication carried out between the mobile terminal and a device placed in the station; and
- a retrieving unit operable to retrieve, from a past route search result, an arrival station corresponding to a departure station that is the station specified by said station specification unit; and
- the arrival station retrieved by said retrieving unit is regarded as the future location of the mobile terminal.

14. The mobile terminal according to claim 13,
wherein said prediction unit further includes:
- a current location detection unit operable to detect a current location of the mobile terminal;
- a current application specification unit operable to specify, based on the usage history, an application program corresponding to the location detected by said current location detection unit; and
- a current application presentation unit operable to present the application program specified by said specification unit, as a prediction result of an application program that the user is likely to use currently.

15. The mobile terminal according to claim 14,
wherein said usage history creation unit is operable to create the usage history that includes a name of the application program executed by said application execution unit and a content for the application program inputted by a user's operation,
said current application specification unit is further operable to specify, based on the usage history, a content corresponding to the location detected by said current location detection unit, and
said current application presentation unit is further operable to present the content specified by said specification unit, as a content of the application program that the user is likely to use currently.

16. The mobile terminal according to claim 13, further comprising:
- a mode setting unit operable to set an operation mode of the mobile terminal;
- a setting location detection unit operable to detect a location of the mobile terminal where the operation mode is set by said mode setting unit;
- a setting history creation unit operable to create a setting history of the operation mode set by said mode setting unit, in association with the location detected by said location detection unit; and
- a mode prediction unit operable to specify an operation mode corresponding to a current location of the mobile terminal based on the setting history, and to present the operation mode as a prediction result.

17. A program used for a mobile terminal having installed therein a plurality of application programs, the program causing the mobile terminal to execute a method of predicting at least one application program that a user is likely to use, the method comprising:
- an application executing step of selecting and executing an application program installed on the mobile terminal;
- a location detecting step of detecting a location where the mobile terminal exists when the application program is executed in the application executing step;
- a usage history creating step of creating a usage history of the application program by storing the application program in association with the location of the mobile terminal when the application program is executed, the application program being executed in the application executing step, and the location of the mobile terminal being detected in the location detecting; and
- a predicting step of determining a predetermined location, searching for the location in the usage history, and presenting, as a prediction result, the application program associated with the location searched for in the usage history and the predetermined location,
- wherein the predicting step includes:
- a future location predicting step of predicting a future location of the mobile terminal;
- a current application specifying step of specifying, based on the usage history, an application program corresponding to the future location predicted in the future location predicting step; and
- a current application presenting step of presenting the -application program specified in the specifying step, as a prediction result of an application program that the user is likely to use in the future; and
- the future location predicting step includes;
- a station specifying step of specifying a station where the mobile terminal currently exists, through communication carried out between the mobile terminal and a device placed in the station;

a retrieving step of retrieving, from a past route search result, an arrival station corresponding to a departure station that is the station specified in the station specifying step; and the arrival station retrieved in the retrieving step is regarded as the future location of the mobile terminal.

18. An application program prediction method by which a mobile terminal, having installed therein a plurality of application programs, predicts at least one application program that a user is likely to use, the application program prediction method comprising:

an application executing step of selecting an application program from the plurality of application programs installed in the mobile terminal, and executing the selected program;

a location detecting step of detecting step of detecting a location where the mobile terminal exists when then application program is executed in the application executing step;

a usage history creating step of creating a usage history of the application program by storing the application program in association with the location of the mobile terminal when the application program is executed, the application program being executed in the application executing step, and the location of the mobile terminal being detected in the location detecting step; and a predicting step of determining a predetermined location, searching the usage history for the location, and presenting, as a prediction result, the application program associated with the searched location in the usage history and the predetermined location, wherein the predicting step includes;

a future location predicting step of predicting a future location of the mobile terminal;

a current application specifying step of specifying, based on the usage history, an application program corresponding to the future location predicted in the future location predicting step; and a current application presenting step of presenting the application program specified in the specifying step, as a prediction result of an application program that the user is likely to use in the future, the future location predicting step includes:

a route specifying step of specifying a route on which the station where the mobile terminal currently exists in located, through communication carried out between the mobile terminal and a device placed in the station; and a retrieving step of retrieving, from a past e-mail history, a station which is located on the route specified in the station specifying step, and the station retrieved in the retrieving step is regarded as the future location of the mobile terminal.

19. The application program prediction method according to claim 18, further comprising:

a mail communicating step of receiving an e-mail as text information via a network; and a destination candidate storing step of determining the station indicated by the text information obtained in the mail communicating step to be a destination candidate where the user is likely to go, wherein, in the route specifying step, the route is specified when the mobile terminal passes through a ticket gate, and in the retrieving step, the station which is located on the route is retrieved, based on a reception time of the e-mail, from the text information stored in the storage unit in the destination candidate storing step.

20. The application program prediction method according to claim 19, wherein, in the retrieving step, the station which is located on the route is retrieved using a station related to a facility retrieved.

21. The application program prediction method according to claim 19, wherein, in the future location prediction step, a passage time at which the mobile terminal passed through the ticket gate is detected, and in the case where a plurality of stations located on the route are retrieved in the retrieving step, the plurality of stations are displayed, as future locations of the mobile terminal, in order of closeness of reception times of e-mails respectively corresponding to the plurality of stations with respect to the passage time of the mobile terminal.

22. A mobile terminal that predicts an at least one application program that a user is likely to use from among a plurality of pre-installed applications programs, the mobile terminal comprising:

an application execution unit operable to select and execute an application program installed in the mobile terminal;

a location detection unit operable to detect a location where the mobile terminal exists when the application program is executed by said application execution unit;

a usage history creation unit operable to create a usage history of the application program by storing the application program in association with the location of the mobile terminal when the application program is executed, the application program being executed by said application executing unit, and the location of the mobile terminal being detected by said location detecting unit; and a prediction unit operable to determine a predetermined location, searching for the location in the usage history, and presenting, as a prediction result, the application program associated with the location searched for in the usage history and the predetermined location, wherein said prediction unit includes:

a future location prediction unit operable to predict a future location of the mobile terminal;

a current application specification unit operable to specify, based on the usage history, an application program corresponding to the location predicted by said future location prediction unit; and a current application presentation unit operable to present the application program specified by said specification unit, as a prediction result of an application program that the user is likely to use in the future, said future location predicting step includes:

a route specification unit operable to specify a route on which the station where the mobile terminal currently exists is located through communication carried out between the mobile terminal and a device placed in the station; and a retrieving unit operable to retrieve, from a past e-mail history, a station which is located on the route specified by said station specification unit, and the station retrieved by said retrieving unit is regarded as the future location of the mobile terminal.

23. A program used for a mobile terminal having installed therein a plurality of application programs, the program causing the mobile terminal to execute a method of predicting at least one application program that a user is likely to use, the method comprising:

an application executing step of selecting and executing an application program installed on the mobile terminal;

a location detecting step of detecting a location where the mobile terminal exists when the application program is executed in the application executing step;

a usage history creating step of creating a usage history of the application program by storing the application program in association with the location of the mobile terminal when the application program is executed, the application program being executed in the application executing step, and the location of the mobile terminal being detected in the location detecting step; and a predicting step of determining a predetermined location, searching for the location in the usage history, and presenting, as a prediction result, the application program associated with the location searched for in the usage history and the predetermined location, wherein the predicting step includes:

a future location predicting step of predicting a future location of the mobile terminal;

a current application specifying step of specifying, based on the usage history, an application program corresponding to the future location predicted in the future location predicting step; and a current application presenting step of presenting the application program specified in the specifying step, as a prediction result of an application program that the user is likely to use in the future, the future location predicting step includes:

a station specifying step of specifying a station where the mobile terminal currently exists, through communication carried out between the mobile terminal and a device placed in the station; and a retrieving step of retrieving, from a past e-mail history, a station which is located on the route and is the station specified in the station specifying step, and the station retrieved in the retrieving step is regarded as the future location of the mobile terminal.

* * * * *